(12) United States Patent
Lawson et al.

(10) Patent No.: US 9,531,294 B2
(45) Date of Patent: Dec. 27, 2016

(54) POWER-CONVERSION ENGINE

(71) Applicant: CogniPower, LLC, Malvern, PA (US)

(72) Inventors: Thomas E. Lawson, Malvern, PA (US);
William H. Morong, Paoli, PA (US)

(73) Assignee: CogniPower, LLC, Malvern, PA (US)

( * ) Notice: Subject to any disclaimer, the term of this patent is extended or adjusted under 35 U.S.C. 154(b) by 353 days.

(21) Appl. No.: 14/185,144

(22) Filed: Feb. 20, 2014

(65) Prior Publication Data

US 2014/0198545 A1 Jul. 17, 2014

Related U.S. Application Data

(60) Continuation of application No. 12/840,436, filed on Jul. 21, 2010, now Pat. No. 8,698,462, which is a
(Continued)

(51) Int. Cl.
*H02M 1/10* (2006.01)
*H02M 3/04* (2006.01)
(Continued)

(52) U.S. Cl.
CPC ............ *H02M 7/44* (2013.01); *G05F 1/10* (2013.01); *H02M 1/10* (2013.01); *H02M 3/04* (2013.01);
(Continued)

(58) Field of Classification Search
CPC .. H02M 3/156; H02M 3/1582; H02M 3/1588; H02M 2001/0003; H02M 2001/0006; H02M 2001/0009; H02M 2001/0038; H02M 1/16; H02M 1/4233; H02M 2001/4291
See application file for complete search history.

(56) References Cited

U.S. PATENT DOCUMENTS 4,186,437 A 1/1980 Cuk
4,399,499 A 8/1983 Butcher et al.
(Continued)

OTHER PUBLICATIONS

International Search Report and Written Opinion; Mailed Jun. 30, 2008 for corresponding PCT Application No. PCT/US2007/063310.
(Continued)

*Primary Examiner* — Jessica Han
(74) *Attorney, Agent, or Firm* — Mendelsohn Dunleavy, P.C.; Steve Mendelsohn

(57) ABSTRACT

The disclosure provides a power converter and method for controlling same, comprising a plurality of switch elements, an inductive reactor, and at least two ports for the movement of electrical energy. Any energy-moving port may be made unipolar, bidirectional, bipolar, or bidirectionally bipolar. Ports may be equipped with sensing circuitry to allow the converter output to be controlled responsively to an input signal. The disclosure may be configured to be used in many ways, for example, as a power-supply, as an amplifier, or as a frequency converter. The disclosure may comprise energy predictive calculating means to obtain excellent transient response to line and load variations. The disclosure may also include a switch to create a low impedance path around the inductor to allow current to recirculate through the inductor when it is not needed at any of the ports.

20 Claims, 32 Drawing Sheets

Related U.S. Application Data division of application No. 11/682,169, filed on Mar. 5, 2007, now Pat. No. 7,786,709.

(60) Provisional application No. 60/823,564, filed on Aug. 25, 2006.

(51) Int. Cl.

| | | |
|---|---|---|
| *H02M 7/44* | (2006.01) | |
| *H02M 3/158* | (2006.01) | |
| *H02M 5/257* | (2006.01) | |
| *H02M 7/797* | (2006.01) | |
| *G05F 1/10* | (2006.01) | |
| *H02M 5/04* | (2006.01) | |
| *H02M 7/04* | (2006.01) | |

(52) U.S. Cl.
CPC ........... *H02M 3/158* (2013.01); *H02M 3/1582* (2013.01); *H02M 5/04* (2013.01); *H02M 5/257* (2013.01); *H02M 7/04* (2013.01); *H02M 7/797* (2013.01)

(56) References Cited

U.S. PATENT DOCUMENTS

| | | |
|---|---|---|
| 4,761,722 A | 8/1988 | Pruitt |
| 4,866,587 A | 9/1989 | Wadlington |
| 5,075,568 A | 12/1991 | Bilotti et al. |
| 5,196,995 A | 3/1993 | Gulczynski |
| 5,400,239 A | 3/1995 | Caine |
| 5,621,631 A | 4/1997 | Vinciarelli et al. |
| 5,734,258 A | 3/1998 | Esser |
| 5,869,955 A * | 2/1999 | Henseler ................. G05B 9/03 323/273 |
| 5,903,348 A | 5/1999 | Melman et al. |
| 6,025,999 A | 2/2000 | Farrington et al. |
| 6,151,266 A | 11/2000 | Henkels et al. |
| 6,275,016 B1 | 8/2001 | Ivanov |
| 6,304,461 B1 | 10/2001 | Walker |
| 6,330,170 B1 | 12/2001 | Wang et al. |
| 6,344,985 B1 | 2/2002 | Akerson |
| 6,366,062 B2 * | 4/2002 | Baretich ................ H02M 5/293 323/223 |
| 6,489,754 B2 | 12/2002 | Blom |
| 6,501,194 B1 | 12/2002 | Jiang et al. |
| 6,680,641 B1 | 1/2004 | Orr |
| 6,894,461 B1 | 5/2005 | Hack et al. |
| 7,030,694 B2 | 4/2006 | Jonkman |
| 7,041,214 B2 | 5/2006 | Lee et al. |
| 7,046,525 B2 | 5/2006 | Smidt et al. |
| 7,102,251 B2 | 9/2006 | West |
| 7,256,568 B2 | 8/2007 | Lam et al. |
| 7,538,532 B2 | 5/2009 | Hack et al. |
| 7,786,709 B2 | 8/2010 | Lawson et al. |
| 8,223,522 B2 | 7/2012 | Telfus |
| 2005/0218876 A1 * | 10/2005 | Nino ................... H02M 3/1582 323/282 |

OTHER PUBLICATIONS

Non-final Office Action; Mailed Dec. 30, 2009 for the corresponding U.S. Appl. No. 11/682,169.

Notice of Allowance; Mailed Jun. 25, 2010 for the corresponding U.S. Appl. No. 11/682,169.

Non-final Office Action; Mailed Sep. 4, 2013 for the corresponding U.S. Appl. No. 12/840,436.

Notice of Allowance; Mailed Jan. 30, 2014 for the corresponding U.S. Appl. No. 12/840,436.

Data Sheet: Source Ringer Controller, Dec. 1999, Texas Instruments, UCC2750.

* cited by examiner

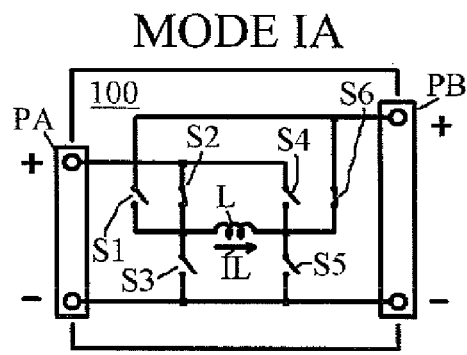
FIG. 4A — MODE IA
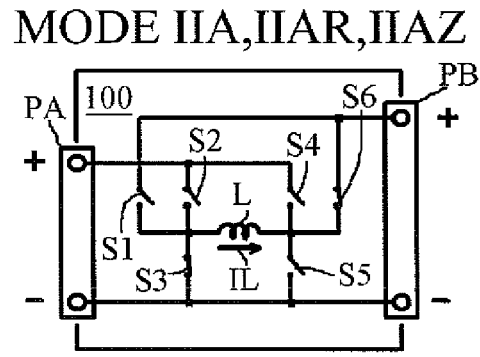
FIG. 4D — MODE IIA, IIAR, IIAZ
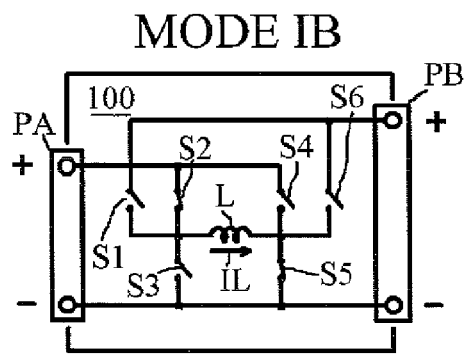
FIG. 4B — MODE IB
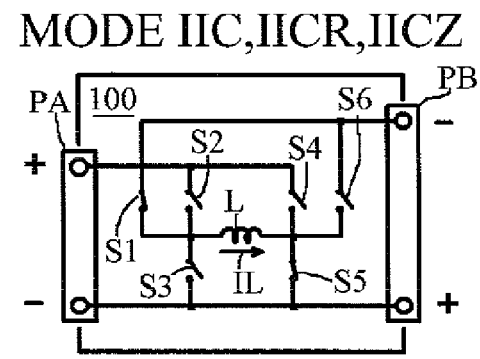
FIG. 4E — MODE IIC, IICR, IICZ
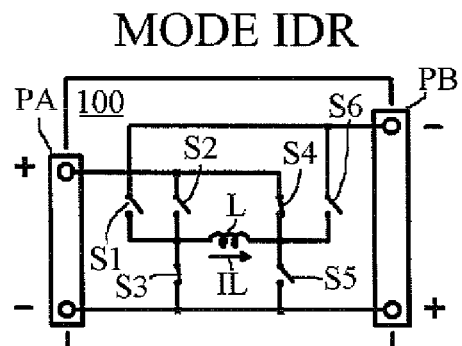
FIG. 4C — MODE IDR
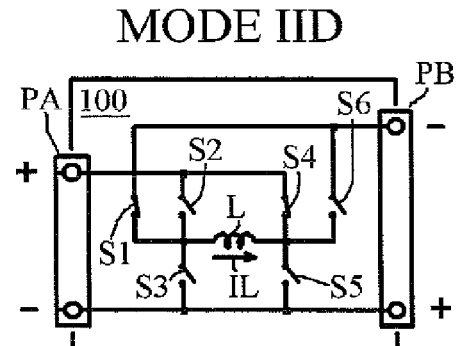
FIG. 4F — MODE IID

MODE IIIAR

MODE IVA,IVAE

MODE IIIBR

MODE IIICR

POWER-CONVERSION ENGINE

CROSS-REFERENCE TO RELATED APPLICATIONS

This application is a continuation of U.S. application Ser. No. 12/840,436 filed Jul. 21, 2010, incorporated herein by reference, which is itself a divisional of U.S. application Ser. No. 11/682,169 filed Mar. 5, 2007, incorporated herein by reference, which claims the benefit of U.S. Provisional Application No. 60/823,564 filed on Aug. 25, 2006, which is incorporated herein by reference.

BACKGROUND

Electrical power conversion devices are well known in the prior art and include power supplies, amplifiers, converters (AC-DC, AC-AC, DC-DC and DC-AC), generators and drives.

Some prior-art supplies are switched forward-converters that depend on transformer turns-ratio to accommodate differing input and output voltage in which energy stored in an inductive field is a mere by-product of operation.

Other very common power converters related to the present disclosure are switched supplies operating in either the well-known buck or flyback modes. A few supplies such as that of U.S. Pat. No. 6,275,016 are capable of both buck and boost operation. Some flyback supplies are used to provide polarity inversion between input and output.

Sometimes multiple supplies are used to provide bidirectional flow of power, but recently integrated bidirectional supplies have been developed. The supply of U.S. Pat. No. 5,734,258 is bidirectional and operates in both buck and boost modes. U.S. Pat. No. 7,046,525 describes a bidirectional flyback mode supply. U.S. Pat. Nos. 6,894,461 and 5,196,995 describe bidirectional supplies.

Some supplies like U.S. Pat. No. 6,894,461 have a plurality of energy ports.

Less common are switched mode amplifiers with inductive energy-storage elements. The amplifier of U.S. Pat. No. 4,186,437 uses a plurality of inductors to obtain bipolar operation. The amplifier of U.S. Pat. No. 7,030,694 uses a plurality of DC-DC converters, complementarily controlled, to achieve bipolar operation.

The power converter of U.S. Pat. No. 5,196,995 is bidirectional and bipolar, but is bidirectional only when inverting polarity.

It is not known in the prior art to provide an integrated switched-mode power-converter that is bidirectionally bipolar.

SUMMARY

The present disclosure provides a switched mode power converter and method for controlling same, comprising a plurality of switch elements, an inductive reactor, and at least two ports for the movement of electrical energy. The arrangement of switches of this disclosure enables an inductive reactor, such as an inductor or transformer, to participate in power conversion between ports. Such conversion may employ the buck or flyback modes, or both. Any energy-moving port may be made unipolar, bidirectional, bipolar, or bidirectionally bipolar. Ports may or may not be galvanically isolated by using a transformer as an inductive reactor. Ports may be equipped with sensing circuitry to allow the converter output to be controlled responsively to an input signal. The disclosure may be configured to be used in many ways, for example, as a power-supply, as an amplifier, or as a frequency converter. The disclosure may comprise energy predictive calculating means to obtain excellent transient response to line and load variations. The disclosure may also comprise means to enable it to adapt to changes of internal and/or external reactive components. The disclosure may also include a switch to create a low impedance path around the inductor to allow current to recirculate through the inductor when it is not needed at any of the ports.

In one embodiment, the disclosure comprises power input and output ports, an inductive reactor for energy storage, switches for connecting the ports to the inductive reactor, a sensor generating a feedback signal responsive to the voltage or current at the output port, a reference signal and a control circuit. The control circuit controls the switches in response to the feedback signal and reference signal so that the polarity of the input and output ports can be switched between inverting and non-inverting and such that for any polarity energy may flow from the input port to the output port or from the output port to the input port. In one preferred embodiment of this implementation of the disclosure the amount of energy placed into the inductive reactor during charging of the inductive reactor is controlled based approximately on upon the per-chopping-cycle load energy requirement at the output port.

In another similar embodiment of the disclosure one port is bipolar and another port is unipolar and the converter may be inverting or non-inverting. The inductive energy element is an inductor and it is directly coupled to the ports through the switches. The control circuit maintains a desired relationship between the voltage or current at the output port and the reference signal.

In one method of the disclosure the converter is comprised of an inductive reactor, at least two power-moving ports, a reference signal and a number of switches. The method involves setting the switches in response to the sign and magnitude of the inductive reactor current to maintain the voltage or current at one of the ports in a desired mathematical relationship with the reference signal. In one embodiment of this method the method involves selecting a mode of converter operation based up the magnitude and sign of the reference signal, the magnitude and sign of the power-moving port voltages and the magnitude and sign of the inductive reactor current. Once the mode is selected, the switches are set to effect this mode.

In another embodiment the disclosure comprises a method of operating a switched mode power supply with a plurality of modes. The modes include at least an inductive reactor energizing mode and energy transfer mode wherein energy is transferred to at least one power-moving port. The supply is operated so that more than one mode may occur during any single chopping cycle. Preferably, this method also allows a mode to overlap chopping cycles so that the mode at the end of a given chopping cycle is the mode at the beginning of the next chopping cycle.

In another embodiment of the disclosure the converter is configured as a switched mode flyback converter and has circuitry for calculating predicted pedestal current in the inductor based upon a feedback signal responsive the voltage or current at a port and the reference signal. The control circuitry commutates the switches in response to the predicted pedestal current and the feedback signal such that a desired mathematical relationship is maintained between the output port and a reference signal.

In another embodiment of the disclosure the converter is configured as a switched mode power converter comprising an inductive reactor, first and second switches and an auxiliary energy source (such as a reactor, capacitor, inductor, battery, generator or power supply). The method for controlling this embodiment is comprised of predicting within a chopping cycle the inductive pedestal current at the end of the present cycle, control the first switch such that the per-cycle pedestal current change is limited, and controlling the second switch in response to the current pedestal predictions to move energy between the inductive reactor and the auxiliary energy source.

In another embodiment of the disclosure the converter is configured to operate in bipolar, bidirectional, inverting or flyback modes and is comprised of a power input port, switches, an inductor and a power output port. The converter also has an alternate path that allows energy to flow from the inductor other than to the output port. The alternate path could be a low impedance or short circuit around the inductor allowing current to recirculate through the inductor, a path from the inductor back to the input port, or a path to a third port. The method of operating this converter is comprised of transferring energy from the power input port to the inductor to energize the inductor, transferring power from the inductor to the power output port and controllably connecting the inductor to the power output port or the alternate path in order to control the power at the power output port. This method may be adapted so that the output voltage is lower than the input voltage by shortening the period of the flyback mode.

BRIEF DESCRIPTION OF THE DRAWINGS

FIGS. 4A-4J depict different modes of a switching arrangement for the bidirectionally bipolar transfer of energy between non-isolated ports using an inductor and six switches.

DETAILED DESCRIPTION

Figure 1:
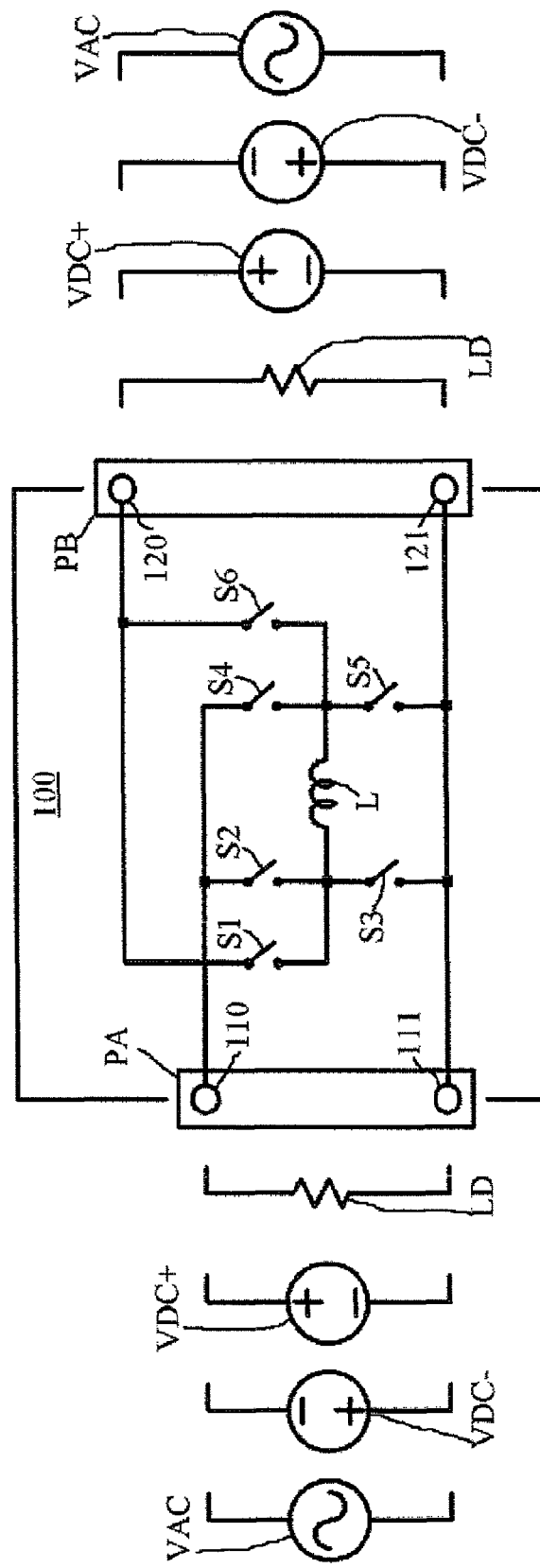
FIG. 1 depicts a bidirectionally bipolar switched mode power converter according to this disclosure.

To avoid confusion, let the terms defined hereinbelow be used to describe this disclosure:

Definitions

1. "PORT" means a galvanically related pair or group of terminals disposed to comprise a portion of a circuit to be externally attached to this disclosure. Most ports are energy-moving ports. There may be a control port, comprising one or more connection-pairs to external circuits, for the purpose of controlling the operation of this power-conversion engine.

2. An "ACTIVE" port means one that maintains a voltage or current responsive to energy calculations. An active port usually comprises presently-working sense means in addition to energy-moving means. A "PASSIVE" port defaults to conditions set by energy present co-acting with an external circuit attached thereto.

3. "FORWARD" (FWD) indicate energy transfer from a passive port to an active port, whilst "REVERSE" (REV) indicates transfer from an active port to a passive port.

4. "DISSIPATOR" indicates that a port is consuming energy being supplied by an external circuit, whilst "GENERATOR" indicates that a port is supplying energy to and external circuit. Note that it is a practical mode for an active port to be a dissipator.

5. "NON-INVERSION" (NON) indicates no polarity inversion between a dissipator port and a generator port, whilst "INVERSION" (INV) indicates polarity inversion between such ports. "Inverting" means that polarity is switched between the ports (for example if the dissipater port has a positive voltage the generator port has a negative voltage)"

6. "ENERGIZE" (EN) indicates the act of increasing inductive energy at the expense of an external circuit attached to a dissipator port, whilst "TRANSFER" (TR) indicates the act of decreasing inductive energy through a generator port.

7. "CHARGE" indicates the act of increasing, and "DISCHARGE" act of decreasing, the energy of a capacitor or battery.

8. "BUCK" indicates the well-known buck mode of power conversion, conventionally employed when the turns-ratio-adjusted voltage across a dissipator port exceeds that across an associated generator port. "FLY" indicates the well-known flyback, or boost, mode of power conversion, usually employed when the turns-ratio-adjusted voltage across a generator port exceeds that across an associated dissipator port.

9. "balf" and "balfb" indicate respectively attainment of predicted energy balance during forward and forward-buck energizing times. The expressions "until balf" and "until balfb" indicate that inductive energizing is to continue until such a balance is attained.

10. "I sub th" (Ith) indicates the attainment of a low-current threshold, representing a state of inconsequential energy available from all inductive reactors substantially involved in energy transfer between ports. The expression "until Ith" indicates that an energy transfer is to continue until this state is attained.

11. The "INDUCTOR" means a two terminal inductive reactor, whilst the term "INDUCTIVE REACTOR" includes both inductors and other inductive reactors, such as transformers, having more than two terminals connected to one or more windings.

12. "Bipolar" refers to a converter that can be either inverting or non-inverting between a given two ports. Bipolar also refers to a port that is capable of energizing or transferring both polarities of voltage.

13. "Bidirectional" means a) with respect to a port, that port can act as a dissipater and a generator; b) with respect to a converter that for a given two ports, power can flow into a first port and out of a second port, and at a different time, out of the first port and into the second port.

14. "Estimating" means determining the approximate voltage or current at a given location in a circuit or port either by measuring or calculation, and also includes measuring or calculating a value proportional to said voltage or current.

15. "Recirculate" or "recirculation" refers to creating a low impedance path or short circuit around an inductor such that current circulates out of the inductor, across the low impedance path or short circuit, and back into the inductor, preferably with very low losses.

16. "Direct-Coupled" means that energy moves between ports and through the inductive reactor as current flowing in a complete galvanic circuit. For example, ports that are coupled through transformers or capacitors would not be direct coupled.

FIG. 1 shows a power converter 100 using six switches S1 through S6 to connect two ports PA and PB, to inductor L (used for energy storage). This figure depicts the most general embodiment the present disclosure. It should be noted that ports PA and PB may be identical but are separately referenced to emphasize that each may be made capable of the full performance to be described below in FIG. 2 and that the ports of converter 100 are not being exchanged to obtain such comprehensive behavior. Shown accompanying, and potentially connected to, each of the two ports PA and PB of the converter 100 are three energy sources VAC, VDC−, and VDC+, and a load LD. Using the topology shown therein, all octants of energy transfer shown in FIG. 2 below may be accomplished at will using the novel switch control circuitry described hereinbelow. Any of the sources or loads shown near ports PA and PB may attach to these ports to effect any or all the energy transfer octants of FIG. 2, with two fundamental limitations.

The first limitation is that if energy-devoid loads be connected to the ports PA and PB, and no other port is present, only such energy as is held within the inductor L can be transferred to a port. The second similar limitation is that the converter 100 is usable for AC-AC conversion only if fitted with an additional port connected to an energy storage device (such as a capacitor), or if the input and output AC waves are substantially of the same frequency and remain in phase. The necessary energy storage device may alternatively be placed at PA or PB or at another port.

While a similar six switch topology is known in the prior art, no such prior art converter has been equipped with control circuitry to enable a single embodiment thereof to transfer energy from any of the sources shown in this figure to any load shown therein in any direction. Using the control circuitry of this disclosure shown below, the converter 100 can not only transfer energy from any of the sources shown, but also adjusts its operation to accommodate independent changes of any such sources from AC to DC of either polarity, or even from being energy sources to being loads.

Figure 2:
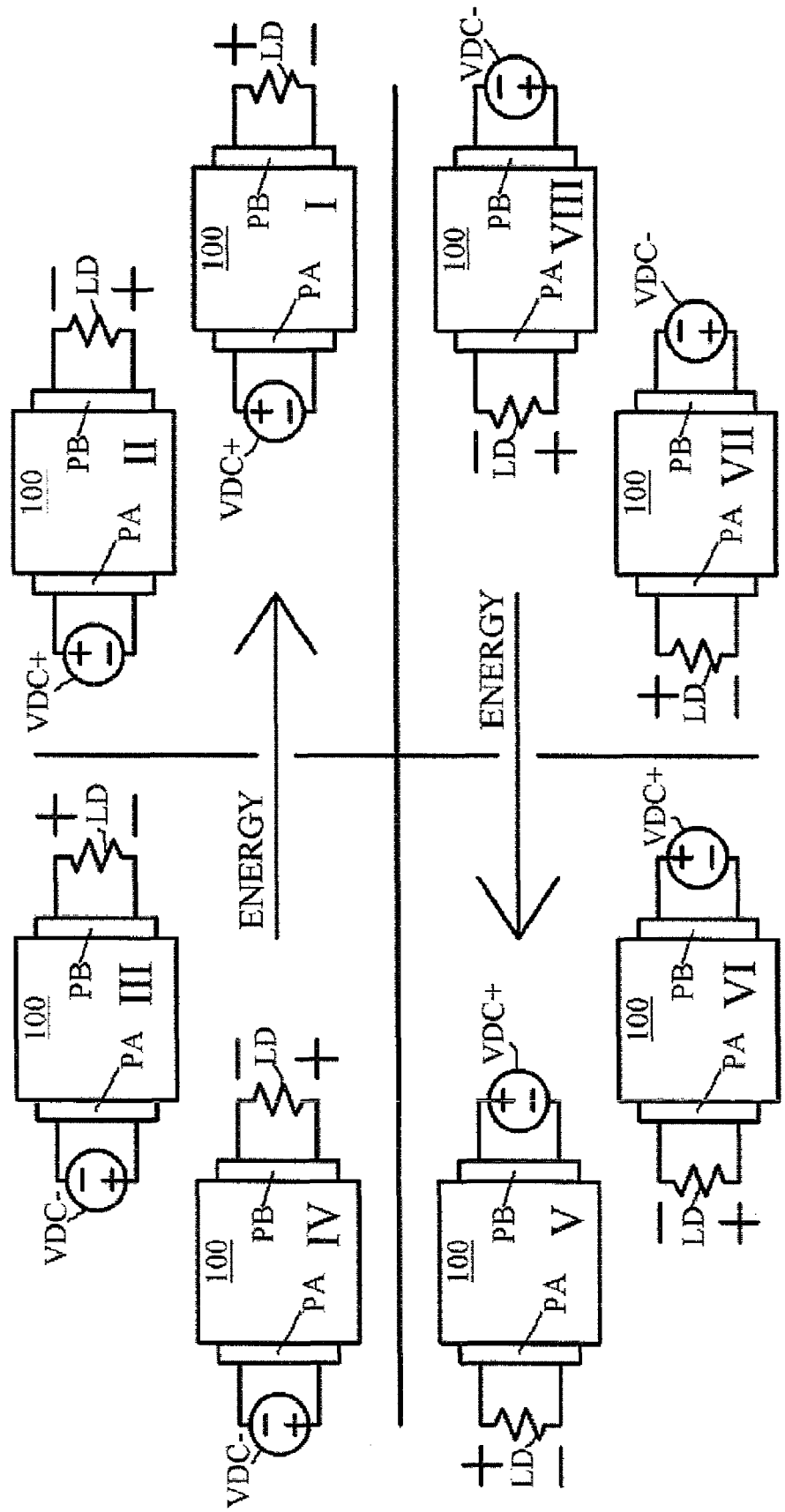
FIG. 2 depicts possible directions and polarity of energy movement between two energy moving ports of the power converter of this disclosure.

Less comprehensive sets of behavior than the set shown by all of the octants of FIG. 2 may also be performed by converter 100 including bidirectional, bipolar, unidirectional, and unipolar energy transfers. Many of the embodiments discussed below requiring less comprehensive behavior may be practiced with fewer switches than are shown in this figure, or with diodes replacing some switches.

FIG. 2 depicts eight energy movement octants, I through VIII, between two ports, PA and PB. Each octant shows an instance of converter 100 performing a unique polarity and direction of energy movement. These octants show the elemental aspects of bidirectional and bipolar energy transfer. In the first four octants port PA acts as a dissipator port (energy flowing into converter 100) and PB acts as a generator port (energy flowing out of converter 100), whereas in the last four octants their roles are reversed. In octants I, II, V, and VI, the dissipator port sinks energy from a positive source, whilst in octants III, IV, VII, and VIII the dissipator port sinks energy from a negative source, and in all the generator port sources energy to the load LD. In all even-numbered octants the ports are co-polar, but in all odd-numbered octants the relative polarities of ports are inverted. Thus we see that since either port may have either polarity, energy conversion may be from DC-DC, or DC-AC in either direction subject to energy limitations cited above. Bidirectional bipolar energy movement is supported. No known existing integrated switched-mode power-converter embodies all of these octants. These octants should not be confused with the "four quadrants" of some bipolar converters that usually indicate bipolarity of both voltage and current; clearly bidirectional current must flow in these octants. The switches S1 through S6 of converter 100 must be controlled in an ordered manner to effect the multiplicity of energy movements shown. Each octant may in fact require multiple ordered settings of these switches to perform its energy movement. To this end many switch settings, or modes, subdivide the octants shown in this figure, and are shown below in detail in FIGS. 4A-4J.

For this disclosure, the port being used as an output is called a "generator" port and may be fitted with output sensing circuit, whilst the port being used as an input is called a "dissipator" port. The energy sources shown and resistor LD shown as a load in FIGS. 1 and 2 are generic and represent any electrical energy source or sink. Such sources as DC power supplies, AC mains, and batteries are usual. Such loads as electronic circuits are typical. Various motors may also be loads, for example a DC-AC embodiment according to this figure could be used for speed control of a synchronous motor. The load LD is not limited to resistive but may be capacitive, inductive or any combination thereof. The present disclosure of this figure might be especially useful for efficient cyclic driving of piezo-electric motors, inasmuch as much energy stored in the capacitance thereof to cause a motion can be returned to a power source upon reversal of said motion.

Figure 3:
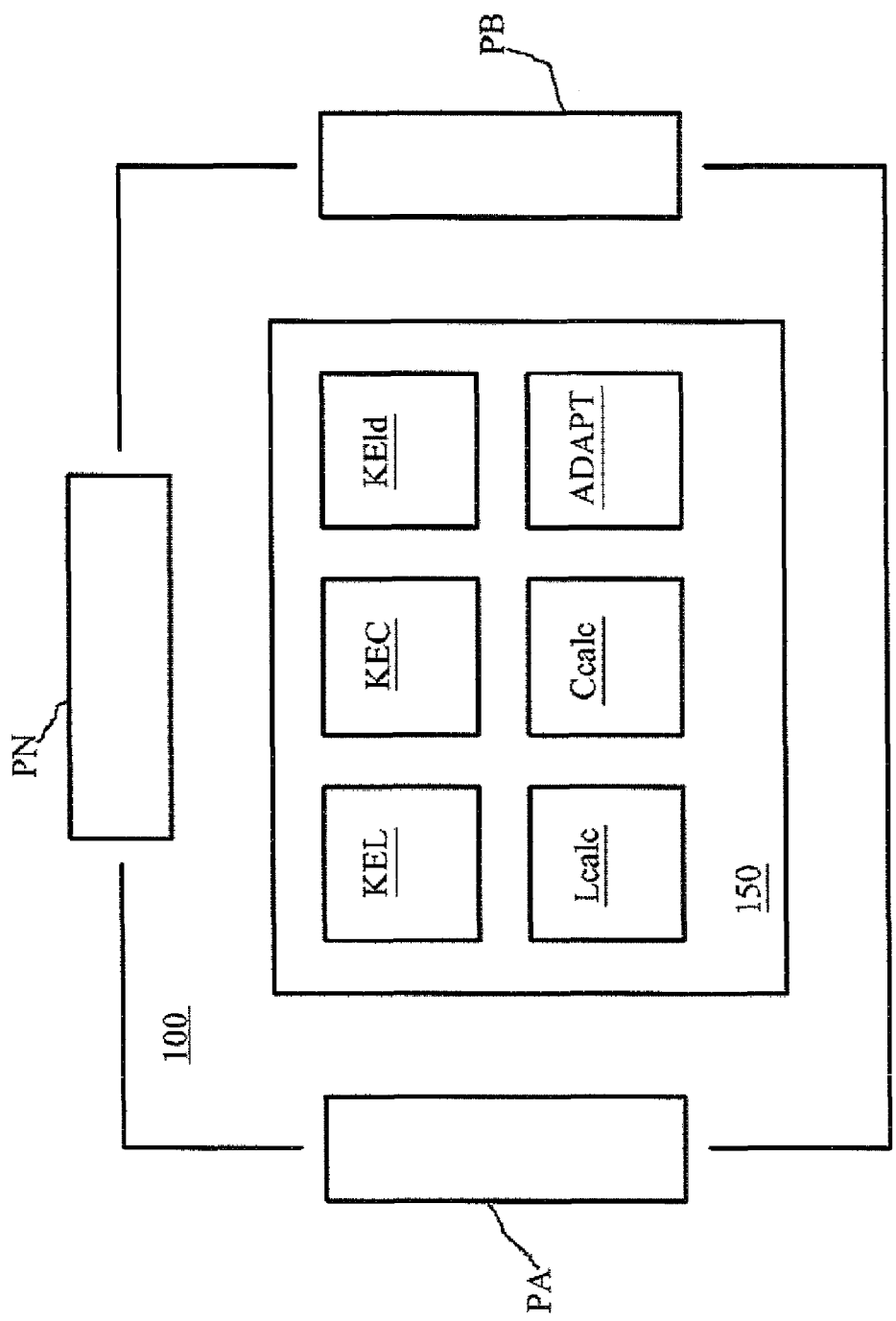
FIG. 3 depicts energy balancing functions comprised in an energy-predicting calculator that may be embedded within the power-conversion engine according to this disclosure.

FIG. 3 depicts a multi-port embodiment of the converter 100 and possible energy balancing functions comprised within in an energy-predicting calculator 150 that may be embedded within this power-conversion engine. The energy prediction methodology described herein is one novel aspect of the present disclosure. Energy balance according to this disclosure is attained when the energy predicted to be extractable from an inductive reactance substantially equals that predicted to be required by a load plus any losses, plus any deficit or minus any surplus of energy required to bring any capacitance to a desired voltage at a given time. The calculator 150 may be implemented using well-known analog or digital techniques.

When this disclosure is practiced in an energy balancing mode, it is fundamental that an inductive reactor within the engine be cyclically energized with an amount of energy supply that is predicted, upon transfer, to meet a demand until said reactor be re-energized and a new transfer accomplished. To this end, a term "KEL" within calculator 150 represents energy stored within said reactor, and sometimes represents only the extractable portion of that energy. Circuitry KEL for providing KEL may comprise circuits responsive inductive current, but may also comprise a circuit responsive to the volt-time product having been applied to said reactor, or one or more sensors responsive to the magnetic field of said reactor.

Another term "KEld" of energy balance according to this disclosure represents the predicted energy demand of a load during a time of prediction. Circuitry KEld for generating this term comprises circuitry responsive to three quantities. A current sub-term may be responsive to inductive current, but may be derived from the voltage droop across a filter capacitor during a particular time period, or may even be directly measured at a load. A voltage term is usually obtained by sensing voltage at an active port. A time term is usually generated by timing means integral to the energy-predicting calculator 150. The product of current, voltage, and time yields the term here KEld.

In many instances a load will be reactive, and usually it will be capacitive. According to this disclosure it is advantageous to use the term "KEC" to represent the energy that will be required to bring the voltage across any filter capacitance internal to and attached to an active port to a desired voltage a given time or point in a cycle. Circuitry KEC to generate KEC is usually responsive to port-voltage sensing and to a desired input signal or a voltage reference. Since KEC is predictively rather than historically calculated, its use according to this disclosure in closing the feedback loop eliminates the pole that plagues the control loops of prior-art amplifiers and power supplies, yielding unprecedented transient response.

KEL relates to inductive reactor value, and KEC relates to capacitance both internal to and attached to a port according to this disclosure. Both inductance and capacitance may vary, and capacitance variations may be sudden and large in "hot-swap" applications that are now common. To address this situation a power conversion engine according to this disclosure may comprise circuitry Lcalc and Ccalc for determining inductance and capacitance respectively to provide "L" and "C" sub-terms for energy terms, as is shown in this figure. It is usually practical to use the chopping waveform of this converter itself as the signal source for such reactance determinations.

According to this disclosure, represented by the block ADAPT of FIG. 3, it is often adequate and even advantageous to adapt to changes of reactances using a servo-loop implicitly responsive to L-C ratio rather explicit calculations based on the values of L and C themselves. Such adaptation yields excellent response to line and load transient. Response to sudden reactance changes is slightly slower, but fast enough to avoid transient component overloads, and usually fast enough to avoid data loss in most digital systems.

The mathematics of energy balancing according to this disclosure and practical means for embodying the principles thereof are fully explained in U.S. patent application Ser. Nos. 11/593,698 and 11/593,702 filed Nov. 6, 2006, which are fully incorporated herein by reference. Examples of circuits appropriate for the KEL, KEld, KEC, Lcalc, and Ccalc, portions of calculator 150 are depicted and fully explained in these applications as well.

FIGS. 4A-4J depict different modes of a switching arrangement for the bidirectional and bipolar transfer of energy between non-isolated ports using an inductor L and six switches S1 through S6. FIGS. 4A-4J show one-half of a matrix, the other half of which is identical to the portion shown, save that all polarities and all arrows depicting current flow are to be reversed.

Figure 4G:
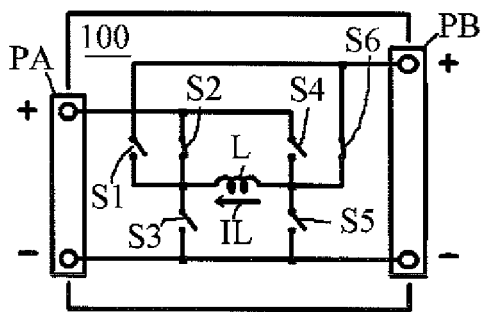
Figure 4J:
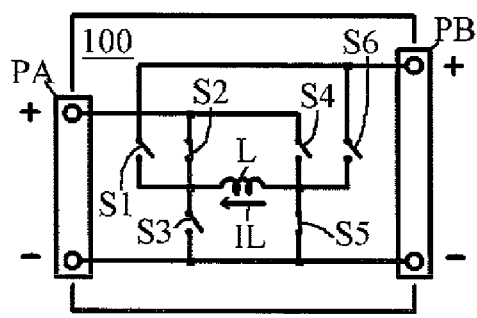
Figure 4H:
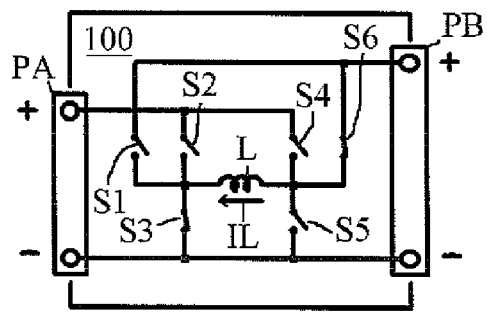
Figure 4I:
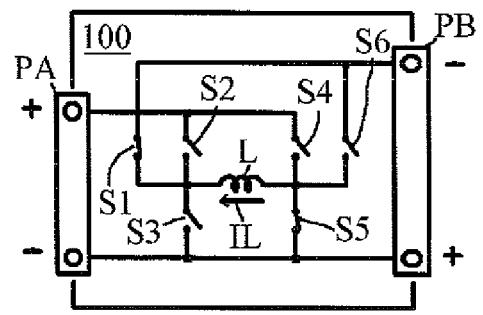
Figure 5A:
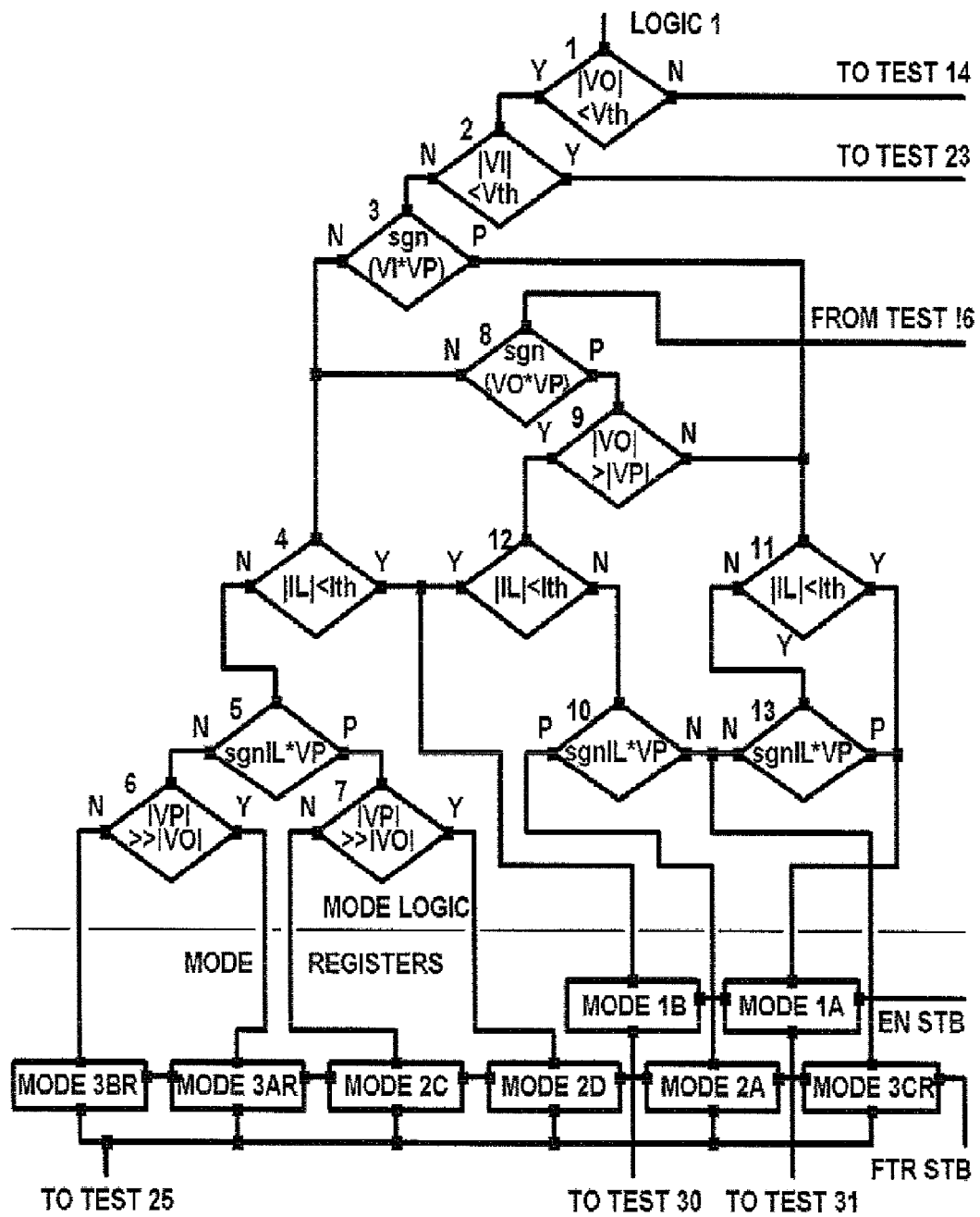
FIGS. 5A-5D show different portions of a flowchart depicting the logic to implement a bipolar, bidirectional, buck-boost, energy-balancing, synchronous power-conversion amplifier using the converter of FIGS. 4A-4J.
Figure 5B:
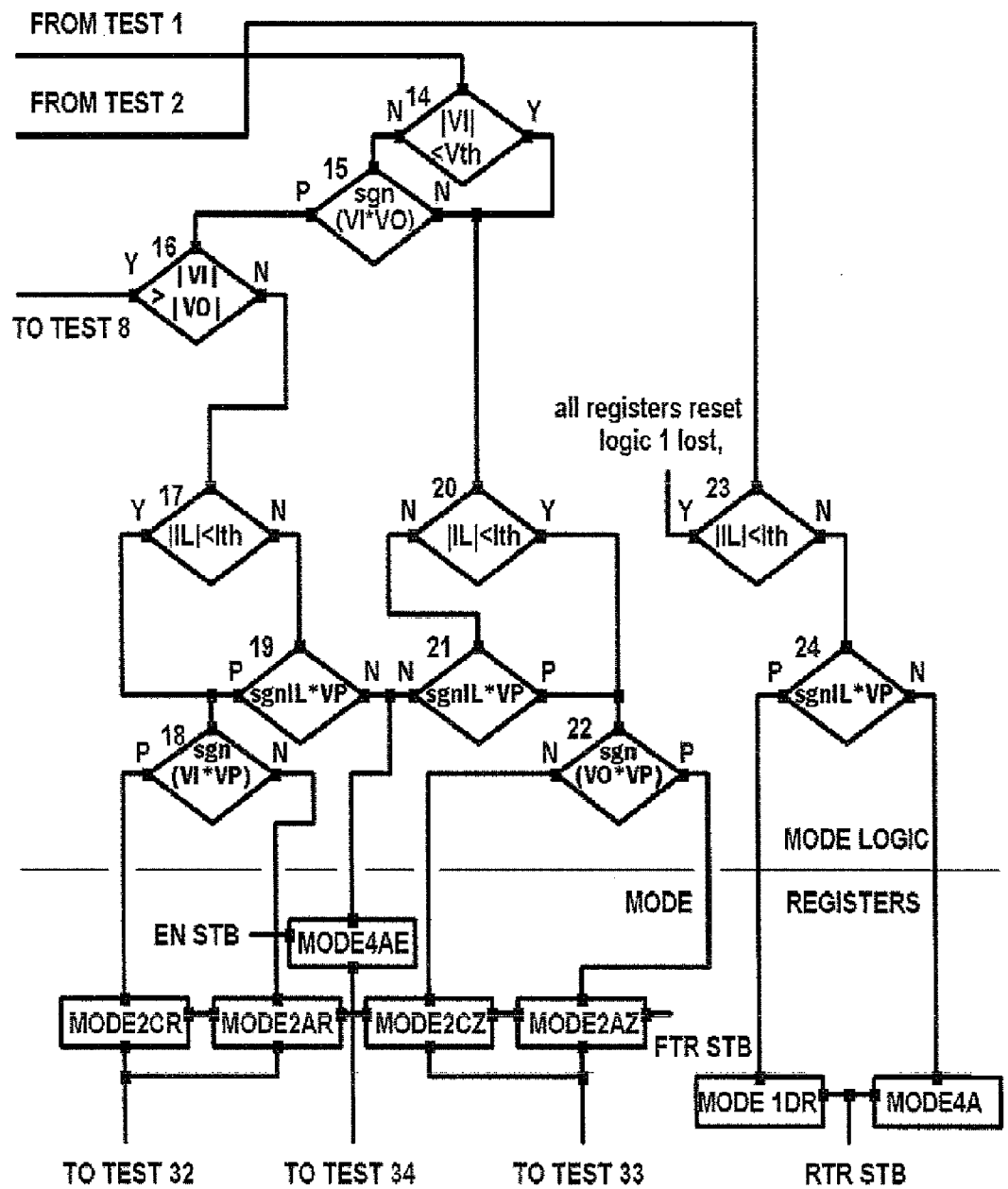

For all the functions shown in FIGS. 4A-4J to be performed in all polarities, with all the modal flexibility shown in FIGS. 5A and 5B, the switches shown must all be present and bipolar in blocking ability. To perform subsets of the functions shown, some switches may be omitted, replaced by unidirectional switches, or replaced by diodes. Many well-known switching power supplies and amplifiers are represented by portions of the matrix of FIGS. 4A-4J, but none embody a sufficient portion of this matrix to perform bidirectionally bipolar energy transfers.

The suffix "R" in a mode name means energy is flowing in reverse of typical path (either from PB into inductor or from inductor out to PA). The suffix "Z" in a mode name means that the mode is used when the current in the inductor is crossing zero. The suffix "E" in a mode name means that the mode is a reverse energizing mode. For any mode (for example IIA, IIAR and IIAZ or IVA), whether it is the forward mode, reverse mode, reverse energizing mode or zero crossing mode, the switches are in the same position and current is moving the same way through the inductor, the only difference being the test used to end the mode. Certain modes may have the same switch configuration as other modes (for example Modes IIC and IIIC) but the current is flowing in different directions through the inductor.

FIG. 4A, Mode IA depicts a buck converter being energized. In this mode energy moves between ports as well as into the inductor.

FIG. 4D, Mode IIA depicts a converter transferring energy. Mode IIA performs non-inverting forward transfers regardless of the cause of inductive energy. The combination of Modes IA and IIA constitutes a well-known buck converter. Mode IIA is used when the PA voltage is copolar with inductor current.

FIG. 4I, Mode IIICR depicts a converter transferring energy. Mode IIICR performs non-inverting forward transfers regardless of the cause of inductive energy, just as does Mode IIA. Mode IIICR is used when the PA voltage is not copolar with inductor current.

FIG. 4D, Mode IIAR depicts a converter energizing its inductor by removing energy from a port to lower the voltage at that port. In this mode the converter is inverting. The switch configuration of Mode IIAR is identical to Mode IIA, but the test for ending the mode is based upon the output voltage becoming less than the input voltage. Mode IIAR is an energize mode, but is responsive to transfer strobes.

FIG. 4D, Mode IIAZ depicts a converter energizing its inductor by removing energy from a port to lower the voltage at that port. To begin this mode, the converter is non-inverting. However during this mode the output voltage will likely pass to, or even through zero. The switch configuration of Mode IIAZ is identical to Modes IIA and IIAR, but the test for ending this mode is the depletion of inductive current. Mode IIAZ uses quasi-resonant behavior of the inductor acting with an output capacitor to pass the energy of undesired-polarity output voltage into the inductor. When the voltage reaches zero, current in the inductor charges the output capacitor to reverse its polarity. Mode IIAZ is an energize mode, but is responsive to transfer strobes.

FIG. 4B, Mode IB depicts a flyback or inverting converter being energized. Mode IB is used for both non-inverting and inverting energization. In this mode energy moves only into the inductor. The combination of Modes IB and IIA constitutes a well-known non-additive, or "bridging", flyback converter. Modes IB and IIC form a well-known inverting converter.

It should be noted at this point that the buck converter without transformer action is incapable of boosting voltage. The prior art flyback converter without transformer action can produce voltages within the range of the buck converter, but incurs the difficulty that very low voltages require very long times to transfer all energy from the inductor. With limited time available for transfer, this use tends toward continuous conduction, which in prior art has been a relatively volatile mode of operation for a flyback converter. Prior art flyback converters tending toward continuous conduction may draw large currents when a capacitive load must be driven away from zero volts, which problem engenders the need for many well-known "soft-start" circuits. The well-known "buck-boost" converter, implementing buck modes for lower voltages and flyback modes for higher voltages, is a good choice for the smooth unipolar, unidirectional charging of capacitive loads.

FIG. 4C, new Mode IDR transfers inductive energy into PA to return same to the energy source when the current in the inductor and the voltage at PA are copolar. This allows for the efficient draining of energy from the inductor when the energy is not needed by the load at PB. Returned energy to the energy source at PA may result in more efficient use of overall energy. Where the PA energy source is a battery the returned energy may recharge the battery. Where the PA energy source is a power supply the energy may be stored in the supply output capacitor or otherwise used by the power supply to reduce the overall energy requirements of the system.

FIG. 4J, Mode IVA is just like Mode IDR, but is used when the current in the inductor and the voltage at PA are not copolar.

FIG. 4J, Mode IVAE is an auxiliary mode that works just like Mode IVA, but is used when the next mode will be intolerant of non copolar current. This occurs mainly in straddling situations when converter input voltage has changed polarity but converter output polarity has not. Mode IVAE is ended when inductor current becomes insignificant. It should be noted that Mode IVAE is a reverse energizing mode. Mode IVAE is provided to prevent possible endless loops in the flowchart should a wrong-way current be encountered for a short time when crossing zero, but this infrequent condition is difficult to invoke, and even then would last for but a short time. Though a mode is difficult to invoke, its absence could incur a converter malfunction.

FIG. 4E, Mode IIC performs inverting forward transfers regardless of the cause of inductive energy when the current in the inductor and the voltage at PA are copolar.

FIG. 4H, Mode IIIBR is like Mode IIC, and performs inverting forward transfers regardless of the cause of inductive energy when the current in the inductor and the voltage at PA are not copolar.

FIG. 4E, Mode IICR depicts a converter energizing its inductor by removing energy from a port to lower the voltage at that port. In this mode the converter is non-inverting. The switch configuration of Mode IICR is identical to Mode IIC, but the test for ending the mode is like that of IIAR, to which this mode is analogous. Mode IICR is an energize mode, but is responsive to transfer strobes.

FIG. 4E, Mode IICZ depicts a converter energizing its inductor by removing energy from a port to lower the voltage at that port. To begin this mode, the converter is inverting. However during this mode the output voltage will likely pass to, or even through zero. The switch configuration of Mode IICZ is identical to Modes IIC and IICR, but the test for ending this mode is identical to that of Mode IIAZ, to which this mode is analogous. Mode IICZ is an energize mode, but is responsive to transfer strobes.

FIG. 4F, Mode IID performs inverting forward transfers regardless of the cause of inductive energy when the PB voltage, VO, is small. By placing PB in series with PA it avoids unduly long times that might otherwise be required to de-energize the inductor at a low voltage. Mode IID is used when the PA voltage is copolar with inductor current.

FIG. 4G, Mode IIIAR performs inverting forward transfers regardless of the cause of inductive energy when the PB voltage, VO, is small, just as does Mode IID. Mode IIIAR is used when the PA voltage is not copolar with inductor current.

The modes of FIGS. 4A-4J, together with those of its corresponding polarity and current-reversed matrix-half, comprise a bipolar, bidirectional, power-conversion engine capable even of being used as an amplifier with regenerative load-energy recovery. Subsets and supersets of this matrix may be used to form amplifiers, motor-controllers, frequency-converters, and many types of power-supplies, some presently-known and some novel. Prior art bidirectional converters and bipolar converters use subsets of FIGS. 4A-4J, but are not both bidirectionally bipolar in operation. It should be noted that though FIGS. 4A-4J show six switches, S4 is used only in new modes that improve performance. Either S4 or S1, and modes using same, may be omitted to practice bipolar, bidirectional power conversion according to this disclosure. It should further be noted that some of the switches of FIGS. 4A-4J may be replaced by diodes to embody subsets of its mode matrix. Some of these sub-sets correspond to well-known power converters and other subsets are new.

FIGS. 5A-5D show different portions of a flowchart depicting the sequencing of the hardware functions shown in FIGS. 4A-4J necessary to implement a bipolar, bidirectional, buck-boost, energy-balancing, synchronous power-conversion amplifier using an inductor. Power supplies and amplifiers that may be unipolar, unidirectional, buck or boost, non-energy balancing, or asynchronous, including well-known prior art apparatus, are partial implementations of the hardware matrix of FIGS. 4A-4J and correspondingly partial implementation of the flowchart of FIGS. 5A-5D.

An arbitrary rule convenient for operation of the apparatus of FIGS. 5A-5D is that whenever a particular phase of operation has been completed, a series of tests is initiated to determine whether energy exists in the inductor L of FIGS. 4A-4J and, if there is, what subsequent function best accomplishes a desired power-conversion function and, if there is not, whether it is desirable to energize said inductor. If an energy balancing conversion is performed, such energization will be responsive to an energy balance term that indicates whether such energization has become adequate for that mode or a subsequent transfer mode.

Operation may arbitrarily be traced from the point marked LOGIC 1 at the top of FIG. 5A. Though illustration of the functions of FIGS. 5A-5D as a flowchart eases understanding, and is naturally adapted to a digital processor, it should be understood that FIGS. 5A-5D may also represent a registered memory containing a table of states, with only one of the fifteen modes shown allowed be active at any time. Implementation of FIGS. 5A-5D by such means as a processor requires that care be taken to avoid intermediate illegal states or combinations of states that might cause power converter runaway or a loop of operations lacking an exit. In FIGS. 5A-5D, the modes labeled indicate the correspondingly labeled elements of the matrices of FIGS. 4A-4J.

A path to logic 1 lost shown on FIG. 5B begins with test 1 to determine whether or not significant VO is present. With no VO, test 2 determines whether significant VI is present. The absence of both indicates that nothing is to be done to VO, but since L may contain energy, test 23 is needed. If L is exhausted, nothing need be done. However, if L has energy it should be returned to VP, the energy source attached to PA. If the current in L is copolar with VP, test 24 selects Mode IDR to return that energy, otherwise Mode IVA is used for the same purpose. As a practical matter the test see whether there is any VO, VI or inductor current compares theses values to a small threshold value, and if the value is less than the threshold, it is approximated as zero.

Turning again to test 2, if VI exists and VO does not, energy will be needed to increase VO. If VI and VP are non copolar, some inverting means of getting energy to VO is needed, and test 3 is followed by test 4 to determine whether L has energy to contribute. If it does, test 5 determines the copolarity of that current with VP, and if non-copolar test 6 determines whether VP is much larger than VO. Since we just followed a no-VO path, this will be true and Mode IIIAR will be selected. Had we arrived here by another path with a larger VO, Mode IIIBR would have been selected. Had test 5 determined copolarity, either Mode IIC would have replaced Mode IIIBR or Mode IID would have replaced Mode IIIAR.

Turning again to test 4, if L had no current, Mode IB would be used to energize it to prepare for a likely future inverting forward transfer by Mode IIIBR, IIIAR, IIC, or IID. When the current in the inductor rises above the threshold current the result of test 4 switches to "no" and returns to test 5 as described above.

Turning again to test 3, had VI been copolar with VP, test 11 would determine whether L has energy. If it does, test 13 determines whether its current is copolar with VP. If it is not copolar, Mode IIICR will be used to move that energy usefully to PB, but if it is copolar, or if test 11 determines it to be zero, Mode IA will vigorously slew VO. Since a no-VO path lead here, there is no danger that VO exceeds VP.

Returning to test 1, if VO exists test 14 determines whether VI exists. If there is VO but no VI it will be necessary to remove energy from PB and return it to P. To do this, test 20 determines whether L has current. If it does not, test 22 will select either Mode IICZ or IIAZ, depending on the copolarity of VO with VP to move energy from PB to L, which will continue until IL has grown and then shrunk to zero, and VO has been reversed in polarity, or until VO has attained equality with VI.

Returning to test 20, if L has current that is copolar with VP, subsequent performance of Mode IICZ or IIAZ is selected by test 22 as with no current, but will be accomplished more quickly. However non copolar IL and VP would malfunction in Modes IICZ and IIAZ, so in this event test 21 selects Mode IVAE to return this ill-polarized energy to PA.

Returning to test 14, there may exist a VI, which may or may not be copolar with VO. If test 15 determines non-copolarity, a straddling condition exists which, proceeding to test 20, is handled like a no-VI case. However, whereas a no-VI case would require VO slewing only to zero, the straddling case exploits the quasi-resonant polarity reversing abilities of Mode IICZ and IIAZ smoothly to slew VO to the other side of zero. It should be noted that L and any C at PB, when switch-connected, form a lumped element transmission line with a finite cutoff frequency unable to pass a fast-slewing waveform. The quasi-resonant method yields smooth slewing with the fastest practical slew rate.

Returning to test 15, if straddling is absent, test 16 determines whether energy must be moved to or from PB. If VO is less than VI, energy must be added to PB, which leads to test 8. Test 8 determines whether inversion is needed, and if so, the same path through test 4 occurs as when no VO was present. If, however, no inversion is needed, test 8 leads to test 9 to see whether VO is greater than VP. If VO is greater, a flyback mode must be used, leading to test 12. Test 12 determines whether L has energy to contribute to PB, and if it does not L must be energized by Mode IB. If L has energy, test 12 leads to test 10 to determine copolarity of IL with VP. Copolarity leads to delivery of the energy of L to PB through Mode IIA, and non-copolarity leads to analogous delivery through Mode IIICR.

Returning to test 9, a small VO leads to test 11 to ascertain IL, in the absence of which it is appropriate to invoke Mode IA. However, if IL flows, test 13 determines whether IL is copolar with VP. If it is not copolar, Mode IIICR is used to move the energy of L to PB. If IL is copolar, Mode IA slews VO vigorously.

FIGS. 5A-5D show two modes of forward energization, Mode IB, a flyback mode, and Mode IA, a buck mode. Since switch on-times in power converters are related to volt-time product, low voltages incur long times to move inductive energy. Thus the flyback mode is preferable to the buck mode when a generator port voltage exceeds a dissipator port voltage and vice-versa. With a simple, two-terminal inductor converter no way exists to make the same inductor simultaneously a current sink to a dissipator port and a current source to a generator port of opposite polarity. Therefore the buck mode is limited to energy movements where the dissipator and generator ports are copolar. Accordingly, all FWD non-buck energizations share energizing Mode IB. It should be noted that buck Mode IA possesses simultaneous EN and TR energy moving ability. (EN meaning energy is transferred from PA to inductor and TR meaning energy is transferred from inductor to PB.) It may be seen and should be noted that though Mode IA works smoothly, since it cannot provide to an inductor inverting modes its use results in asymmetrical plus and minus slews below the absolute value of VP. Therefore Mode IA should be omitted and Mode IB and an appropriate transfer mode substituted for any amplifier applications where waveform symmetry is paramount.

In a synchronous converter, the tests above the row of mode registers of FIGS. 5A and 5B are continually being performed, so the data on the register inputs represents the best mode for the next upcoming clock or trigger. The timing generator logic comprises priority circuitry to allow energize Modes IA, IB, IVAE to be selected only at the time of a synchronous clock. The strobes for each mode register set may comprise an update strobe to latch in new data, and a reset strobe to de-select a register set. At synchronous clock time, any mode may be selected. At the time of a first asynchronous trigger, modes other than IA, IB, and IVAE may be selected. At the time of a second asynchronous trigger, only reverse transfer modes IVA and IDR may be selected and all other modes are reset.

With an energy demand and a lack of inductive energy, the appropriate task is to energize the inductor, but with the inductor energized, its energy needs to be moved to a port using a forward transfer mode, IIA, ITC, IID, IIIBR, IIIAR, or IIICR, any of which may commence either at synchronous clock or at first asynchronous trigger. If excess inductive energy exists, the forward transfer mode may be terminated and a second asynchronous trigger generated. Also, a forward transfer mode may be skipped. At a synchronous clock, at a first asynchronous trigger, or at a second asynchronous trigger, a reverse transfer mode may commence to return excess inductive energy to the power source attached to VP. A reverse transfer may end in one of two ways. One way is exhaustion of inductive energy, after which the inductor may rest de-energized until a next cycle begins. A second way is that the time allotted for this mode has ended. It should be noted that a single cycle of a synchronous converter of this disclosure may comprise many intervals in which different modes are selected to facilitate the most timely and accurate disposition of energy in response to port demands and conditions. (Three different modes are not meant to be a limitation and the use of more modes is within the scope of the disclosure.) An aspect of this disclosure shown in this figure provides for three selected modes followed by a default idle mode, the latter sometimes being a de-energized occurrence of another mode such as Mode IDR. Such a default idle mode actually corresponds to the idle or null mode of prior art converters. Thus, during a conversion cycle, this disclosure, unlike prior art converters, may comprise four modes, three of which may move energy. The first two, an energizing mode and a forward transfer mode are usual in the prior art. The inclusion of a reverse transfer mode within a converter cycle of this disclosure contributes to its excellent efficiency, transient response, and low input and output ripple. At this point it is necessary to emphasize a fundamental difference between this disclosure and prior art. Prior art power converters usually follow much simpler rules in transferring energy. In most converters a transfer mode follows a energizing mode and vice-versa. According to this disclosure, whenever a mode ends a new decision is made about how best to move energy within the converter.

The power conversion processes of FIGS. 5A-5D may be implemented with or without energy balancing. If energy balancing is not used, the tests pertaining thereto are simply omitted. Omission of energy balancing requires a feedback loop based on VO filtration rather than prediction, and incurs a pole in the feedback loop, which tends toward imprecise inductor energization in any given cycle, and often engenders in multi-cycle correction and consequent sub-harmonic ripple on VO.

Figure 5C:
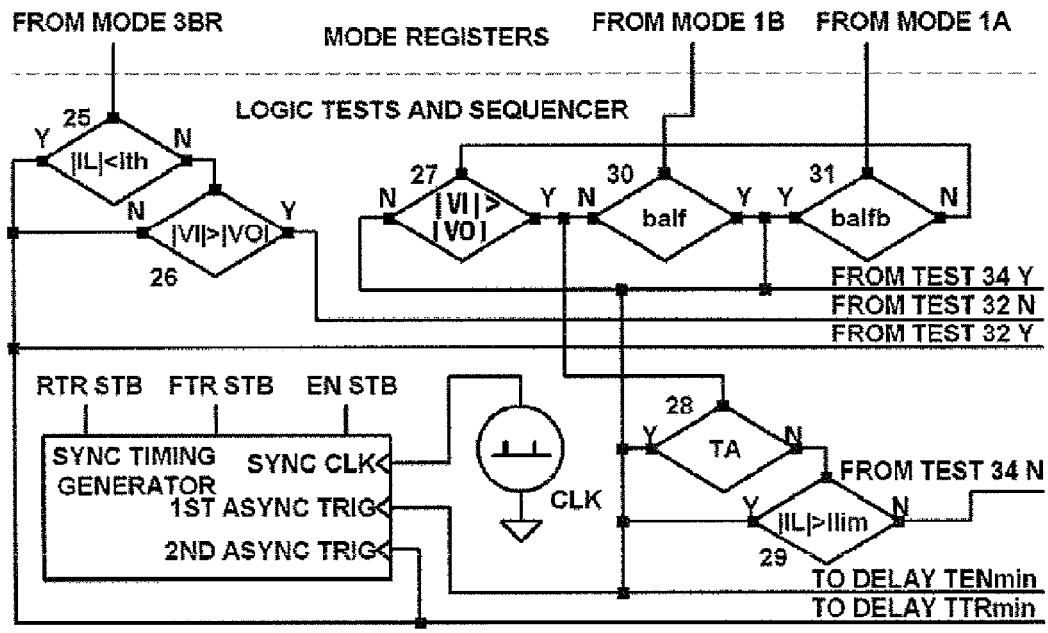
Figure 5D:
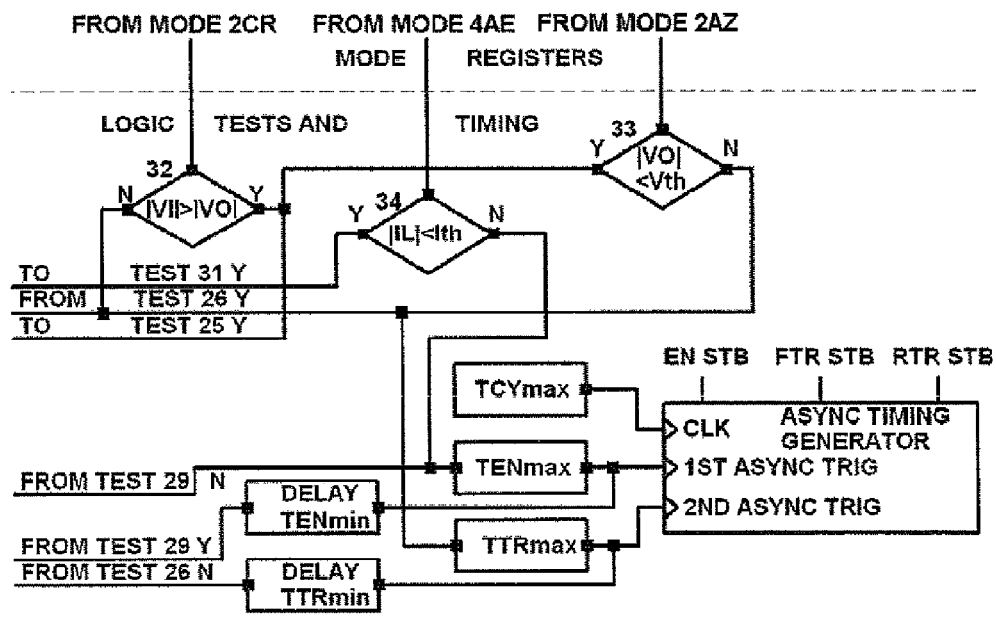

Just as FIGS. 5A and 5B illustrate the logical decisions required appropriately to initiate modes, FIGS. 5C and 5D illustrate both the decisions needed to terminate modes and the timing of such mode endings needed to facilitate orderly progression to a next appropriate mode. Modes 3BR, 3AR, 2C, 2D, 2A, and 3CR are all complete when the current in the inductor is exhausted. Therefore, test 25 initiates a second asynchronous trigger after exhaustion of inductor current in any of those modes. A second asynchronous trigger evokes a Reverse TRansfer STroBe, but that strobe can initiate Mode IDR or 4A only if inductor current exists, so these modes are not invoked. If inductor current is not exhausted, test 26 monitors whether VI exceeds VO. If it does not, VO is unnecessarily large, so the inductor energy is not needed at the output port, and will be returned to VP when the second asynchronous trigger and the RTR STB invoke either Mode IDR or IVA. However, if VI exceeds VO the original mode will continue.

If the power converter includes energy prediction, Mode IB will be terminated upon attainment of forward balance by test 30 to generate a first asynchronous trigger which can make either an Forward TRansfer STroBe or an RTR STB, initiating some kind of transfer form the inductor. If prediction is absent or balance is not attained, test 28 is made for Turn-Around which also can result in a first async strobe which will end the energizing Mode IB and invoke some sort of transfer mode. Likewise if TA is not reached, but a current limit is reached, test 29 aborts Mode IB.

Mode IA is a buck mode and may use balance test 31. If balance occurs, the path is the same as just described for Mode IB balance. However if balance is not reached, or is absent, test 27 monitors whether VO has gotten too large. If it has, Mode IA is ended as previously described. If it has not, tests 28 and 29 continue to monitor their variables as described above and stand ready to end Mode IA.

Mode IVAE occurs infrequently and is provided to prevent the converter from getting caught in an endless loop. Mode IVAE is initiated only at the start of a chopping cycle and, through test 34, results in a first or second asynchronous trigger depending respectively on whether or not inductor current has become insignificant.

Test 32 generates a second asynchronous trigger whenever Mode IICR or IIAR reduce VO to less than VI, invoking Modes IDR or IVA as described above.

Modes IICZ and IIAZ are terminated by test 33 when an undesired VO has been substantially eliminated.

Both a synchronous and an asynchronous timing generator are shown in FIGS. 5C and 5D, only one of which would be used at one time in any given converter. Both function similarly accepting a beginning clock and two asynchronous events. In the synchronous case, the beginning is a synchronous clock, but in the asynchronous case the beginning is merely the delayed end of the last chopping cycle. The energize Modes IB, IA, and IVAE may occur only at clock time. If they do not occur an FTR mode may be initiated instead. If an FTR mode does not occur, an RTR mode may occur. In like manner, either an FTR or RTR mode may occur at a first asynchronous trigger, but not an energize mode. A second asynchronous trigger may evoke only an RTR mode. This priority of action is enforced by circuitry of the timing generator.

The action of this timing generator working with the modes of this disclosure produces novel behavior. Most prior art power converters commonly execute energize modes and forward transfer modes. Many also have a default null or "do-nothing" mode exemplified by the state of the discontinuous flyback converter after the inductive energy has been exhausted.

It should be noted that in Mode IB, VO will not respond to the energy being imparted to the inductor until another mode is selected. If a prior art feedback loop be attached to VO, that feedback loop will be open until Mode IB is done. According to prior art, energy will be dispensed based on the history of previous cycles held in an output filter, and a pole will occur in the feedback loop. However, if the energy-balance generator of FIG. 10 described below be employed according to this disclosure, predictions made thereby will asynchronously terminate Mode IB when the correct amount of energy has been imparted to the inductor. Then a subsequent transfer will result in VO arriving at substantially the correct voltage desired with no excess or lack of energy, obviating the need to correct VO in subsequent cycles.

More complex and less complex forms of the disclosure of FIGS. 4A-4J and 5A-5D are practical. Many incomplete forms are novel and others exist in the prior art. For example, the well known buck converter is a sub-set of FIGS. 4A-4J and 5A-5D, using only Modes IA and IIA. Unlike prior art converters, FIGS. 4A-4J and 5A-5D depict a new power conversion apparatus and method respectively, that implement bipolar, bidirectional energy transfers, making possible not only power supplies, but also switched mode power amplifiers, and other useful devices. Moreover, the bidirectional energy-moving ability of this disclosure facilitates return of excess energy to a power source, facilitating power converters of higher overall efficiency than prior art means. Not only that, but extension of the principles of FIGS. 5A-5D, for example, switching sense means from PB to PA of FIGS. 4A-4J to exchange active and passive ports enables not only bidirectional energy transfer but also bidirectional regulation. Even more capability can be added by using the same principles with more than two energy-moving ports.

While it is practical to embody this disclosure to perform in a well-known continuous current mode (CCM), as is described below in FIG. 14, adding complexity of that function to the already complex function of FIGS. 5A-5D might prove unwieldy, so this discussion of FIGS. 5A-5D is limited to the well-known discontinuous current mode (DCM).

It should be noted that FIGS. 5A-5D represent but one of many practical algorithms for operating the switches of FIGS. 4A-4J. Other algorithms are practical, for example a CCM converter in which the inductor often carries a reservoir of excess energy can improve transient response with but a slight efficiency loss.

Figure 6A:
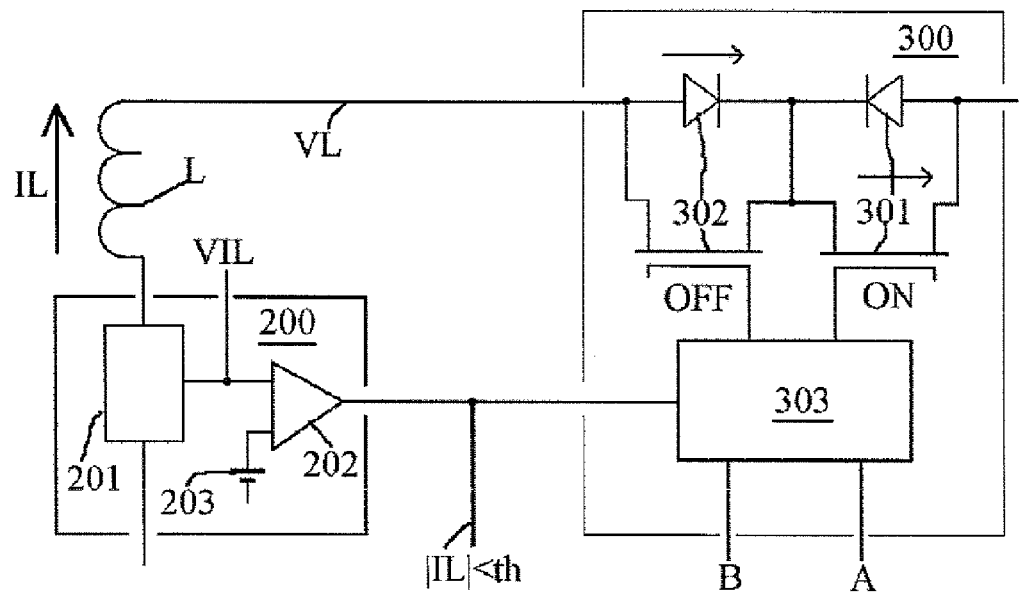
FIGS. 6A-6C depict different modes of a bidirectional switch suitable for use in this disclosure.
Figure 6B:
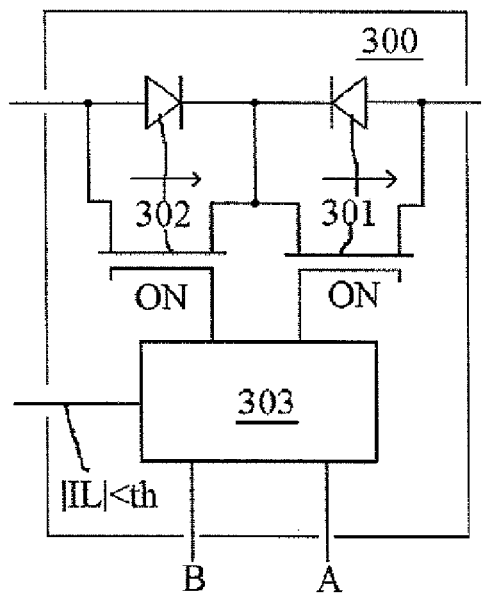
Figure 6C:
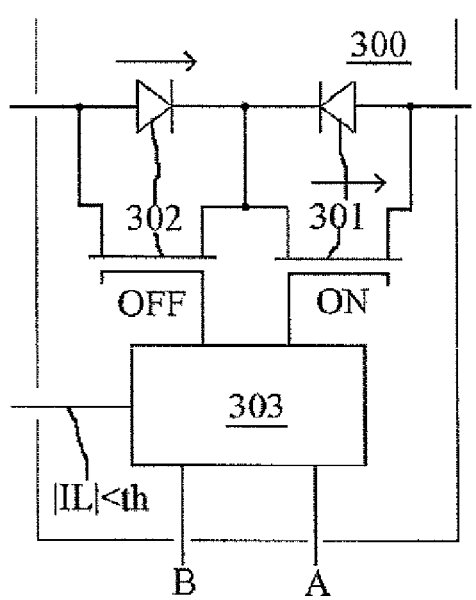

FIGS. 6A-6C depict different modes of a bidirectional switch 300 suitable for use in the present disclosure in which two MOS switches 301 and 302 are disposed so that their body diodes block in both directions; NMOS or PMOS switches could alternatively be used.

It should be noted that FIGS. 6A-6C depict a convenient, but not necessary, way to embody switches according to this disclosure, BJTs, IGFETs, thyristors, magnetic amplifiers also being practical or any other type of power switch, direct coupled or isolated, whether now known or hereinafter invented, may be used. In certain embodiments, where all modes are not necessary, switches may be eliminated with either an open or closed circuit, or switches may be replaced by a diode.

FIGS. 6A-6C are divided into three sub-figures, FIGS. 6A, 6B, and 6C. FIG. 6A also depicts circuitry responsive to the current IL in the inductor L. Referring first to FIG. 6A, there is shown current comparing circuitry 200 including a current, or other inductive energy, sensor 201 which generates a signal VIL that is used within 200 and in FIG. 10 below. Comparator 202 compares VIL with a threshold source 203 and, if IL is insignificant generates the signal IL<th used in the tests of FIGS. 5A-5D. The signal IL<th flows into switch 300 where switch logic 303 uses it to control transfer modes. Switch logic 303 is fitted with two control inputs, A and B for individually controlling the FETs 301 and 302. For transfer modes these inputs A and B are individually controlled, but for energize modes both are usually simultaneously exerted.

Figure 7:
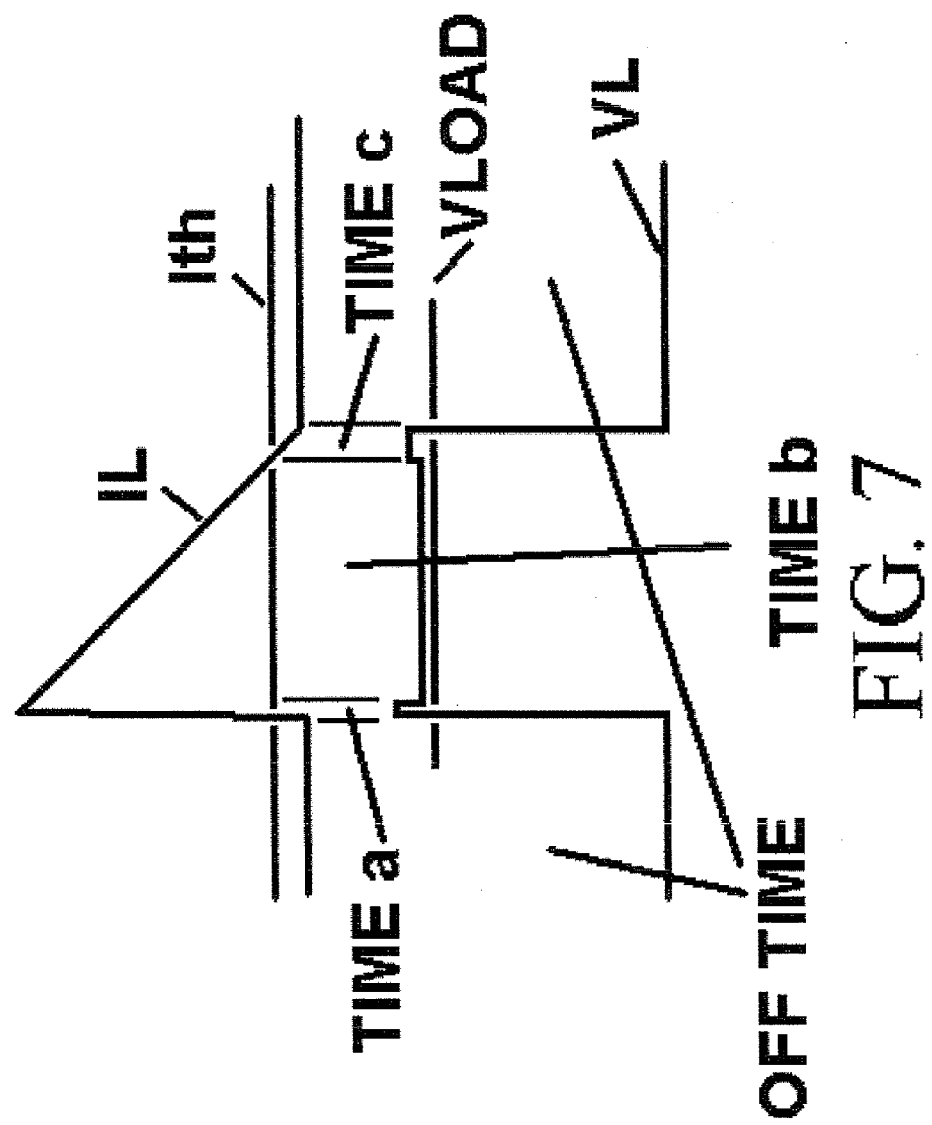
FIG. 7 depicts current and voltage related to the switch shown in FIGS. 6A-6C.

Referring to FIG. 6A and to FIG. 7, switching is preceded by an off time during which no current would flow even if FET 301 of FIG. 6A were on. Most likely this time is an energizing mode. It is practical to turn on FET 301 during this time to avoid having no current path for the inductor should the present mode cease.

When conduction from another mode ceases, inductor current continues, causing VL to swing positive, initiating the conditions shown in FIG. 6A corresponding to TIME a of FIG. 7. Current IL flows in the body diode of FET 302, during which time VL rides about one diode-drop above load voltage Vld. This current is sensed by the current sensor 201 and compared with a current threshold 203.

When current IL exceeds said threshold, switch logic 303 initiates the condition shown in FIG. 6B, corresponding to TIME b of FIG. 7 by turning on FET 302 which now acts as a synchronous rectifier, reducing diode losses.

When inductive energy is nearly exhausted and current IL drops below said threshold 203, switch logic 303 initiates conditions depicted in FIG. 6C, corresponding to TIME c, by turning off FET 302. Conduction now resumes in the body diode of FET 302 until residual energy is exhausted or until another mode turns off FET 302. TIME c of FIG. 7 is the state of having attained the end of the condition "until Ith" and would result in a yes Y decision in any |IL|<Ith test of FIGS. 5A-5D.

The temporal separation of the three conditions of FIGS. 6A-6C and 7 prevents undesirable simultaneous conduction, or "shoot-through", when switching between the modes of FIGS. 4A-4J. With the switch timing of FIG. 7 used for transfers as just described, there is but little time in which a circuit around the inductor is incomplete, minimizing energy loss in snubbers.

FIG. 7 depicts as waveforms the switching action of FIGS. 6A-6C as it passes through the three conditions, as just described.

Figure 8:
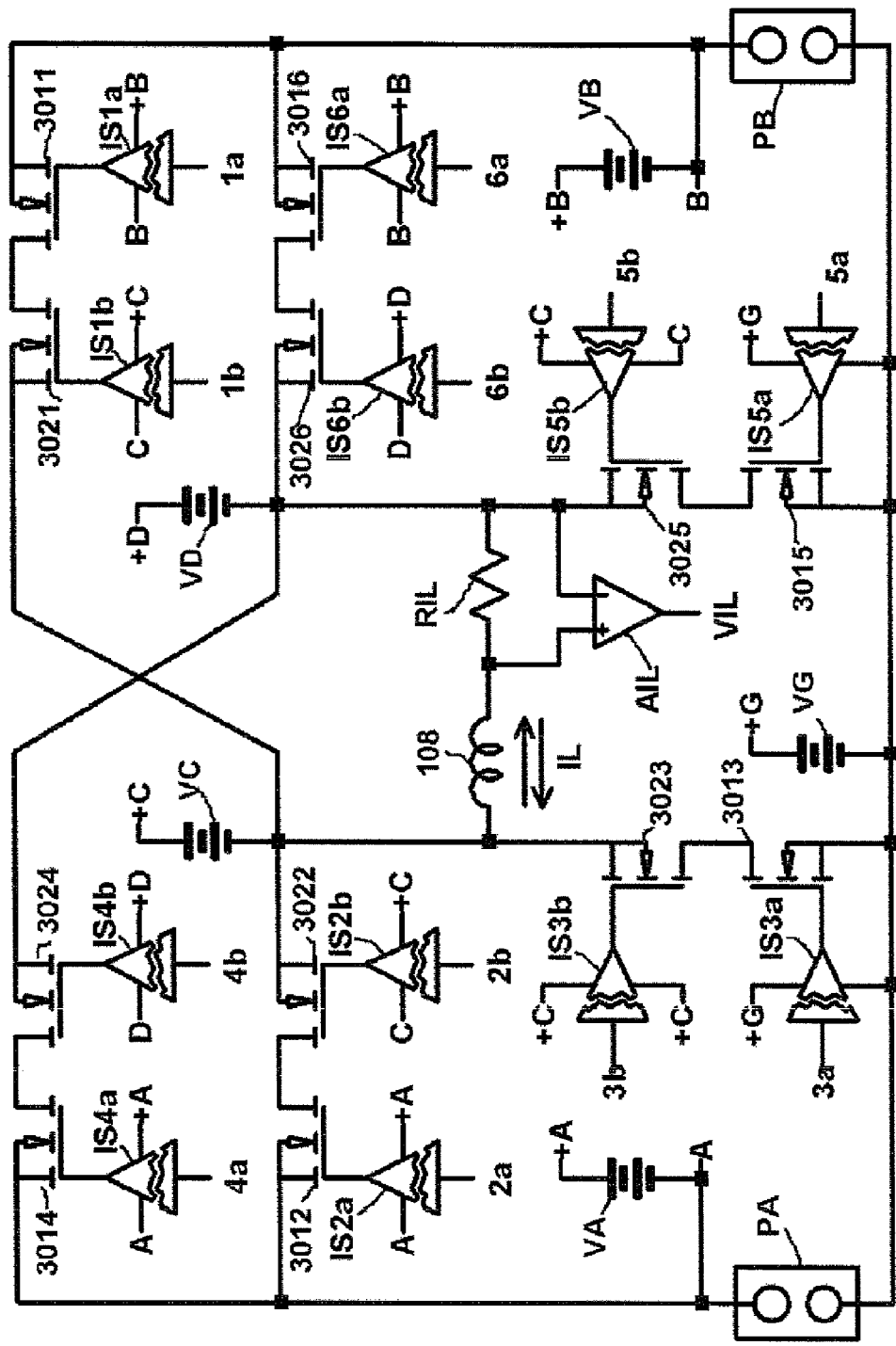
FIG. 8 shows a schematic of a practical switch and driver arrangement for the switches of this disclosure.

FIG. 8 depicts a practical switch arrangement for the switches of FIGS. 1 and 4A-4J. Pairs of FETs 3011-3021 through 3016-3026, corresponding to S1-S6 of FIG. 1 and 301-302 of FIGS. 6A-6C, and having body diodes (not shown), embody the needed bi-directional switch function between inductor L and ports PA and PB, as is also shown in FIGS. 1 and 4A-4J. The need for a pair of FETs for each switch is a consequence of the common practice of reducing terminals by tying the body terminals of most large FETs to their sources, causing them to block unidirectionally. Should this practice change to produce bidirectionally blocking FETs, single FETs rather than pairs of FETs would suffice to practice this disclosure.

Since practical FETS may be capacitive, commercially available FET drivers shown included within IS1-IS6 a and b may be used to drive them. Voltage sources VA through VG are used to power such drivers through the node pairs A-A+, B-B+, C-C+, D-D+, and G-G+.

Though AC coupling may be used to drive FETs, such coupling often malfunctions at extremes of switch dutycycle. Isolated D-C coupling is usually most reliable. The isolation also shown included within IS1-IS6 a and b is preferably accomplished with Gross Magneto Resistive (GMR) isolators capable of DC operation. Optical isolators may be used where speed is not important. Transformer-coupled data isolators such as those of the ADUM series from Analog Devices may be used, but at the risk of undesired bistable states. Though FETs are commonly used in power converters, BJTs, IGFETs, thyristors, or even magnetic amplifiers may be used as switches to practice this disclosure. Referring to IL, RIL and AIL of FIG. 8 for providing a signal VIL representing inductive current in L, in some cases a simple amplifier will suffice, but it must possess sufficient GBW (gain bandwidth), input range, and DC accuracy for the task. Commonly available high-side current monitors usually have insufficient bandwidth for high speed converters. A current transformer properly summed with a current monitor can provide flat response from DC to a high frequency. A current transformer alone provides only AC coupling, which can be made to work in limited cases, but incurs the risk of undetected high currents.

Figure 9A:
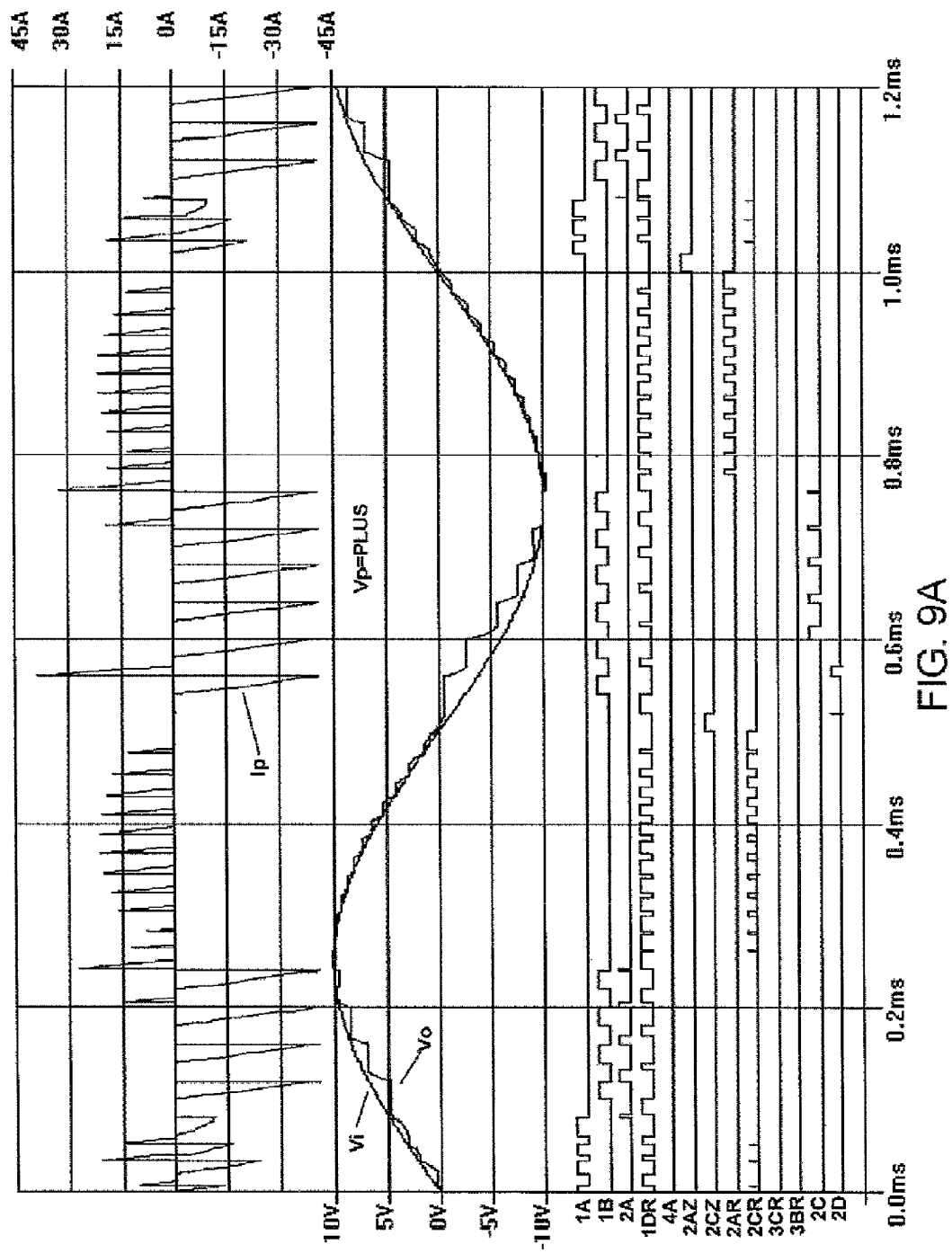
FIGS. 9A and 9B are timing diagrams showing the mode of the power converter of FIGS. 5A-5D as driven by the flow chart of FIG. 7 for positive and negative PA voltages, respectively.
Figure 9B:
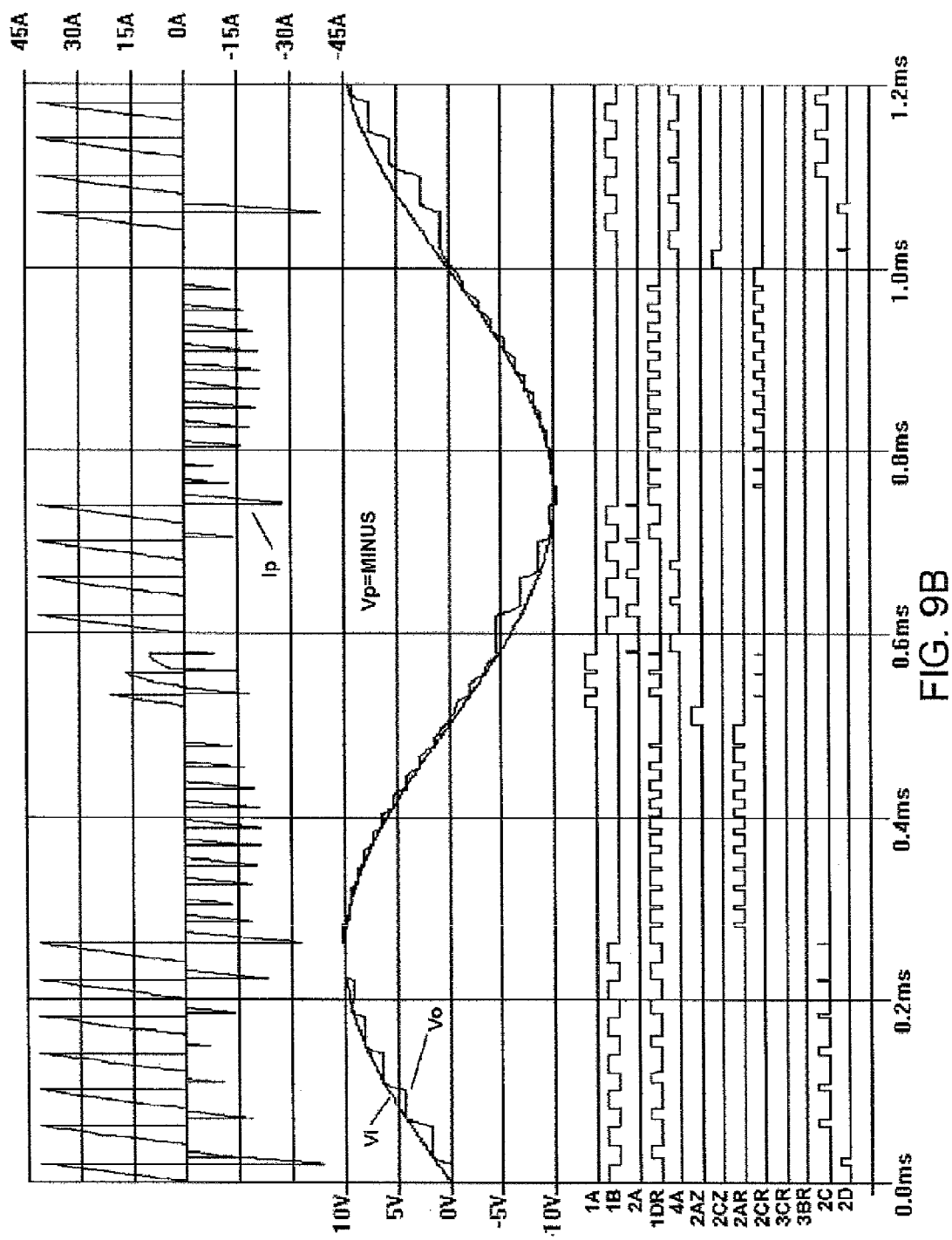

FIGS. 9A and 9B depict the converter-based generation of a sine wave following a control port voltage, VI, starting positive from zero at zero degrees. These graphs were generated by a SPICE simulator simulating a circuit embodying FIGS. 4A-4J plus logic embodying the functions depicted in FIGS. 5A-5D. FIG. 9A shows operation with a positive PA voltage, Vp while FIG. 9B shows operation with a negative PA voltage. The current ebbing and flowing in PA, Ip, is shown at the top of FIGS. 9A and 9B. In the middle are shown a control port voltage input, VI and, VO the sine wave voltage produced at PB by the power converter of this disclosure being simulated.

Just below these analog waveforms is a timing diagram produced by the SPICE simulator as it was simulating this converter. The designations to the left of the timing diagram, 1A, 1B, etc., show which of the modes described above is active at any given time and causing and responding to the waveforms above the timing diagram. (The Arabic numbers of FIGS. 9A and 9B generated by SPICE correspond to the Roman numerals of FIGS. 4A-4J and the description below; thus Mode 1 and Mode I are the same.)

Starting with FIG. 9A, Mode IA, the buck-energize mode, first drives up PB voltage, VO, across a energy-storing load connected thereto. Since this is a synchronous embodiment, an arbitrary rule allows Modes 1A, 1B to be initiated only by a clock pulse, in this case supplied at 20 uS intervals (not shown). Since Mode IA vigorously slews VO, the latter often slightly overshoots VI as it touches same, indicating excess inductive energy, and causing an occurrence of Mode IDR to return energy to PA. As VO approaches VP, here +5V, the vigor of slewing decreases causing VO not to overshoot VI, which first happens at 80 uS, at which time a Mode IIA moves inductive energy to PB. Upon exhaustion of the inductive energy, Mode IDR is invoked, which can either to return energy to P or, in this case simply load the exhausted inductor, L.

At the 100 uS clock (not shown), VO is now about equal to VP, or about 5V, so Mode IA would no longer slew VO. Therefore Mode IB now begins, and lasts one 20 uS clock cycle, energizing L. At the 120 uS clock, Mode IIA moves inductive energy to PB. When VO is nearly to VI at about 126 uS, an asynchronous sequencer decision invokes Mode IDR to return excess energy to PA. The current drawn from VP (pointing down, can be seen for each occurrence of Mode IB. This sequence is repeated at 140, 180, and 220 uS.

Since VO is now very close to VI, invocations of Mode IIA becomes shorter while invocations of Mode IDR increase in length.

At 250 uS the 90 degree sine wave peak is reached, and new modes begin. At 260 uS, VO is above VI, so Mode IICR draws energy from PB into L until VO descends to VI, at which time another sequencer decision again invokes Mode IDR. Energy taken from PB now resides in the inductor, L, and Mode IDR returns that energy to PA, making an upward-pointing spike of VP current. This spike ends either when inductive energy is exhausted or at the next clock. This alternation of Modes IICR and IDR continues for almost 90 degrees of the sine wave, with additional alternations commencing at every 20 uS clock until 500 us. Additional spikes of returned current may be seen between 90 and 180 degrees of the sine wave.

At about 500 us VO is positive and lagging VI which has already gone negative. We have encountered the first occurrence of straddling zero. At this time Mode IICZ is invoked, dumping now-excess energy from PB into L. L, in turn, quasi-resonantly recharges a capacitor at PB, returning much of its energy, but in the opposite polarity. One can see, just after 500 uS, VO passing through zero to arrive several hundred mV negative under the influence of Mode IICZ.

Just before 520 uS, a tiny spike of Mode IID gives evidence of a little excess energy in L. The reason that Mode IID occurs rather than IIC is that VO is much less than VP.

Less than perfect timing causes the opportunity at 520 uS for Mode IB to be missed, but at 540 uS Mode IB occurs, energizing L. At 560 us an additional Mode IID pulse begins and is asynchronously terminated to invoke Mode IDR when L becomes exhausted. At 580 uS an new Mode IB starts, but at 600 uS when its new energy in L must be moved, Mode IIC is invoked, because VO is no longer tiny compared to VP. Until 700 uS each Mode IIC is followed by a Mode IDR, not from VO reaching VI, but from exhaustion of L1. After 700 uS there is a Mode IDR accompanied by a returned energy spike of Ip. Of course, each Mode IB was accompanied by a spike of energy provided by PA. At 750 us, 270 degrees of the sine wave is reached and both VI and VO are close together and quite flat. L is full of excess energy that gets returned by Mode IDR in a relatively large spike at 760 uS.

At 780 uS Mode IIAR first begins. This mode, like Mode IICR moves energy from PB to L, until VO rises to meet VI, at which time a sequencer decision again evokes Mode IDR to return energy, evidenced by an Ip spike, to PA. Alternations of Modes 2AR and IDR continue, with return energy spikes, commencing with every 20 uS clock pulse until 1 mS.

At about 1 mS VO is negative and lagging VI which has already gone positive. We have encountered the second occurrence of straddling zero. At this time Mode IIAZ is invoked, dumping now-excess energy from PB into L. L, in turn, quasi-resonantly recharges a capacitor at PB, returning much of its energy, but in the opposite polarity. One can see, just after 1 mS, VO passing through zero to arrive several hundred mV positive under the influence of Mode IIAZ.

Next Mode IA recurs to slew VO up the rise of a new sine wave cycle.

Referring to FIG. 9B, a similar sine wave generation occurs, but with VP now at −5V.

The modes used are similar and have similar functions, but with some role-reversals. Mode IA being a buck mode cannot be used for inversion, so it now occurs when both VP and VI are negative. Some energy-returning IDR modes are now replaced by VIA modes because of polarity reversal. The negative slews of FIG. 9B correspond to the positive slews of FIG. 9B. Energy use now points upwards on Ip and energy return points downward.

A cursory glance with understanding of the larger peaks of Ip shows the advantage that could be gained by including energy-balancing into this converter. The large spikes are associated with Mode IB. Lacking termination by an energy-balance, Mode IB continues until cycle's end unless a current limit is reached. Then during the next clock cycle, energy is dispensed and any excess returned to PA.

Were energy balancing in place, ModeIB would asynchronously terminate upon attainment of sufficient energy in L, allowing energy dispensing to commence, and perhaps even be completed within the same cycle. The energy return spikes interspersed with Mode IB energizing spikes would disappear, and the energizing spikes would be smaller. Both voltage ripple on VO and current ripple in VP would be reduced. It should be noted that any energizing mode of FIGS. 4A-4J may be followed by any transfer mode. What is important is not how energy got into the inductor but which transfer mode best moves that energy to accomplish a desired output with utmost efficiency.

Figure 10:
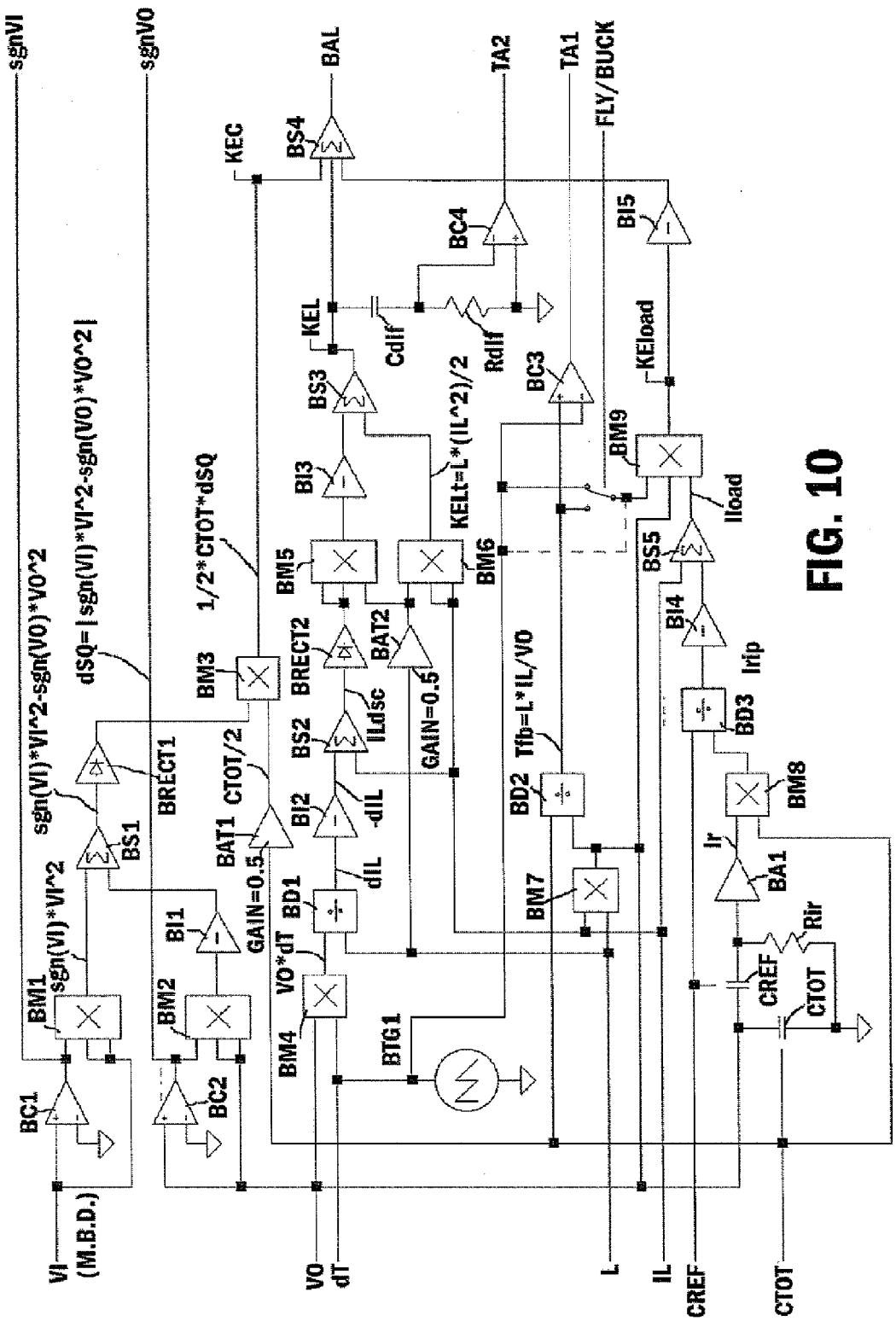
FIG. 10 shows an energy-balancing calculator according to this disclosure.
Figure 12:
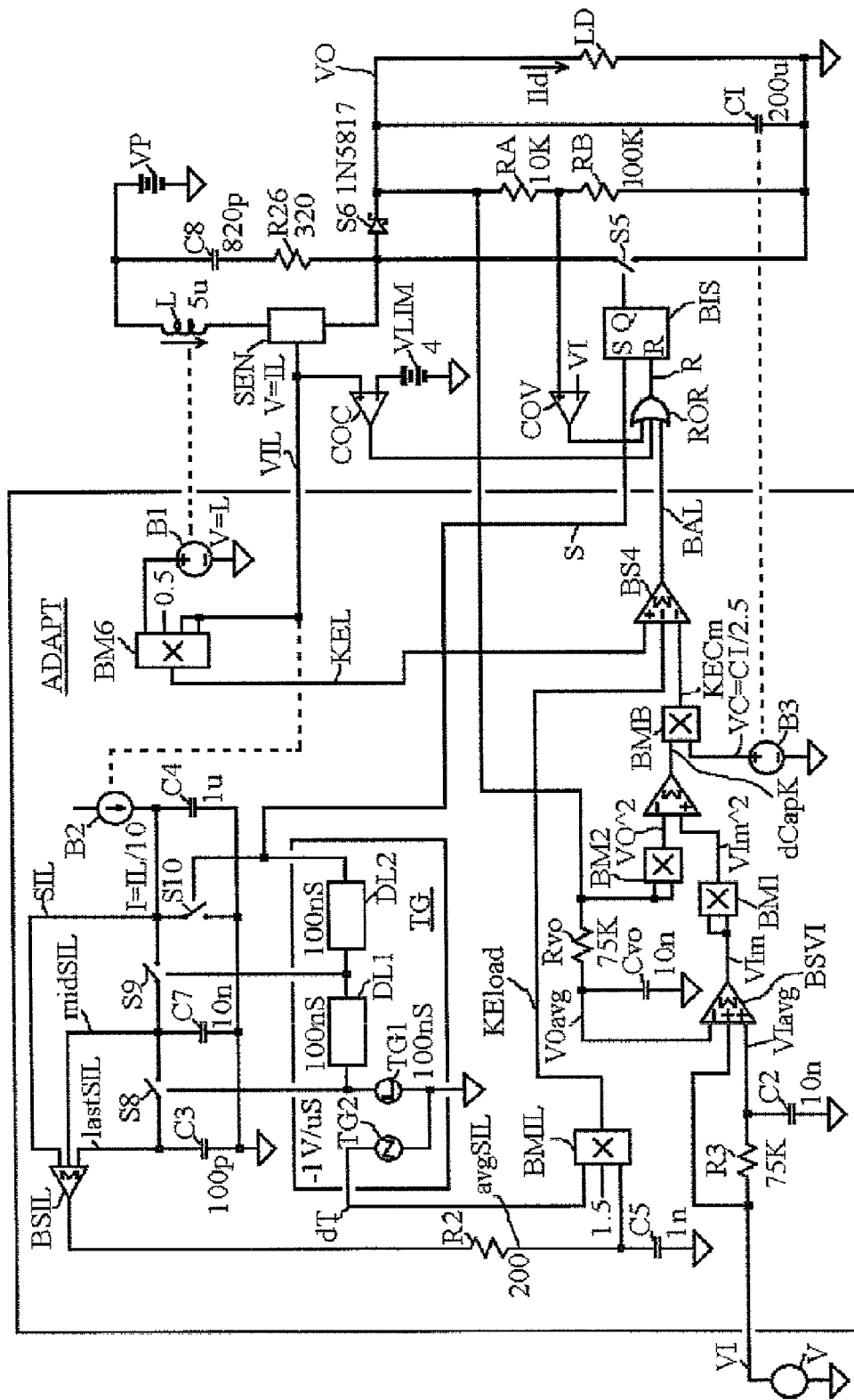
FIG. 12 represents a flyback amplifier embodying both CCM stability and energy balancing according to this disclosure.

FIG. 10 shows an energy-balancing calculator that may be used as part of this disclosure to improve performance. This balancing apparatus may be omitted from embodiments of this disclosure wherein energy-balancing is not practiced. It may also be implemented by implicit, adaptive means as shown in FIG. 12 rather than by the explicit means shown here for clarity. It should be understood that means for determining values of capacitance and of inductance, and of indirectly determining load current may be added to this calculator as taught in related application Ser. No. 11/593,702, incorporated by reference herein. It should be noted that though mathematically correct implementation of the energy balancing calculation taught in this figure produces the excellent results, crude approximations of the predictions thereof still offer superior results to non-predictive prior art control. Thus it is possible to practice this disclosure by using simplified predictive terms, for example by neglecting to square quantities in the KEL and KEC terms, to produce results superior to the prior art.

There are three main parts in the calculator of this figure, the first of which is the KEC, or capacitive kinetic energy, term.

VI, suitably conditioned for polarity, is squared in multiplier BM1; VO is likewise conditioned and squared in multiplier BM2, and then inverted by inverter BI1. Summing of the first square and the inverse of the second is performed by BS1 to yield a difference of squares, which is rectified by BRECT1 and then multiplied in BM3 by 0.5 times the value of total capacitance CTOT at the converter output. This process yields the energy that will be requires to move VO to a desired voltage. The sign of this move is addressed using polarity signals.

The second, inductive kinetic energy, term KEL is more complex. Its simplest part is the instantaneous inductive energy, KELt, obtained as follows. BM6 squares IL (practically represented by VIL in FIG. 8) and multiplies the same by 0.5 L, the inductor value/2, providing instantaneous kinetic energy in accordance with the well known equation $KE = L*I^2/2$. Since it takes time and voltage to extract energy from an inductor, there is another inductive energy term KELd (not to be confused with KEload) that represents the de-energized energy of the inductor at the end of a mode. If the inductor had time and voltage fully to de-energize, KELd is zero, but if not KELd needs to be determined by computing ILd, the de-energized inductive current. To obtain ILd, BM4 first multiples VO by dT, the time remaining in the mode. The term dT may be a descending sawtooth wave representing remaining cycle time. BD1 then divides the resulting product by L. This action implements the well-known equation $dI=E*dT/L$. The result, dIL is inverted by BI2 to obtain −dIL, which is then summed by BS2 with VIL to yield ILd. which is rectified by BRECT2. The resultant signal is squared and multiplied by 0.5 L to yield de-energized energy KELd which, inverted by BI3 is summed by BS3 with KELt to yield predicted extractable energy, KEL.

The third, load energy, term predicts how much energy will be needed to cause VO to be correct at a desired time. In the buck converter the prediction is preferably to cycle end, and the desired voltage is usually buried in the VO ripple. The same time may be used for the flyback converter, in which case the desired voltage is nearer the bottom of the VO ripple. Alternatively, the time, Tfb, till the end of inductive flyback may be used, putting the desired voltage near the top of the VO ripple. BM9 produces the KEload term representing the predicted energy consumption of a load. To do this, the chosen time, dT or Tfb is multiplied by VO and by load current. Load current might be directly measured but, for best efficiency, it is usually preferable to derive Iload. If a known capacitor, CREF, be in shunt with VO and with any other capacitance, internal or external, ripple current will flow in these capacitances in inverse proportion to their respective capacitances. Thus, by well known ratiometric techniques the value of CTOT may be determined. If all or part of CTOT is external, it may be inconvenient to measure its current, but CREF, being internal, allows its current Jr to be measured. Ir multiplied by Ctot in BM8 and divided by Cr in BD3 yields total ripple current, Irip. Since most of the AC current of IL is Irip, IL-Irip is the derived instantaneous load current. B14 inverts Irip for summation in BS5 with IL to yield a derived Iload term for BM9.

The balance generator of this figure also embodies additional functions. Cdif and Rdif generate a positive signal whilst KEL is increasing, but a negative signal when KEL decreases, which comparator BC4 processes to a turn-around signal TA2. Early in an EN mode while IL rises, KEL also rises, but as time for inductive energy transfer decreases later in the mode, KEL begins to fall despite the continued rise of IL. At that time, nothing but dissipation is gained by additional energizing, so TA2 issues as an asynchronous trigger to end the EN mode. It should be noted that this term according to this disclosure is applicable to converters operating in the well-known DCM mode. For either energy balancing or non-energy balancing converters according to this disclosure, Tfb may be compared to dT by BC3 yielding another turn-around signal TA1, to accomplish the same end.

While in the discussion until this point it has been assumed that the inductor, L, is an inductor, it may be any type of inductive reactor, including a transformer. In fact, where it is desirable to isolate one port from another port a transformer will be required. Such designs are well know in to those skilled in the art of power design and will not be further described herein. However, the switch configurations and control techniques described herein can easily be applied to such inductive reactors and the disclosure is meant to include such applications.

FIGS. 11A-11H depict switching states for the adaptive and simplified demonstrative examples of this disclosure described hereinbelow. These states are similar to the modes of FIGS. 4A-4J, but represent the additive form of flyback converter. (However, it should be noted that States IV, VI and VIII of FIGS. 11D, 11F, and 11H have no equivalents in FIGS. 4A-4J.) In as much as the following examples require no closure of S1 of FIGS. 1 and 4A-4J, S1 has been omitted from this figure. A new switch S7 has been added to facilitate illustration of recirculation of inductive current as will be explained below. While the use of S7 is convenient, it should be noted that the same result can be accomplished in FIGS. 4A-4J by closing S3 and S5 or S2 and S4 to cause a short circuit across the inductor for recirculation. S7, however, is convenient in that the losses associated with a second switch are avoided. In the examples below, fewer than all six of the switches in FIGS. 4A-4J are required.

In State I, the classic forward energize mode of additive flyback converters, L is shown being energized through S2 and S5.

State II shows the classic flyback, or forward transfer, mode of additive flyback converters.

State III shows the reverse energizing of L from PB through switches S6 and S3. Such energizing might be used to remove excess energy from PB. Note that inductive current flow is reversed from States I, II, and V.

State IV shows a reverse transfer of energy from L to PA. Such a transfer might be used to return to PA undesired energy from PB after State III or State VIII. Note that inductive current flow is reversed from States I, II, and V.

State V shows the return of energy from the inductor, L through switches S3 and S4. This mode might be used to return to PA excess forward energy in L.

The movement of LD and VDC in various States is not to say that the load and power source have been moved, but only to indicate that energy is now flowing out of the converter 100 to PA, or into converter 100 from PB.

State VI shows recirculation of inductive current in L through S7 to maintain a store of energy therein according to this disclosure as is explained below. It will be clear to anyone practiced in the art that, with slight additional losses, recirculation according to this disclosure can also be effected by the closure of both S2 and S4, or of S3 and S5, with all other switches being held open.

State VII shows the forward transfer of reverse energy to PB through switches S3 and S6.

State VIII shows the forward negative energize state for loading L with negative energy through switches S4 and S3.

It should also be noted that the control mechanisms herein control an output with respect to some reference signal. The reference signal may by the input voltage to the converter, a separate signal to adjust the control, or both of the foregoing.

DEMONSTRATIVE EXAMPLES

A number of examples of embodiments of the disclosure are set forth herein. The Inventors believe that these embodiments demonstrate particularly beneficial implementations of the techniques of these disclosures, but these are not meant to be limiting in any way with respect to the scope of the disclosure.

Example 1

Amplifier Using Simple Flyback

FIG. 12 represents an amplifier using the simplest flyback converter form, comprising one switch (corresponding to S5 of FIG. 1) and one diode (corresponding to S6 of FIG. 1). This synchronous additive-flyback unipolar amplifier embodies methods of obtaining both CCM stability and adaptive self-correction according to this disclosure.

FIG. 12 comprises two major portions. On the right is an entirely conventional additive-flyback power converter comprising inductor L, snubber capacitor C8, snubber resistor R26, inductive current sensor SEN, switch S5, S-R flip-flop BIS, over-current comparator COC, current-limit threshold VLIM, switching diode S6, filter capacitor CI, voltage divider RA and RB, over-voltage comparator COV, reset or-gate ROR, and an output voltage VO, to which is connected a load LD. Save the use of one input of gate ROR to accommodate a BAL input, the functions of the components of the conventional portion are the same as the in prior art. What is missing from the prior-art portion of this power-converter is the usual feedback loop attached to the input voltage VI, the output voltage VO and the aforementioned input of gate ROR to regulate output voltage VO.

Figure 11A:
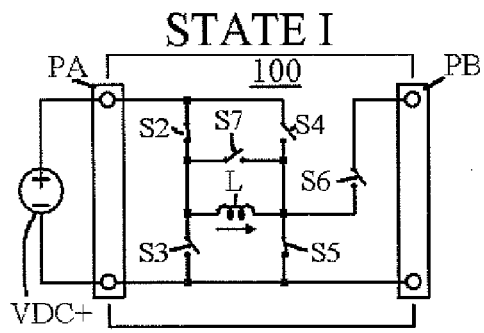
FIGS. 11A-11H show certain useful states of the disclosure.
Figure 11B:
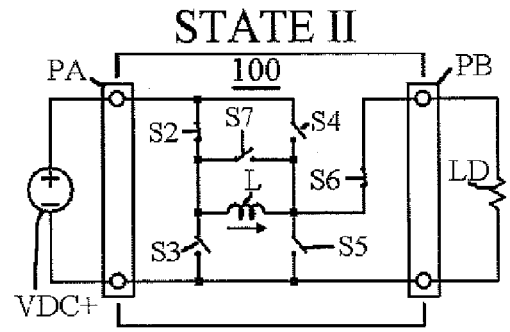
Figure 11C:
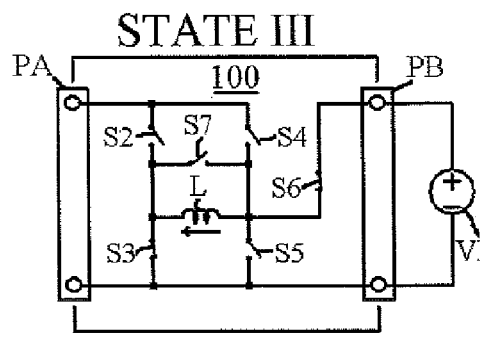
Figure 11D:
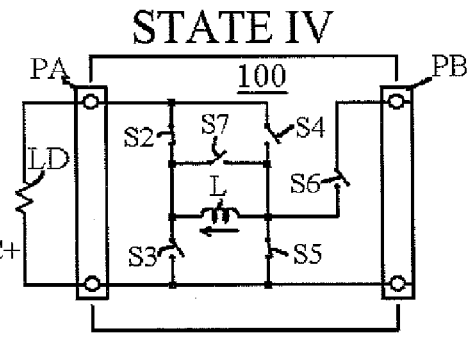
Figure 11E:
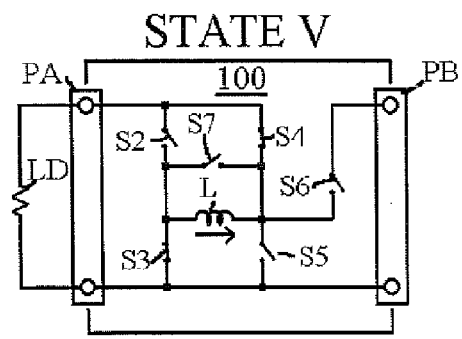

Only two of the energy moving states shown in FIGS. 11A-11H, the Forward Energize state (I) of FIG. 11A and the Forward Transfer state (II) of FIG. 11B, are used. A relatively large minimum load is required for such an amplifier because it can actively slew in the positive direction only.

Figure 20A:
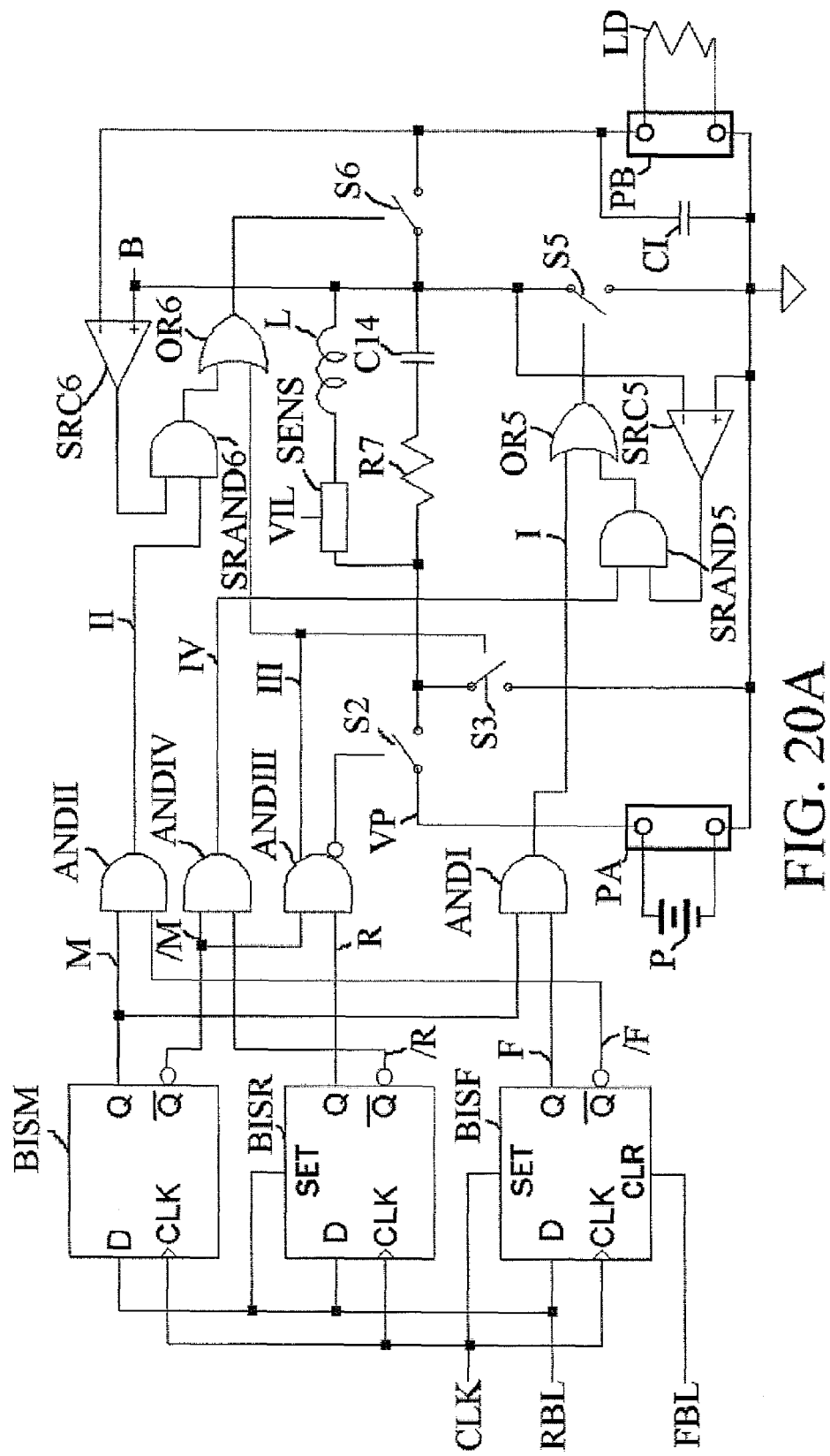
FIGS. 20A and 20B show a four-switch bidirectional flyback amplifier with energy balance and continuous mode operation, respectively.
Figure 20B:
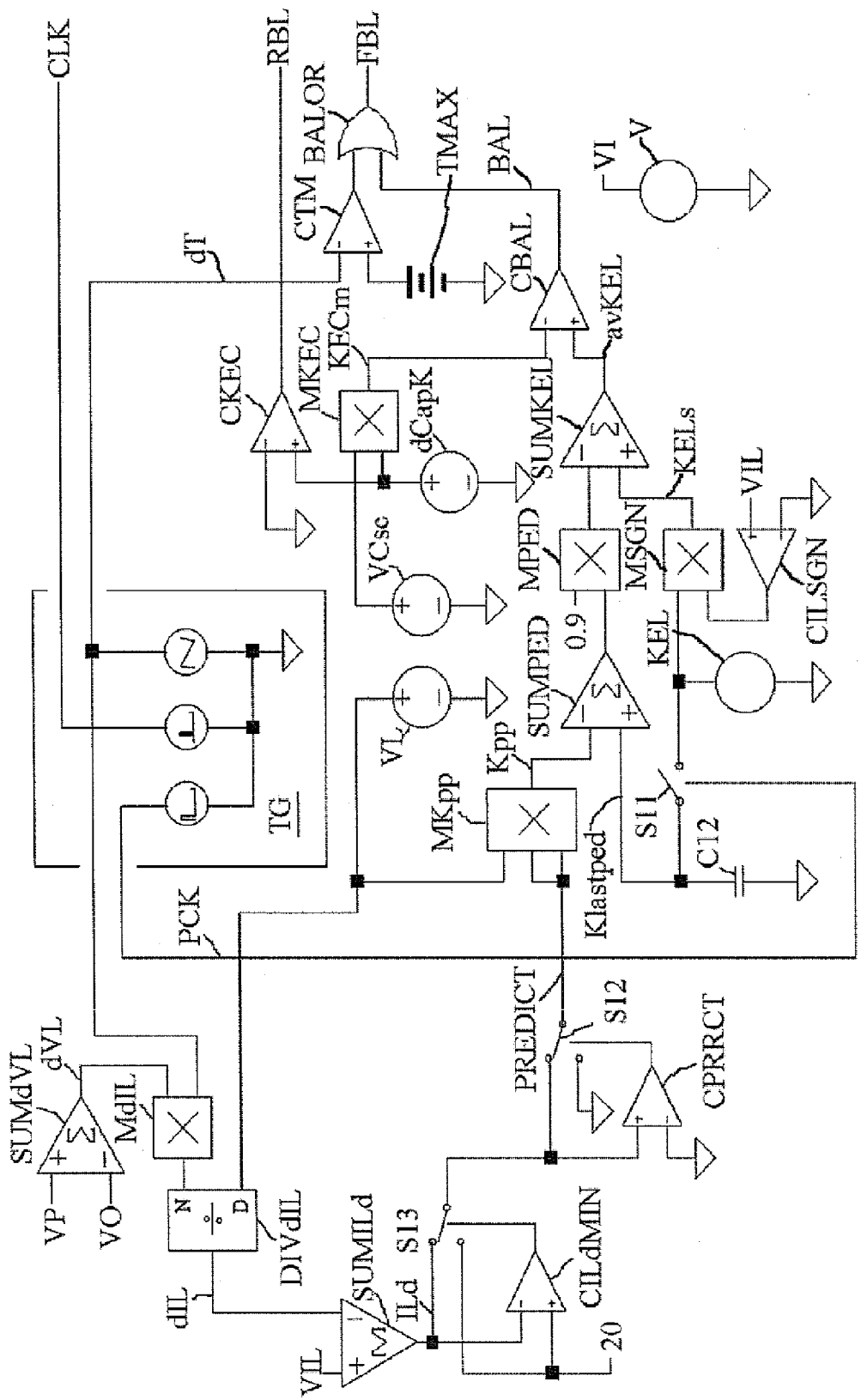

A four-switch version of this amplifier has also been demonstrated showing a symmetrical dynamic response, see FIGS. 20A and 20B. In FIG. 12, S6 has been replaced by a diode to provide a simple example.

The amplifier of FIG. 12 comprises, in place of a prior-art feedback loop, an adaptive feedback loop ADAPT according to this disclosure, that embodies adaptive correction that can be applied to adjust for any aggregate errors, and any additional capacitance in shunt with the load LD. If an instantaneous input voltage, VI, is used for the adaptive correction, the effect is to add phase lead to an output, VO. The ability to introduce lead, stably and predictably, in reactive feedback loops can be a useful feature in control systems, particularly those involving momentum. If lead is not desired, using matching input and output averaging filters allows adding adaptive correction without altering phase. R3 and C2 form the input averaging filter that produces an average input voltage, Vlavg. Rvo and Cvo form a corresponding output filter that produces an average output voltage, VOavg. The adaptive feedback can compare the instantaneous input to the filtered output and draw those two voltages together. That causes phase lead. If the input voltage is filtered in the same manner as the output voltage, the adaptive feedback will not cause phase distortion.

This example shows a voltage gain of 1. Any reasonable gain can be applied either digitally, or by adding a gain stage on the input voltage, VI, or by dividing the output, VO, before it is used in the calculations. Any non-linear transfer function desired can be likewise incorporated.

In this example, BIS is synchronously set every 5 uS by a clock pulse signal S from timing generator TG, to energize L in conventional fashion by closing switch S5, admitting current from a power input, VP. A conventional output filter capacitor is here designated as CI to indicate that it is the filter capacitance internal to this power converter. In this example, load LD draws a sinusoidal or pulsed current load for testing purposes.

Sensor SEN may be a well-known current-monitor or other circuitry for ascertaining inductive energy to produce a signal VIL representing inductive current. Behavioral voltage source B1 may be responsive to the value of L, or may be a fixed voltage representing the value of L. A constant voltage 0.5 is also shown. Behavioral multiplier BM6 processes these three inputs to implement the classic inductive energy formula $KE=\frac{1}{2}L*I^2$, generating an inductive-energy signal KEL.

Timing generator TG comprises two signal outputs TG1 and TG2 and two delay elements, DL1 and DL2. TG1 is a 100 nS pulse with a 5 uS period and 20 nS transition times. TG1 is delayed by two 100 nS delays DL1 and DL2 to provide signals sequentially to momentarily close switches S8, S9, and S10, and to set BIS. TG2 is a descending ramp dT with a slope of 1V/uS, representing the time remaining in the chopping cycle.

In order to obtain the a signal representing load current Ild without adding another input term, load is constructed from the current in L, as a running average over three cycles. The inductor current, represented by behavioral source B2, is integrated in C4, which is zeroed at the beginning of each cycle by switch S10, thereby obtaining the total current for one cycle only, SIL. V6 controls switch S9 to sample and hold the previous cycle's SIL in C7 as midSIL. In similar fashion, V5 controls switch S8 to sample and hold the second to last cycle's current, lastSIL, in C3. Note that in a digital implementation, this function can be provided by simply storing values in registers. Behavioral source BSIL averages the three inductor current integrals stored in C4, C7 and C3. The average is further smoothed with an analog filter comprising of R2 and C5 to produce the term avgSIL. In order to predict the future load, it is necessary to introduce time. Behavioral multiplier BMIL multiplies SILavg by the dT time remaining in the cycle by the output voltage, VO, to obtain the predicted load energy, KEload. BMIL also multiplies these terms by a constant signal 1.5 to enlarge predicted load energy by 50% to adjust KEload for the conducted energy that is not explicitly accounted for in the equations underlying this embodiment.

The capacitive energy signal KECm comprises a required-capacitive-change signal, dCapK, which is the difference of the squares of a modified input voltage VI and the output voltage VO. To modify VI, behavioral summer BSVI adds VI to its own average VIavg and subtracts therefrom an average of VO, VOavg to generate a modified input signal VIm. Behavioral multiplier BM1 then squares VIm to generate the signal VIm^2. Behavioral multiplier BM2 squares VO to generate the signal VO^2.

A behavioral sourced B3 generates a signal VC responsive the value of CI/2.5. VC may simply be a fixed representation of a fixed value of CI. Behavioral multiplier BMB multiplies CapK by VC, generating the capacitive energy signal KECm, corresponding to the term KEC of FIG. 10.

In this case, KECm comprises, rather than a simple difference of the squares of VI and VO, an adaptive term modifying VI. Thus conditioning VI brings the average output, VOavg closer to the average input VIavg than would occur using an unmodified VI. The main advantage of the adaptive term is that external load capacitance can be added dynamically without causing loss of regulation or DC accuracy. Relatively slow changes of the value of the switched inductor due to temperature or other operating conditions are also absorbed by the adaptive term.

To provide the rest of the classic capacitive energy equation $KE=\frac{1}{2}C*E^2$, the dCapK capacitive energy term would otherwise be multiplied by the capacitance divided by 2. In this case, in the behavioral source B3 we divide by 2.5 instead to obtain VC. Thus diminishing the capacitive energy term KECm reduces its error correction gain, thereby increase the sampled loop stability. This adaptive feedback loop makes up any small DC error generated in its operation.

Behavioral summer BS4 compares the inductive energy signal KEL with the sum of a load-energy responsive signal KEld and the capacitive-energy signal KECm. When the inductive energy is greater than or equal to the sum of the capacitive energy difference and the predicted load energy, behavioral summer BS4 generates the balance energy signal BAL which resets the flip-flop BIS, thus opening S5 and terminating the energizing of L.

The cycle repeats at the next set pulse S, regardless of whether the inductor has had time to fully be de-energized. Because any energy left in the inductor is correctly represented by the KEL term, this amplifier passes smoothly in and out of continuous mode, CCM, without distortion or excess ripple, even, as shown, while driving 200 uf at the output and being loaded with a sinusoidal current varying from 300 to 900 mA. Conventional converters tend to alternately under- and over-shoot at the volatile boundary of continuous mode, generating subharmonic ripple, perhaps causing oscillation, or even generating positive feedback, with its consequent inclination toward self-destruction.

Figure 13:
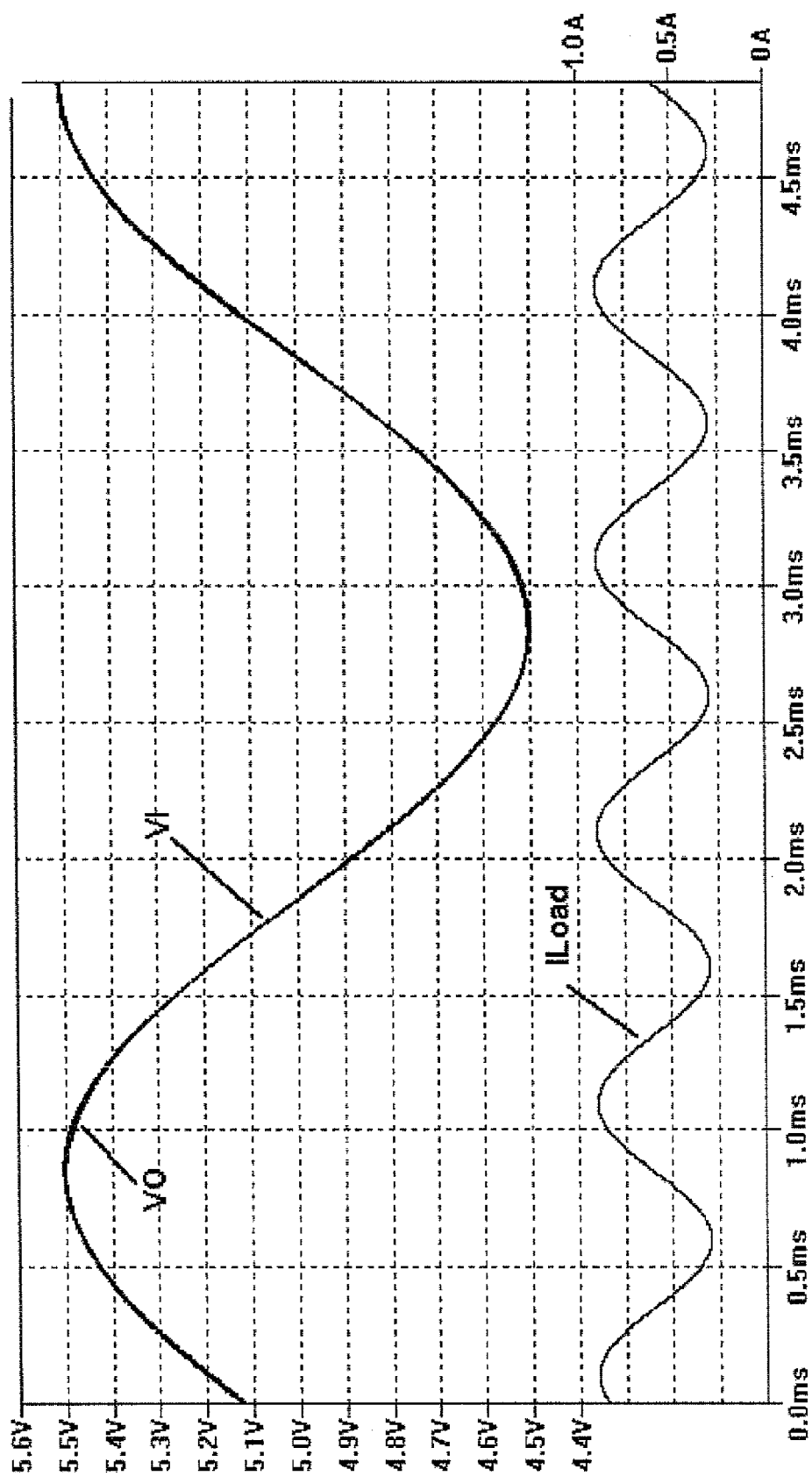
FIG. 13 shows the performance of the amplifier in FIG. 12.

FIG. 13 shows the performance of the circuit in FIG. 12 with the adaptive correction applied in phase. VO is the output, tracking VI, the input. The two traces are overlapping and practically indistinguishable. The lower trace, ILoad is the load current. Note that the only visible effect of increased load current is a slight increase in output ripple. The results shown in FIGS. 13-15 are based on SPICE simulations as are all other results set forth in this application unless otherwise indicated. SPICE is a well known and commonly used tool for electrical circuit simulation.

Figure 14:
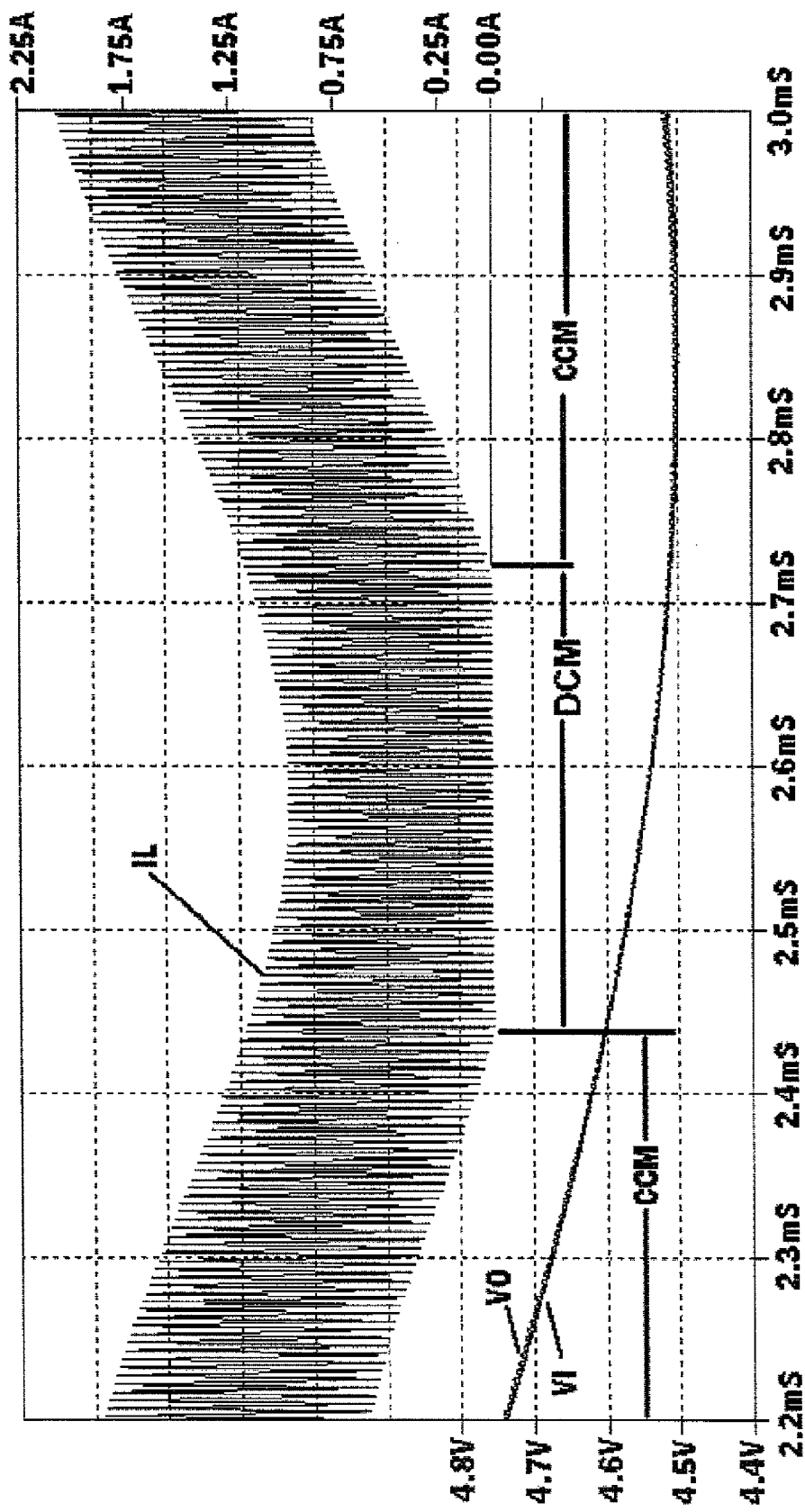
FIG. 14 also shows the performance of the amplifier in FIG. 12.
Figure 15:
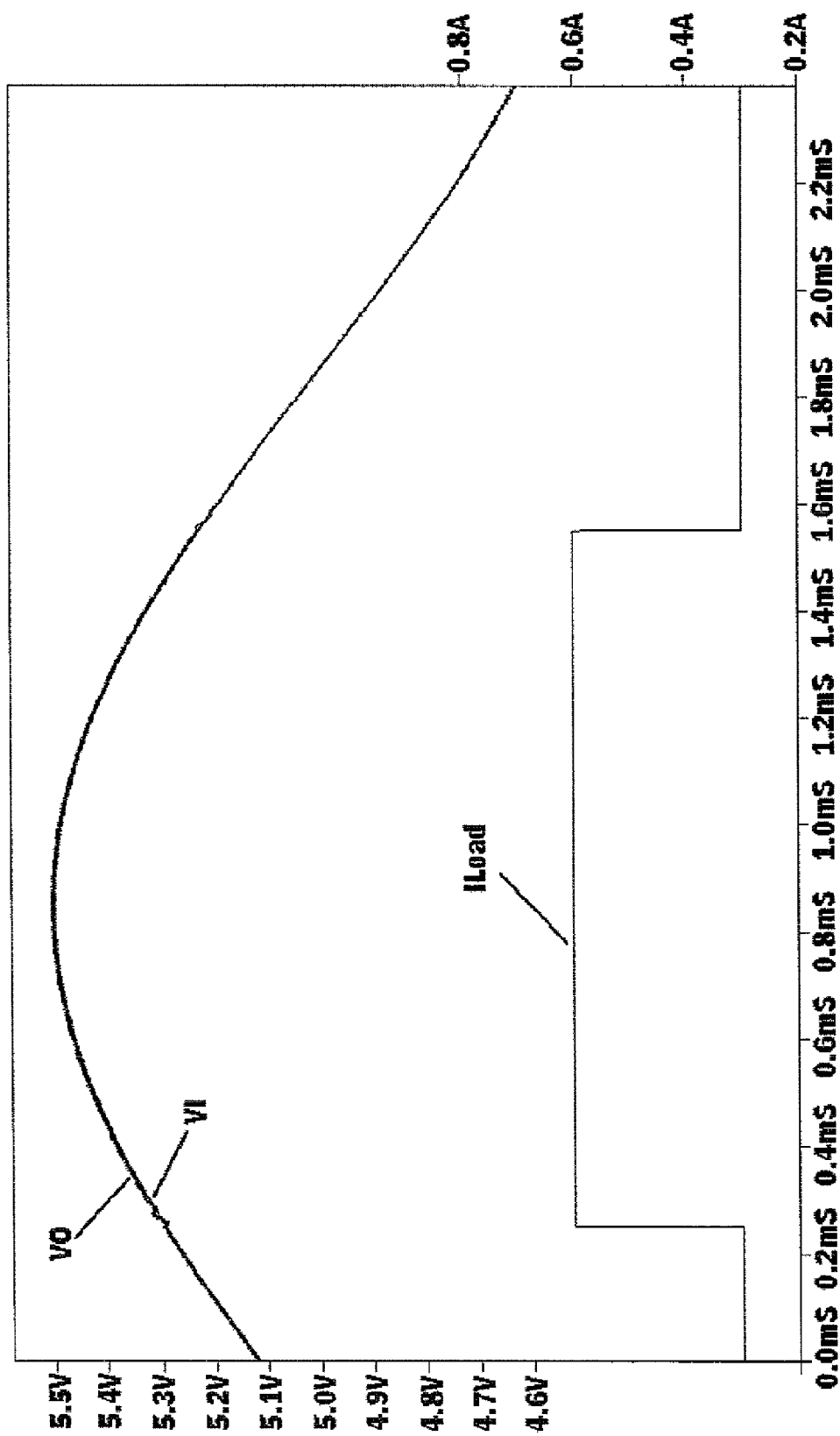
FIG. 15 also shows the performance of the amplifier in FIG. 12.

FIG. 14 is an enlarged detail of the input and output traces from FIG. 13, plus the current IL in the switched inductor, L. IL passes out of, then back into, continuous conduction with no disruption of the output voltage. Continuous conduction periods are labeled CCM, the discontinuous period is labeled DCM.

FIG. 15 is a detail of the input and output traces showing the response to a change in load from 300 to 600 mA and back. Rise and fall times are 1 uS for the load change. It is evident that the filter pole created for in-phase adaptive correction does not significantly impair the excellent transient response that is made possible by the predictive energy balance. Non-predictive flyback converters would severely overshoot during the voltage downslope when the load was instantaneously cut in half. Not having means to actively correct the overshoot, the conventional converter would take an excessive amount of time to recover from that transient.

Example 2

Figure 11F:
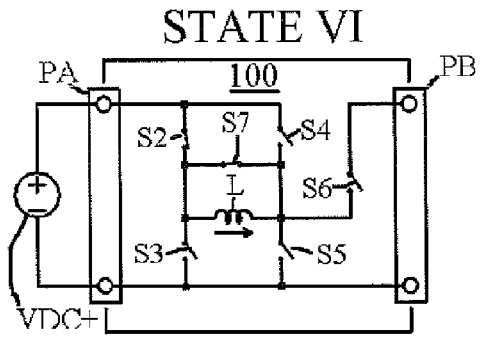
Figure 11G:
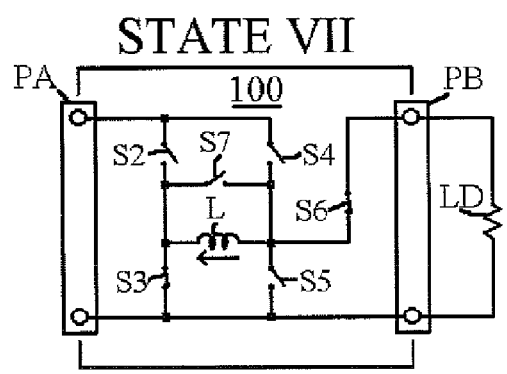
Figure 11H:
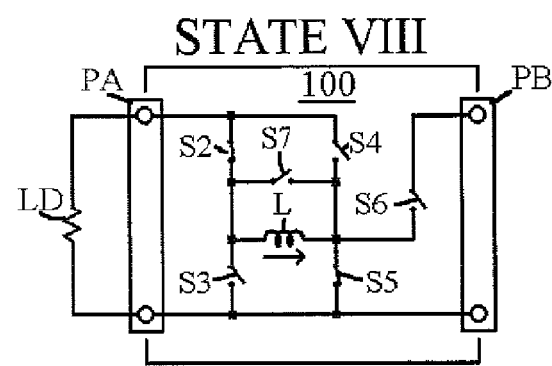
Figure 16:
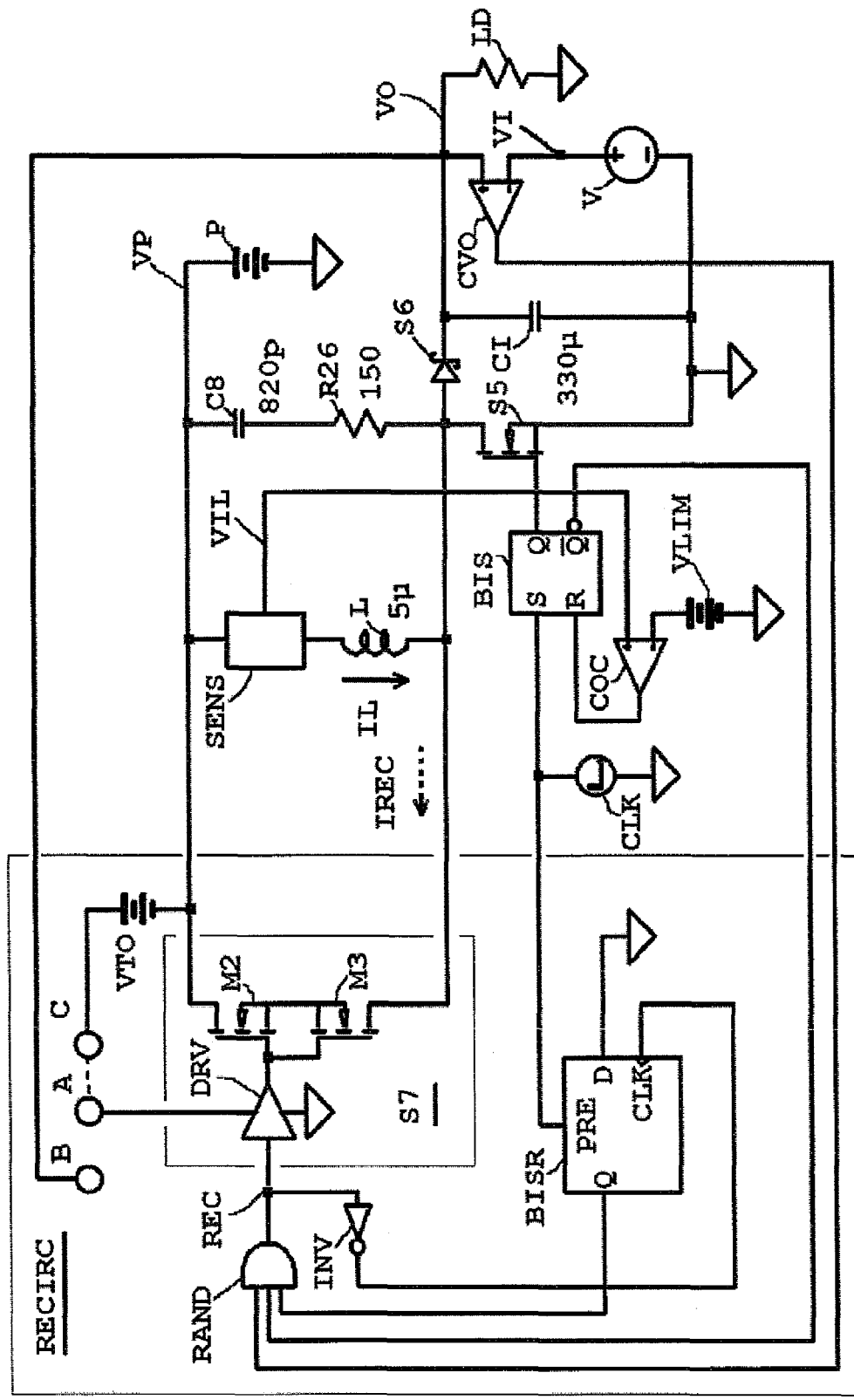
FIG. 16 shows a flyback converter of the current disclosure with current recirculation.

Recirculating Inductor Current for Improved Regulation in Continuous Mode DC-DC Converters FIG. 16 depicts a flyback power converter with circulation of inductive current according to this disclosure (State VI of FIG. 11F).

A fundamental problem in controlling CCM power converters occurs when the energy in the inductor L is not needed to supply the load current, since there is normally no place for that energy to go except to the load LD. The result is overshoot at the output when the load current is reduced. Because the continuous energy stored in the switched inductor L is often large in magnitude compared to the energy moved from the input to the output in any one switching cycle, a better way to handle that surplus energy can result in significant regulation improvements. Bidirectional converters can return the energy to the input, though extra switches are needed for the purpose (see example 4 below). An alternative is to recirculate the continuous current in the switched inductor by closing one additional switch S7 connected directly across the switched inductive element L. While the energy so circulated will be subject to resistive losses, most of the energy can be stored for short periods of time. In situations where the minimum load current is not near zero, the recirculated energy can then be delivered to the load gradually over a number of later cycles, as required. This arrangement allows high power density, good regulation and good efficiency in a simple system. The recent development of very low on-resistance FET switches M2, M3 has made this approach practical.

Referring to FIG. 16, there appears outside the box labeled RECIRC most of a conventional flyback power converter comprising and inductor, L, an inductive energy sensor, SENS, a switch, S5, a diode, S6, a filter capacitor, CI, a snubber capacitor, C8, a snubber resistor, R26, a voltage output, VO, a input voltage source, V producing an input voltage, VI, a voltage comparator, CVO for comparing VO to VI, an S-R flip-flop, BIS for turning on and off S5, a clock, CLK for periodically setting BIS, a limit threshold source, VLIM, and an inductive current comparator, COC for resetting BIS to turn off S5 should inductive current IL exceed a threshold set by VLIM. What is absent, outside the box labeled RECIRC in FIG. 16, from a prior art converter is a feedback loop to reset BIS to attempt to control VO. An energy source P applies a voltage to power line VP to power the converter, and a load LD consumes converter output power. The inventors have found that the FET switch S5 implemented with the Philips part number PH2625, and the diode S6 is implemented with the common 1N5817 work well. The operation of these prior art components is, save the feedback loop according to this disclosure, conventional and well-known in the art.

One may note in FIG. 16 the absence of the usual OR-gate for resetting BIS to limit S5 ON-time, and thus control inductive current IL. This absence occurs because this converter does not reset BIS as part of its feedback when VO exceeds VI. Instead CVO drives an AND-gate, RAND to generate a recirculate signal REC which turns on the switch S7, initiating State VI of FIG. 11F. Had the converter just been in State II of FIG. 11B, with current flowing in L, the energy thereof would cease to be transferred to load LD, and would begin to recirculated through S7 as shown by the arrow labeled IREC. Were the circuit through S7 and L lossless, current would circulate therein without diminution for an indefinite time. However both S7 and L have series resistance causing current to decay some percentage per unit time in according the inductive time-constant T=L/R where: T is the time in seconds for current to decay 63.2%, L is the inductance in Henries and, R is the resistance of the circuit in Ohms. If the decay is relatively fast, inductive eddy current losses may also occur. In the converter of FIG. 16, the peak inductive current during a recicrculating chopping-cycle is set by VLIM. If the load uses energy, inductive current will be diminished, but at the next clock signal instead of having to ramp current from zero, current may be ramped from some positive value to that set by VLIM, substantially restoring to the reservoir of recirculating inductive energy that amount of energy having been consumed by the load and by losses.

Referring to S7 of FIG. 16, signal REC drives a FET driver DRV of conventional character to turn on bidirectionally blocking and conducting switch FETs M2 and M3, also preferably like Philips part number PH2625. To cause S7 to conduct, M2 and M3 must be enhanced by DRV with a voltage higher than VP. To that end, an auxiliary voltage source VTO, equal to the turn-on voltage of M2 and M3 is stacked upon VP and may be connected to DRV by connecting nodes A and C. Alternatively, if VO is never required to be less than VP plus VTO, the source VTO may be omitted and replaced by VO by connecting nodes A and B. An auxiliary type-D flip-flop, BISR, is set by the clock and reset through gate RAND to terminate recirculation, thus initiating FIG. 11B State II should VO fall below VI. Recirculation is inhibited by BIS /Q during FIG. 11A State I through gate RAND.

Figure 17:
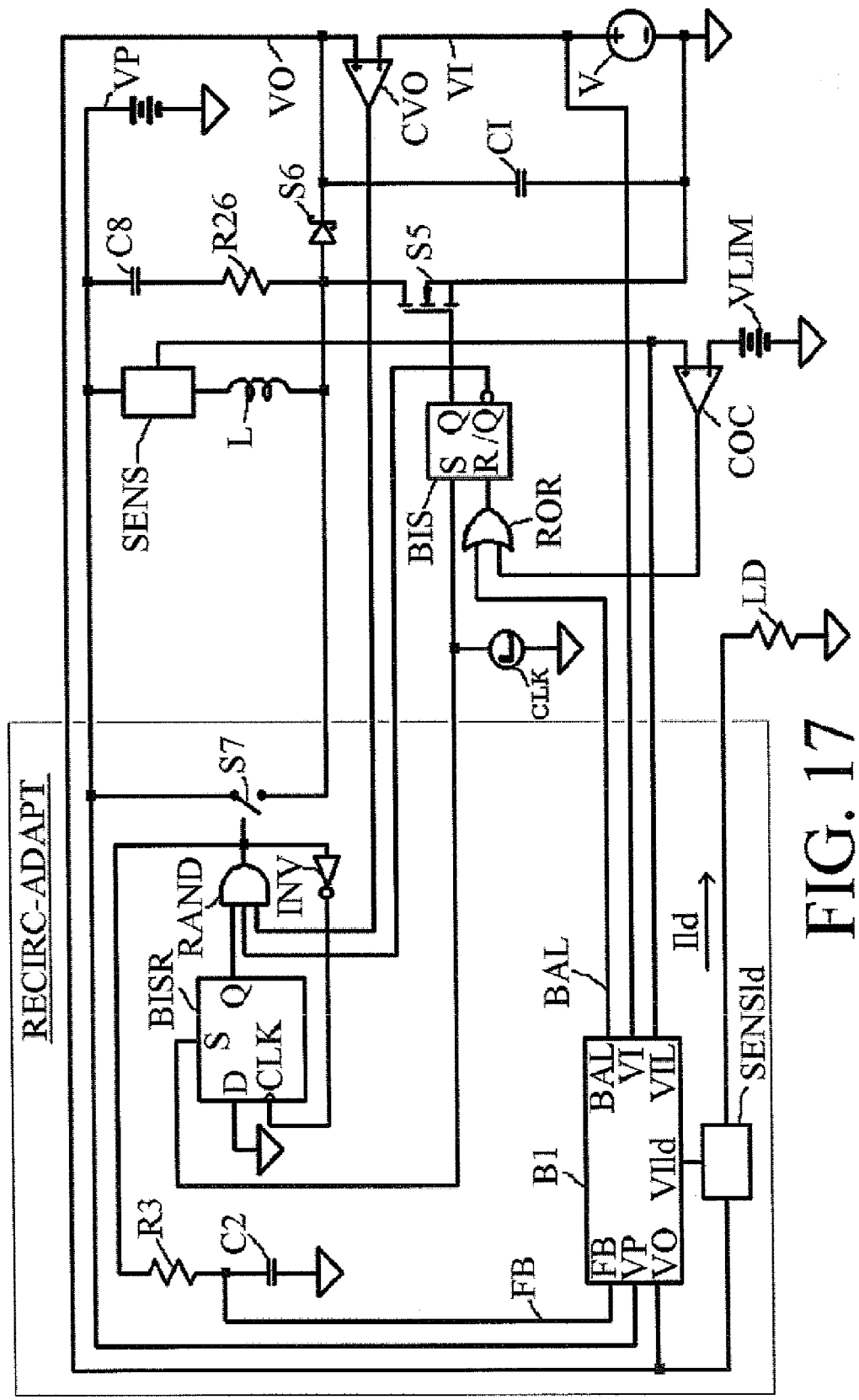
FIG. 17 shows the flyback converter of FIG. 16 with adaptation added.

FIG. 17 shows a converter employing recirculation according to this disclosure as taught in FIG. 16 combined with the predictive energy balancing techniques of this disclosure. Whilst the converter of FIG. 16 provides good regulation without energy balancing techniques, it does so by incurring the efficiency loss of maintaining a constant reservoir of circulating inductive current. In situations where operational conditions are fairly constant, the efficiency penalty caused by the preset current can be small. The converter of FIG. 17 embodies, in addition to recirculation according to this disclosure, predictive energy balancing according to this disclosure to minimize the amount of current that must be recirculated to provide good transient response.

The recirculation flyback example of FIG. 17 uses an approximate formula to determine the current required in L to provide a slight surplus of energy at the output side. The small surplus is preserved by recirculation in the switched inductor. In addition, an adaptive feedback path is provided to fine-tune the balance formula to end the energize mode such that recirculation is needed for only a brief period during each cycle. For simplicity, the recirculation principle is applied here to a unidirectional flyback converter using one switch S5 and one diode S6, plus the bipolar recirculating switch S7, comprising of M2 and M3.

The adaptive feedback methods described here could be used to adaptively adjust the preset current limit to achieve an appropriate recirculation time, that time being the interval during which the recirculation switch is closed.

The portion of FIG. 17 lying outside the box labeled RECIRC-ADAPT comprises a simple, prior-art flyback converter just as in FIG. 16. The components used for this embodiment are: R3 5K, R26 150 ohms, C2 100 nF, C8 820 pF, CI 330 uF, L 5 uH, FET switches S5, S7 all PH2625, and S6 1N5817.

As in FIG. 16, the prior art feedback loop is incomplete, creating a need that is fulfilled by an improved feedback loop according to this disclosure described below. Unlike FIG. 16, this converter, like the prior art, comprises a reset OR-gate ROR, to provide an extra input for resetting BIS when a feedback criterion has been met. Unlike the prior art, this input responds to energy prediction rather than history.

Behavioral calculator B1 implements the following formula to implement energy prediction:

BAL is true if: $(IL>VI*Ild*0.45+VO/VP*1.4+(VI-VO)*15+(1-FB)*0.15$.

The L current needed is proportional to the weighted sum of three terms: the product of VI times the load LD current, the ratio of the VO to VP, and the surplus or deficit of voltage VO at the output capacitor CI. In addition, an adaptive feedback term, FB is also included in the calculation of behavioral prediction calculator B1. FB is scaled and added to the total to account for changes in either load capacitance or switched inductance, as well as for thermal effects and any other unquantified variables. The feedback signal, FB, is the duty cycle of the recirculation control signal, averaged by R3 and C2. The calculation of B1, for determining when to switch from energize to transfer mode adaptively attempts to minimize the recirculation time based on the recent history as stored in C2. By this means, typical recirculation time is kept short, improving overall efficiency.

Edge-triggered bistable BISR and AND-gate RAND control recirculation. BISR is set by the synchronous clock to assure that an opportunity to recirculate inductor current is available only once per cycle. If the output voltage, VO, crosses above the input voltage, VI, during the flyback period, RAND begins a recirculation period by activating S7. If VO falls below VI, BISR is cleared by a positive edge on the clock terminal. Otherwise, recirculation will continue until the end of the flyback period. AND-gate RAND prevents simultaneous conduction by forcing the recirculating switch to be off when switch S5 is on.

To provide the current sensing both of IL and of Ild behavioral simulation blocks were used. For slower converters, these functions can be embodied by well-known current monitors, but for high speed converters either high speed amplifiers or composites of current-transformers supplemented by amplifiers to provide DC paths, as is taught in application Ser. No. 11/593,702, here incorporated by reference, may be used.

The principle of recirculation described here is not limited to flyback converters. It applies equally to buck and combination topologies. In all cases, recirculation can ease the difficulties of controlling CCM power converters.

V provides the input voltage VI. For a DC-to-DC converter, VI would normally be a constant voltage.

Figure 18:
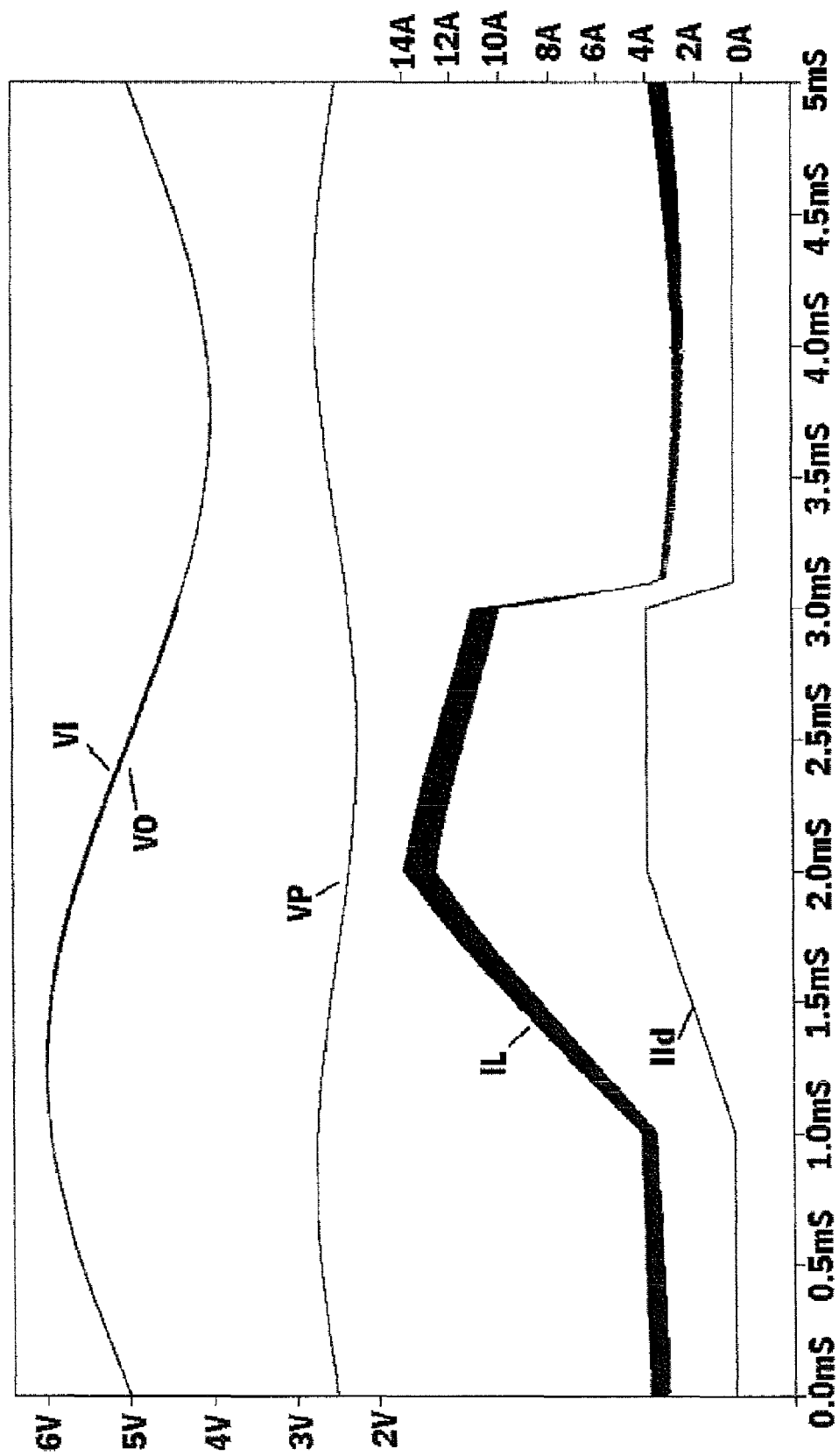
FIG. 18 shows the voltage and current waveforms for the converter of FIG. 17.

FIG. 18 shows SPICE-generated waveforms of the circuit of FIG. 17. In FIG. 18, VI is a 2 volt peak-to-peak sine wave centered at 5 volts, so that circuit behaves as a self-powered amplifier. FIG. 18 shows VP to be a sine wave centered on 2.5 volts and of 0.5 volts peak-to-peak amplitude. The load current, Ild, ramps from 0.4 to 4 amps and back. The switched inductor current, IL, is seen to be continuous for the entire time. The VI and VO traces superimpose, and are indistinguishable in this figure, with more ripple detectable during the period of higher load.

Figure 19:
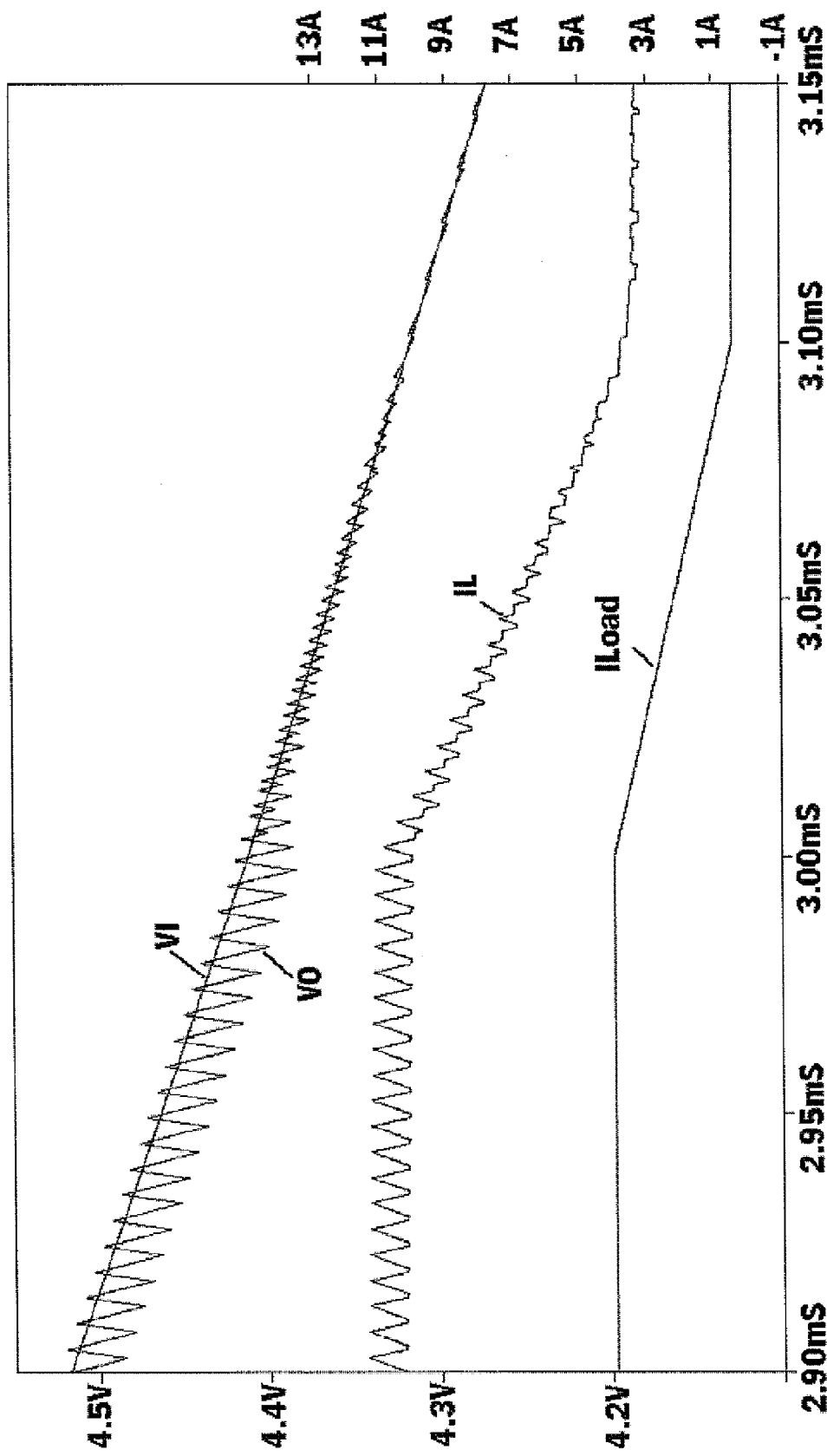
FIG. 19 is an enlargement of a portion of FIG. 18 showing recirculation action during a negative load transition.

FIG. 19 is a detail of FIG. 18 showing the recirculating action during the negative load transient. Note the substantially flat areas on the inductor current waveform, IL, corresponding to periods of recirculation, and the absence of overshoot as the load drops.

Note that if S6 acts as a synchronous rectifier during transfer, and is open during recirculation instead of acting as a diode during recirculation, that this converter is capable of stepdown, as well as stepup, operation.

Example 3

Bidirectional Flyback Amplifier with Energy Balance and Continuous Mode Operation Additional considerations must be observed when performing energy balance control for continuous conduction mode (CCM) power converters compared to discontinuous mode (DCM) converters. This example, FIGS. 20A and 20B, shows a bidirectional flyback amplifier with CCM and DCM energy balance well under control. This embodiment provides excellent efficiency because it returns any excess energy at the load to the source. Because this device functions as its own step-up power supply, the inefficiencies of conventional regulated power supplies are substantially avoided. The simulated load current shown is bipolar and symmetrical around zero. Under these circumstances, over one load cycle the net power consumption is near zero because energy is alternately transferred to and recovered from the output reactance. Also, this topology and control method performs exceptionally well as a power supply when a DC reference is provided in place of the AC reference signal.

Referring to FIG. 20A, four switches, S2, S3, S5 and S6 perform States I, II, III, and IV of FIGS. 11A-11D. State I is forward flyback energize, State II is forward flyback transfer, State III is reverse flyback energize and State IV is a reverse flyback transfer.

These states are driven by three type-D flip-flops or bistables, BISM, BISR, and BISF. All three bistables are clocked by a rising edge CLK, having a 750 nS true time every 5 uS, to establish a chopping cycle.

Upon the rising clock and in accordance with the state of the reverse-balance signal RBL upon its D-input, BISM generates a mode signal M that will persist for the balance of the chopping cycle being commenced.

The RBL signal is generated by comparator CKEC which reports the sign of the capacitive error energy dCapK, as shown in FIG. 20B.

If RBL is true, M will be true and the cycle being commenced will comprise, in succession, the forward States I and II to effect a forward flyback energy transfer from PA to PB. State I first occurs to energize L from PA. Due to the minimum true-time of CLK and its connection to BISF, PRE, the minimum time for energizing L will be substantially the minimum true-time. After the minimum true-time, for the balance of the chopping cycle, State I may be terminated and State II initiated responsive the forward balance signal FBL, which indicates that the forward balance calculator described below has predictively determined that L contains sufficient energy from source P to supply the energy demands of PB. Upon such determination, FBL asynchronously clears BISF, initiating State II, which persists until the chopping cycle ends.

If RBL is false, M will be false and the cycle being commenced will comprise, in succession, the reverse States III and IV to effect a reverse flyback energy transfer from PB to PA. State III first occurs to energize L from PB. State III may be terminated and State IV be initiated responsive the forward balance signal RBL, which indicates the reverse balance calculator described below has non-predictively determined that L has removed sufficient energy from PB, whereupon RBL asynchronously sets BISR, initiating State IV, which persists until the chopping cycle ends.

Between the aforementioned bistables and switches is a decoder comprising AND-gate ANDI for generating a signal I corresponding to State I of FIG. 11, and AND-gates ANDII, ANDIII, and ANDIV for likewise generating their respectively corresponding signals II, III, and IV. This decoder may be embodied as discrete logic as shown, as a behavioral state decoder as will be shown in other figures, as a well-known PLD, as a table executed from a processor, or by other well-known means.

Through OR-gate OR5, switch S5 functions unconditionally as a bidirectional switch in State I. However also through OR5 and through AND-gate SRAND5, and responsive to synchronous rectifier comparator SRC5, S5 also acts as a synchronous rectifier during State IV. Here, as in the International Rectifier part IR1167, synchronous rectification is be based on switch voltage, but may alternatively be based on switch current, as is well-known. The operation of S6, OR6, SRAND6, and SRC6 is analogous to that of S5 and its associated circuitry.

As taught above, and also well-known, an inductive energy sensor SENS generates a signal VIL responsive to current, field or E-T product in L.

This converter may comprise inductive current limiting and output voltage limiting described above and also well-known.

Referring now to FIG. 20B, there is shown the timing and balancing circuitry that generates the signal CLK, RBL, and FBL that control the bistables of FIG. 20A.

Timing generator TG generates a clock signal CLK, a pre-clock signal PCK, and a descending ramp dT, as taught in FIG. 12, representing time remaining in a chopping cycle. Here CLK has a true-time that is used to set a minimum pulse width. PCK actually occurs just before the end of a previous cycle. Comparator CTM compares dT with a threshold Tmax to set minimum forward transfer time, based on the remaining time in the chopping cycle, overriding through OR-gate BALOR the balance signal BAL and initiating State II of FIG. 11B.

In this simulation, TG provides a synchronous 750 nS CLK pulse every 5 us. TG also supplies late in a previous cycle, an identical pulse, PCK, 50 ns prior to the CLK pulse closes switch S11 to store the previous cycle's KEL value in C12. TG generates dT with a slope of $-1V/uS$.

The RBL signal is generated by comparator CKEC which reports the sign of the capacitive energy difference dCapK.

KEL is the inductive energy calculator described in FIG. 12. Since, in this converter, inductive energy can be of either polarity KEL's output is processed by multiplier MSGN and comparator CILSGN to endow it with a sign responsive to the direction of inductive current to generate a signal KELs.

At the end of a previous cycle PCK briefly closes S11 to store in C12 a sample of the "pedestal" KEL of IL, which relates to the energy remaining in L at cycle's end, Klastped. Through pedestal summer SUMPED the predicted pedestal Kpp is subtracted from Klastped, and scaled by the factor 0.9 in multiplier MPED, this predicted change in pedestal is subtracted from KELs to generate a new inductive energy signal, avKEL.

A predictive pedestal current calculator comprising S12, CPRRCT, SUMdVL, S13, CILdMIN, DIVdIL, MdIL, and SUMILd, generates a signal PREDICT predicting the current at present cycle's end. The signal PREDICT is generated as follows: Summer SUMdVL generates a signal dVL representing the de-energizing voltage across L during State II. MdIL multiplies dVL by dT, representing remaining cycle time, to generate a signal which is divided by VL, a voltage representing the value of L as taught in FIG. 12, by divider DIVdIL to generate a signal dIL, the available de-energization of inductive current. Signal dIL is computed according to the classic formula $dI=E*dT/L$ where dI is current change, E is inductor voltage, and L is inductance.

SUMILd subtracts that predicted change from the present inductive current, represented by VIL, to generate a signal, ILd, predicting current at cycle's end. Comparator CILdMIN and switch S13 select the lesser of ILd and the constant 20 to prevent instability should impossibly large pedestals be temporarily predicted.

Comparator CPRRCT and S12 half-wave precision-rectify the signal selected by S13 to generate the signal PREDICT. To convert PREDICT from a current signal to an energy-proportional signal it is squared and multiplied by VL in MKpp to generate the predicted pedestal energy signal Kpp.

The avKEL calculation helps account for a seeming contradiction which has confounded prior art continuous control methods. Because inductive energy relates to the square of the current, more energy per ampere of current change can be transferred at higher continuous currents. If all the energy in a CCM switched inductor is transferred to the load, there may not be time to recharge the inductor to the level necessary during the next energize cycle. In order to avoid subharmonic behavior, the continuous inductive energy must be conserved for subsequent cycles. For control according to this disclosure, the energy to be retained in the inductor is mathematically subtracted from the total inductive energy, KEL, as is done in SUMKEL, term to obtain the signal avKEL, or available inductive energy.

If the pedestal is predicted to decrease, the avKEL term is reduced, extending the energize period and thereby preserving more pedestal current. Conversely, if the pedestal is predicted to increase, the avKEL term is augmented, causing earlier termination of the energize mode and a smaller increase in the pedestal current. This process has the effect of limiting targeted changes in pedestal energy to 10% per chopping cycle. Because of energize and transfer time limits, and because operating conditions can change dynamically, actual cycle-to-cycle pedestal variation can be larger than the target percentage. The exact percentage used in this calculation is non-critical. Even 100% produces acceptable results.

By using avKEL as the inductive energy term in the balance detected by CBAL, smooth behavior around the transition between DCM and CCM can be achieved. Any mechanism which has the effect of limiting the cycle-to-cycle variation of continuous current for improving regulation is practicing this disclosure.

The capacitive side of the balance equation is similar to the other predictive flyback converters of this disclosure. dCapK is the difference in capacitive energy as described in FIG. 12. It is multiplied by the capacitance by MKEC and compared with inductive energy by CBAL to generate the balance signal BAL.

Note that both DCM and CCM transfers are possible in both forward and reverse directions.

The capacitive term VCsc would yield unity loop gain with 0.5V per Farad. In this simulation it is slightly attenuated to 0.35 to reduce sampled loop gain and thereby obtain better loop stability.

Adaptive methods can be used to account for changes in L and C, similar to those shown in FIG. 14. A load term could be added to speed response to sudden load changes, also illustrated in FIG. 14.

Figure 21:
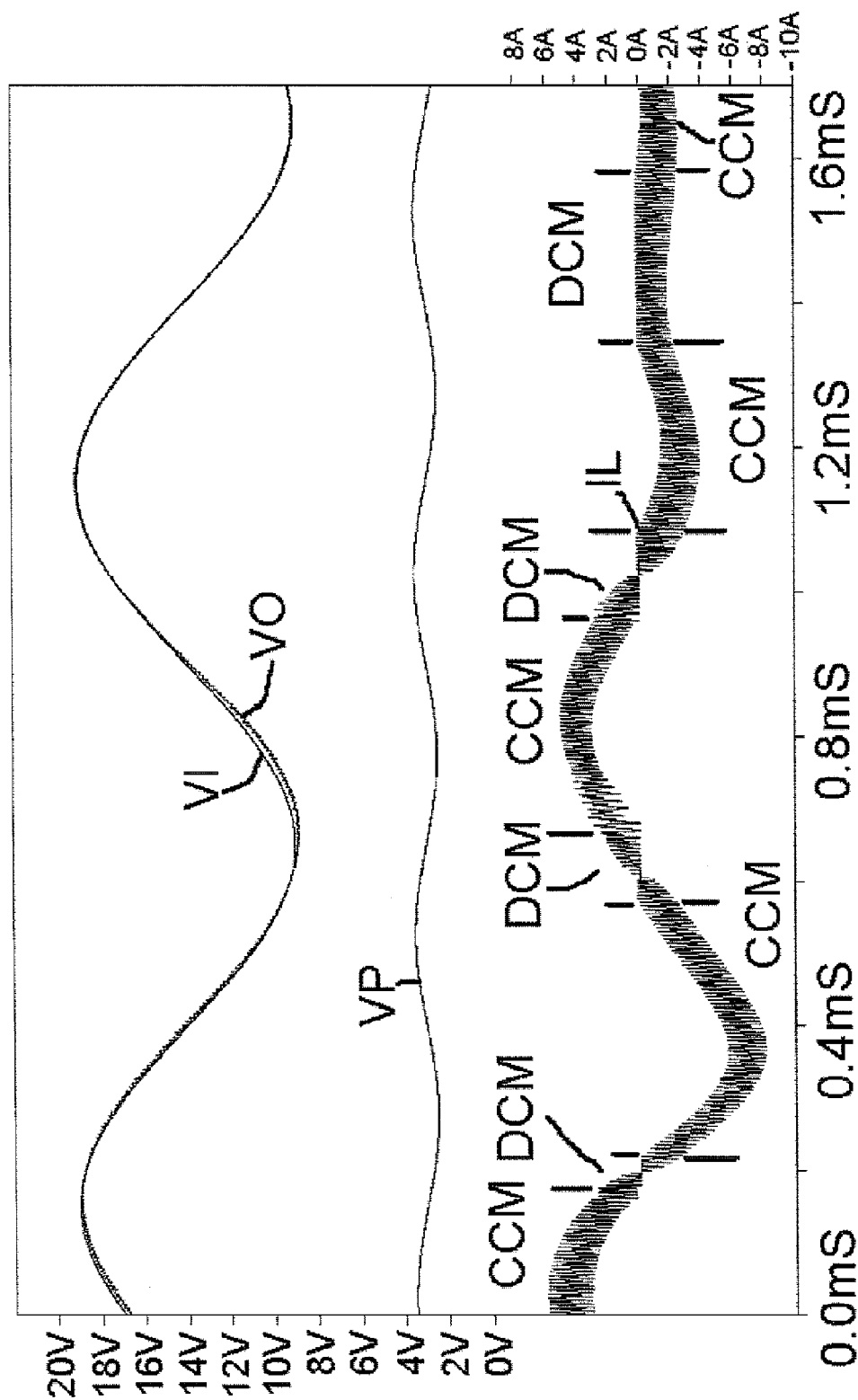
FIG. 21 shows the voltage and current waveforms for the converter of FIGS. 20A and 20B.

FIG. 21 shows VP to be a sine wave centered on 3 volts and of 1 volt peak-to-peak amplitude. The load current is a 1.5 KHz sine wave centered on zero, swinging plus and minus 0.5 amps (not shown). The switched inductor current, IL is seen to be both continuous and discontinuous in both the positive and negative directions. The VI trace swings 10 volts peak-to-peak at 1 kHz, centered on 14 volts. The output, VO, closely follows the VI signal. DCM and CCM periods are marked appropriately.

Example 4

Figure 23:
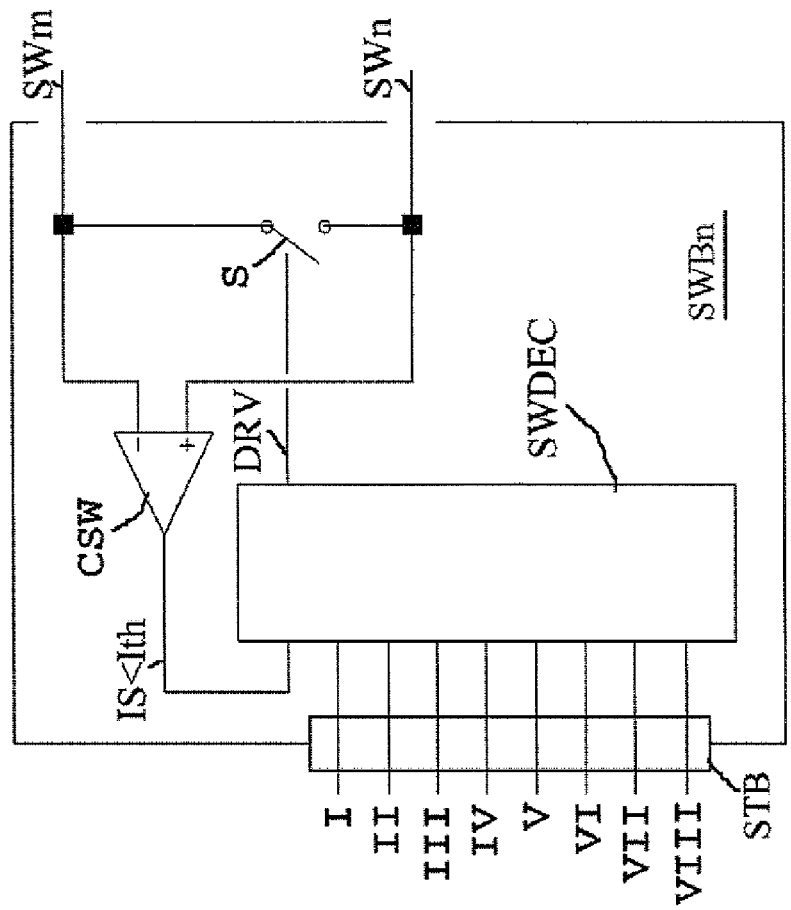
FIG. 23 shows a schematic of the switch blocks used in the switches of the implementation shown in FIG. 24.
Figure 22:
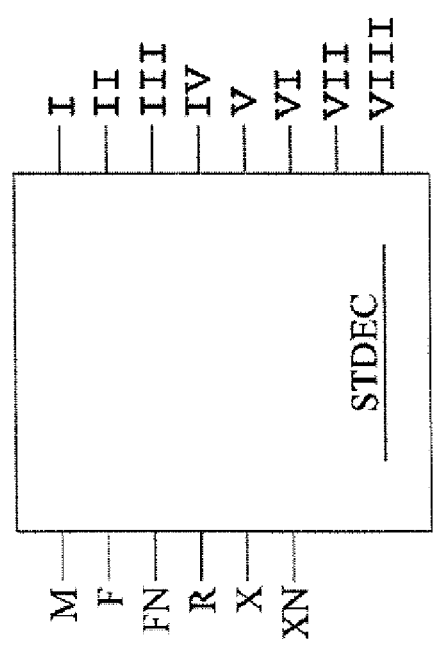
FIG. 22 shows a state decoder used in the implementation shown in FIG. 24.
Figure 24:
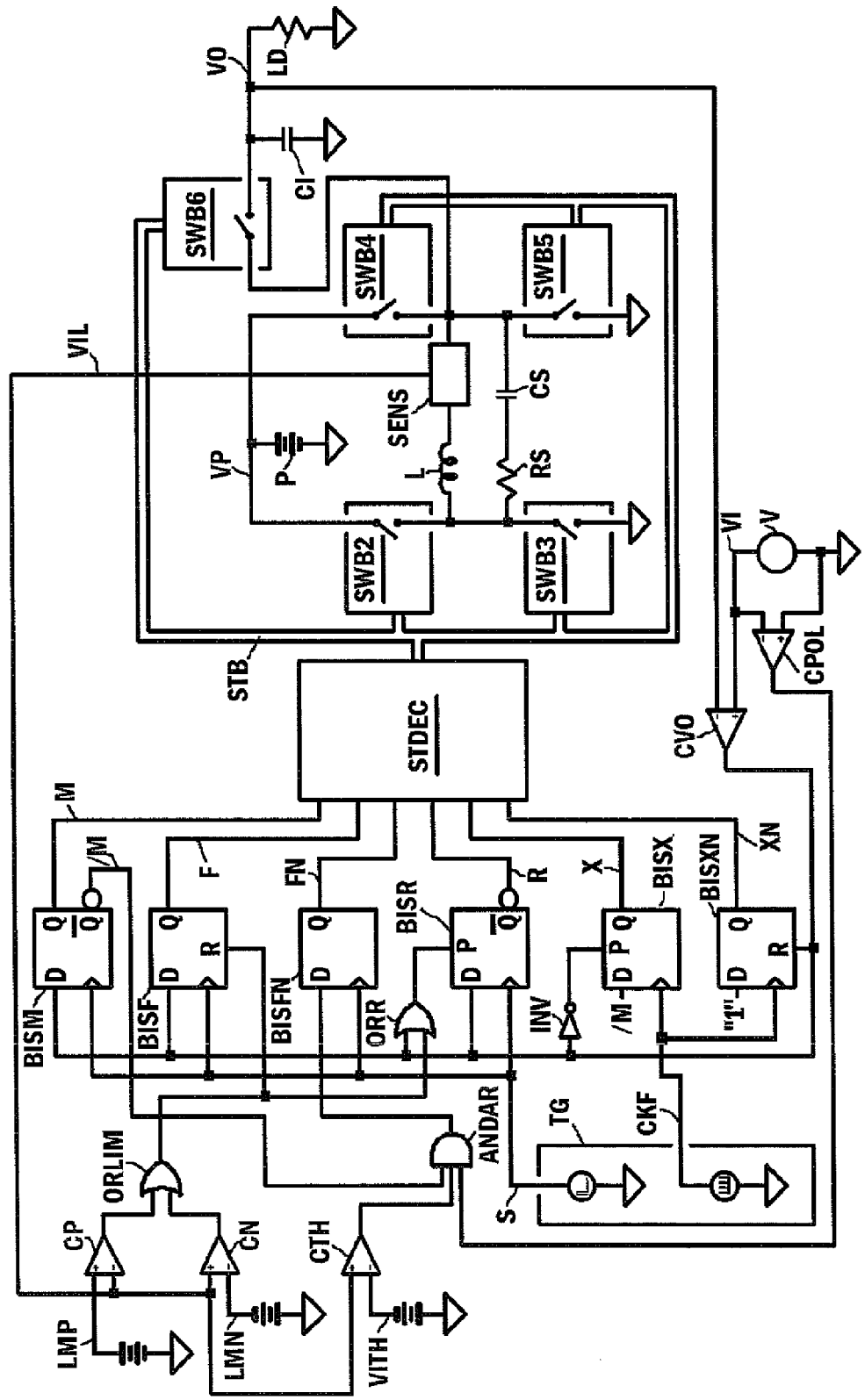
FIG. 24 shows a five switch bidirectional flyback amplifier with inductive energy storage.

Bidirectional Flyback Amplifier with Inductive Energy Storage for Improved Agility In situations where transient response is of paramount importance, extra energy can be stored in the switched inductor so that it is immediately available to supply the load. The energy balancing techniques of this disclosure have been shown to be valuable for controlling converters which maintain extra energy in the inductor (see FIG. 10). The recirculation technique, FIG. 18, is another means of storing extra energy inductively. The five-switch example shown here in FIGS. 22 through 24 is another novel way to approach the same problem. Again, for simplicity, this example illustrates the new technique in a converter without energy balance. Energy balance could be added for improved efficiency. In this case, regulation is near ideal, so little transient performance could be gained from energy balancing.

Figure 25:
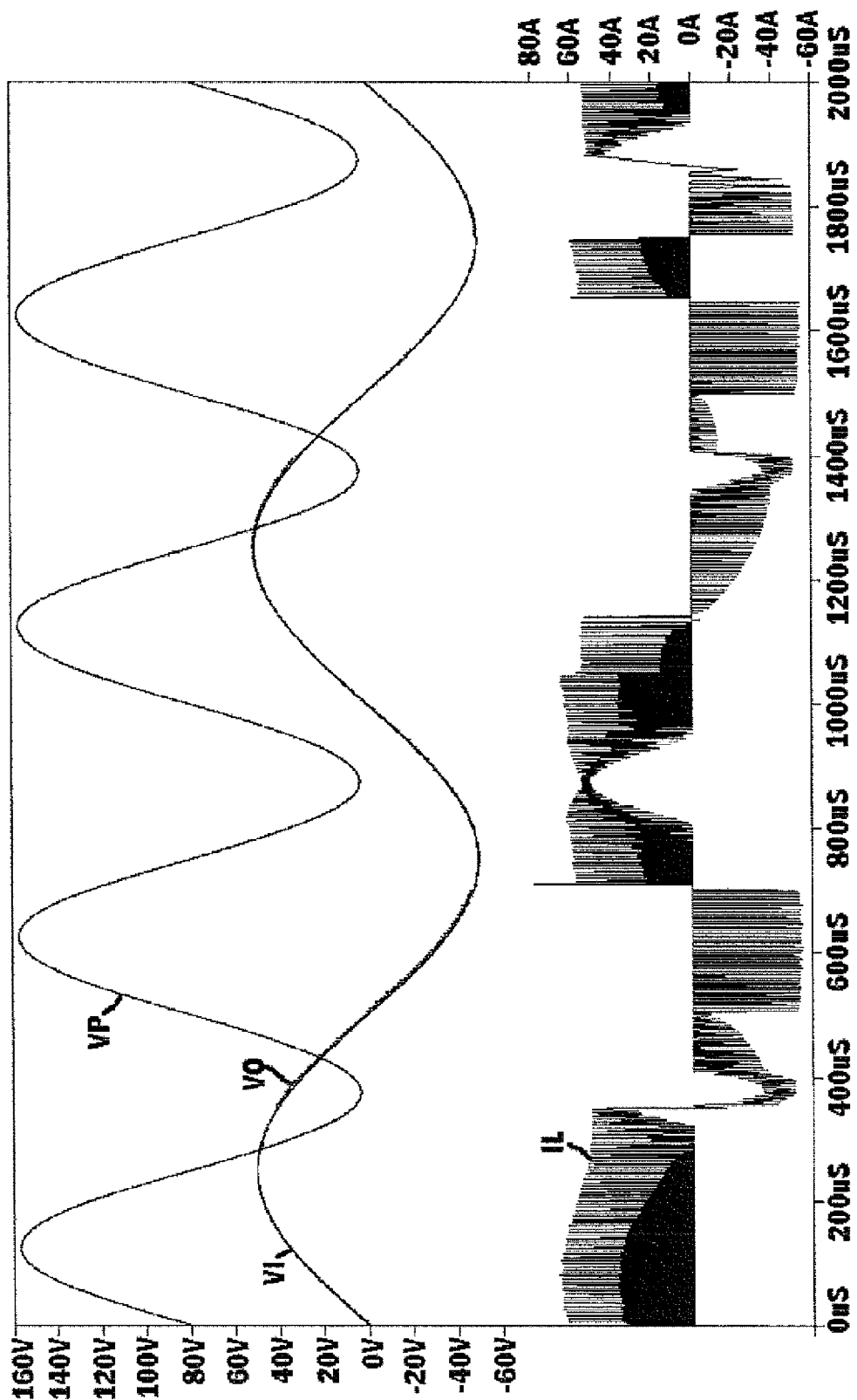
FIG. 25 shows the voltage and current waveforms for the converter of FIG. 24.
Figure 26:
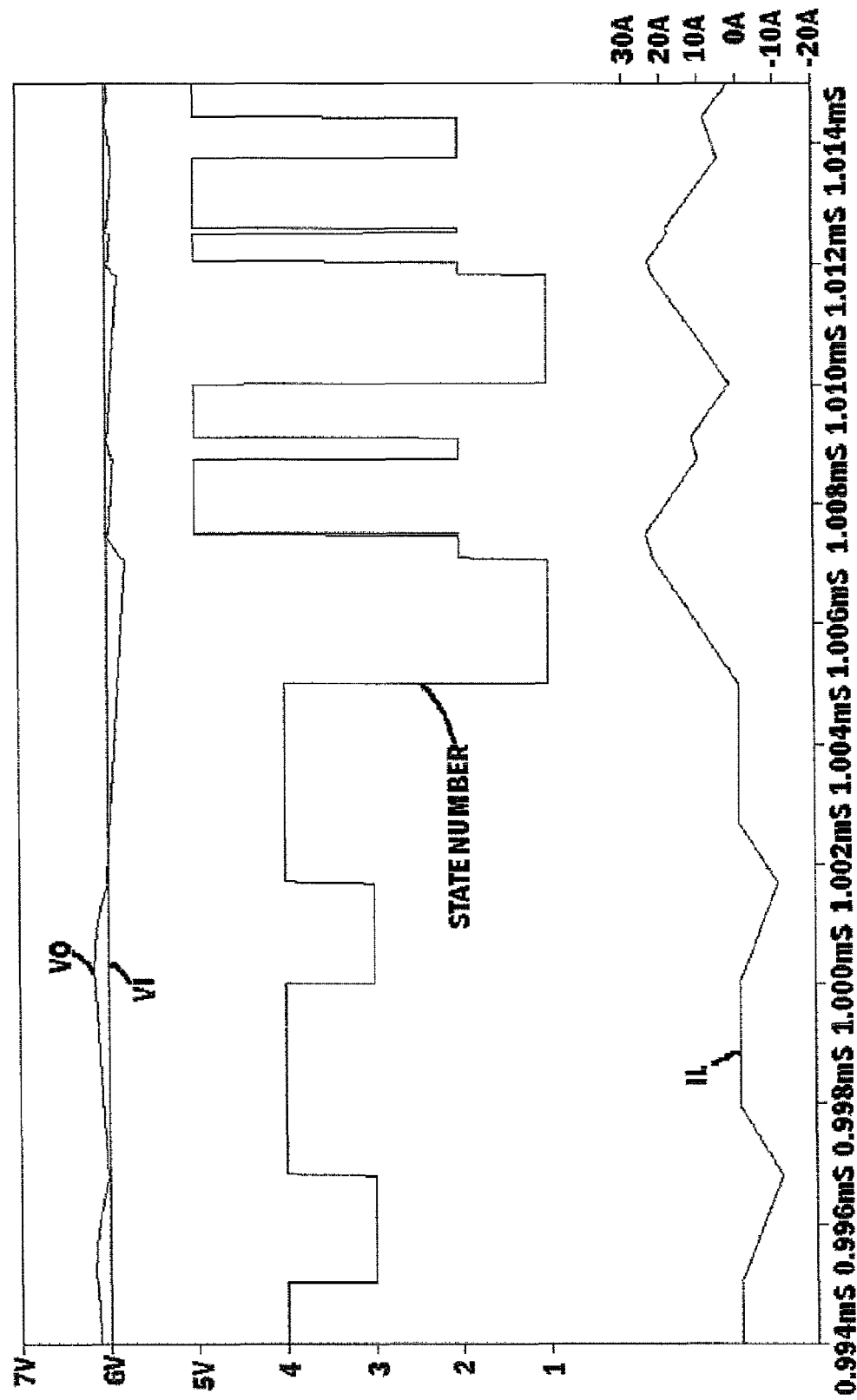
FIG. 26 shows additional performance of the converter in FIG. 24.
Figure 27:
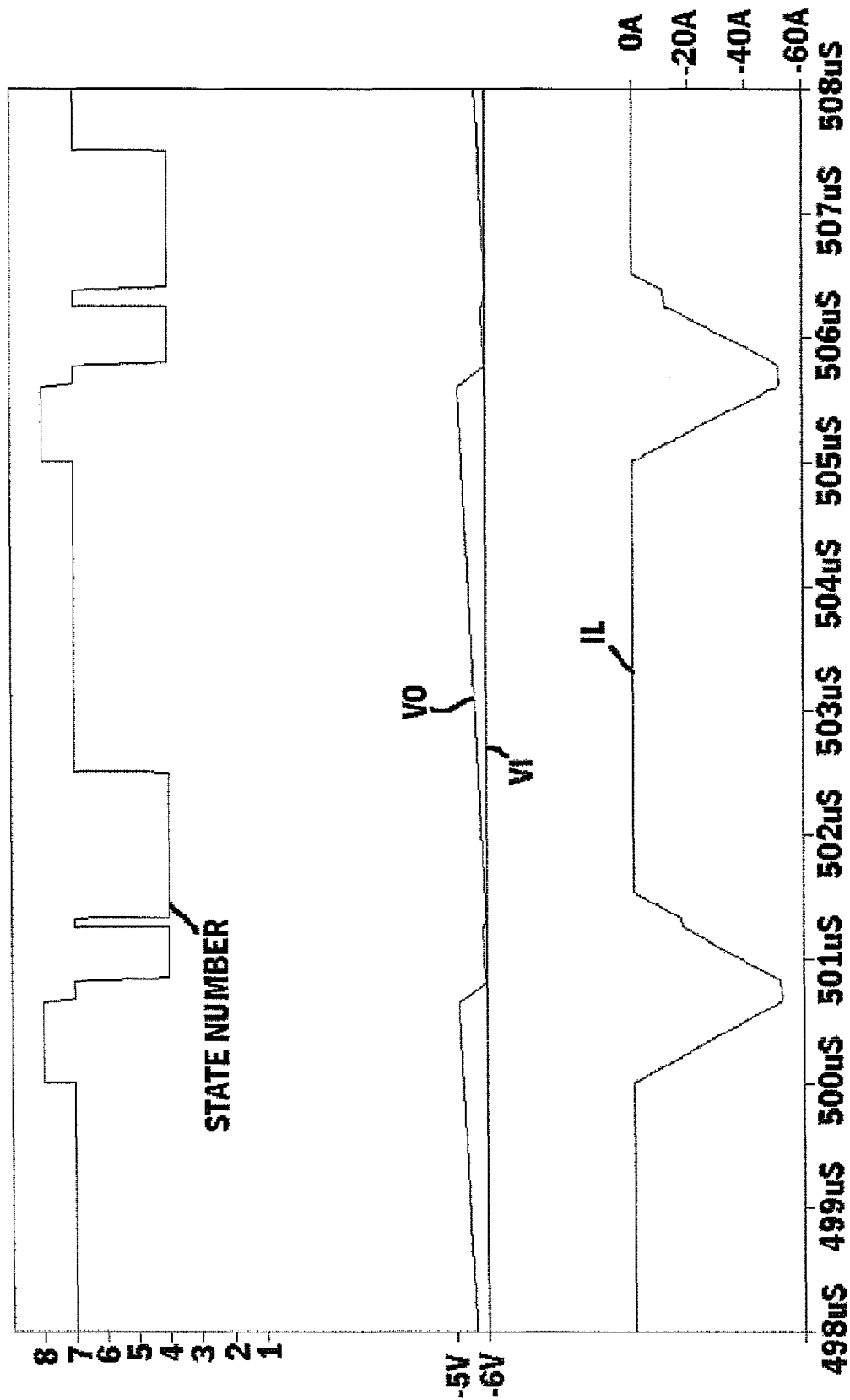
FIG. 27 shows additional performance of the converter in FIG. 24.

This example shows a bidirectional flyback amplifier with bipolar output with any continuous conduction under control. The following advantages of example 3 pertain here, as well: Because this device functions as its own power regulator, the inefficiencies of conventional regulated power converters are avoided. The simulated load shown in FIG. 25 is bipolar and symmetrical around zero. Under these circumstances, the net power consumption for a complete load cycle is near zero because energy is alternately transferred to and recovered from the output. Efficiencies well over 90% are practical using this approach. Also, this topology and control method performs exceptionally well as a power supply when a DC input is provided in place of the AC input signal VI as shown in FIGS. 26 and 27.

Referring to FIG. 22, there is shown a state decoder STDEC for generating the States I through VIII of FIGS. 11A-11H responsive to the outputs of flip-flops to be shown below in FIG. 24 in accordance with the following logical expressions:

State $I = M\&F$

State $II = M\&/F\&/X$

State $III = /M)\&R\&/FN$

State $IV = /M)\&/R)\&/FN/M\&/R\&FN\&/XN$

State $V = M\&/F\&X$

State $VI$=absent, used only in FIGS. 16 and 17

State $VII = /M\&/R\&FN\&XN$

State $VIII = /M\&R\&FN$ where the signals cited correspond to those illustrated in FIGS. 22 and 23, and to the like-named States of FIGS. 11A-11H, and "&" represents the logical AND function, "|" represents the logical OR function, the prefix "/" performs the logical NOT upon its suffix.

In this example shown more fully in FIG. 24 below, one state decoder STDEC serves several switch-blocks, an example of which is illustrated in the switch-block SWBn of FIG. 23. It is to be understood that the n of SWBn is to be a digit, here 2 through 6, representing an instance of SWBn corresponding to S1 through S6 of FIGS. 11A-11H.

The signals cited and present constitute a State bus STB of signals to which SWBn responds. Each instance SWBn has a unique decode function implemented by switch decoder SWDEC, which is responsive to signals of STB and to a signal IS<Ith which is generated by a comparator CSW responsive to voltage across switch S. Thus the SWBn performs the "until Ith" function. Decoder SWDEC generates a signal DRV to drive S to close a circuit between terminals SWm and SWn, the latter corresponding to the terminals of one switch of FIGS. 11A-11H. Decoder SWDEC responds in its instances to STB and IS<Ith in accordance with the following logical expressions:

SWB2=$(I\&IS<Ith)|II|IV$

SWB3=$((III|VII)\&IS<Ith)|V$

SWB4=$V\&IS<Ith$

SWB5=$I|(IV\&IS<Ith)$

SWB6=$(II\&IS<Ith)|III|VII$

Referring to FIG. 24, five instances of SWBn, labeled SWB2 through SWB6, perform switch decoding and switching correctly to function as S2 through S6 respectively of FIGS. 11A-11H.

The five-switch power converter of FIG. 24 is similar in topology, but not in control, to the four-switch continuous example of FIGS. 20A and 20B. S7 and State VI of FIG. 11F are not used in this example.

As in FIGS. 20A and 20B, a timing generator TG provides a set-pulse S to commence each chopping cycle, causing BISM, BISF, and BISR, through comparator CVO, to latch data responsive to the polarity of any difference between VO and VI. BISM holds that data until cycle-end. BISF, and BISR respond to asynchronous events as previously described in FIGS. 20A and 20B. SENS senses inductive energy as in FIGS. 20A and 20B. Thus, for moving positive energy from PA to PB, energize State I begins, followed by forward transfer State II. TG of FIG. 24 also comprises a fast clock, CKF, that generates a plurality of transitions within a period of S. FIG. 24 further comprises a new flip-flop BISX which follows /M at the first clocking transition of CKF following S, thus resetting BISX early in a positive energy moving cycle. In FIGS. 20A and 20B, State II would persist until cycle-end, but in FIG. 24 if the regulation voltage is reached, comparator CVO, through inverter INV, resets flip-flop BISX to invoke State V of FIG. 11E. When State V supersedes State II, returning excess inductive energy to PA rather than creating excess voltage at PB.

FIG. 24 further comprises added switch S4, comprised by a switch-block, SWB4, to embody an additional transfer mode corresponding to State V which returns un-transferred energy directly back to the power input port. In FIG. 24, instead of precisely metering the energizing of L during the energize state, L is loaded with a substantial excess of energy controlled by inductive current comparators CP and CN responsive to the difference between VIL and their respective limit signals LMP and LMN.

Thus, as in the six-switch example of this disclosure, the transfer portion of the cycle is divided into sub-cycles, but with CKF running at a higher frequency than S there can be numerous sub-cycles per period of S.

For the positive polarity, States II and V alternate, responsive to the comparator CVO, for the remainder of the transfer time until the end of the chopping cycle. The inductor current continues to flow in the same direction during State V, but is now directed back to the input port, as shown in FIG. 25. For the negative polarity, States VII and IV likewise alternate.

Such division of each cycle into three or more active portions (plus a possible additional period of depleted inductor current) for the purpose of improved regulation is unknown in the prior art. FIG. 25 shows the improvement achieved by adding a 800 kHz clock for CKF. It is evident from FIG. 25 that a multi-phase converter could reduce ripple by maintaining one phase in transfer alternation at all times. The possible improvement in ripple reduction is more than a factor of four.

Reverse transfers here are essentially identical to the four-switch example shown in FIGS. 20A and 20B.

In order to control negative voltages with either polarity of load, a new flip-flop, BISFN, which is set when the alternation of States III and IV are not sufficient to drive the output far enough negative. Under those circumstances, AND-gate ANDAR, responsive to VO, to /M and, through CTH, the polarity of inductive current, will generate a clock to set BISFN. ANDAR determines that the inductor could not gain significant negative charge during State III of a reverse transfer. BISFN, once set, causes State VIII to be used as the negative energize state, followed by the State VII to transfer negative energy from the input to the output.

If sufficiency is obtained, bistable BISXN is cleared by the output of comparator CVO. That causes State IV to be invoked, to return excess negative energy to the input. The bistable BISXN is clocked by CKF to prevent rapid alternation of States VII and IV. This negative forward transfer sequence matches the normal forward transfer sequence in all regards except the polarity of the inductor current.

This example uses no prediction to determine the appropriate duration of the forward or reverse energize modes. For regulation, it relies entirely on returning excess energy to PA, and in so doing incurs a surprisingly small efficiency penalty. Small additional complexity would allow predictive or adaptive forward energize modes. That would permit an adaptive tradeoff between maximal efficiency and best transient response by adjusting the percentage of inductively stored energy. No A/D converters save single-bit comparator functions are needed for a digital implementation of this technique and no computations more complex than magnitude comparisons, analog or digital, are required.

Note that the ratio of power input to output voltage in this example is not constrained to a narrow range as in prior art devices. This advantage is gained by avoiding PWM control. Also note that, with some additional control logic, PA could be made bipolar without the addition of another switch because the inductor can be energized in either polarity for the forward energize and can be discharged in either polarity for the reverse transfer modes. Only the control logic to exchange S2 for S4 and S3 for S5 in the presence of a negative VP would be needed.

A comparator that provides the polarity of the error voltage CVO and an overcurrent detector for the switched inductor, CP, CN, and ORLIM, are the only required inputs if the switches have the "until Ith" function built-in, like the International Rectifier IRF 1167. The various switch combinations can be programmed into to a solid state memory and indexed by address lines related to time, polarity and overcurrent as in the well known "state machine", can be programmed into a microcontroller, or other programmable logic device, or can be reproduced using discrete components.

Note that though this example is based on additive flyback forward transfers, it can faithfully reproduce output voltages that are below the input voltage and are positive or negative. The ability to maintain good regulation for step-up and step-down operation with as few as two comparators for control is unique to this disclosure.

FIG. 25 shows the behavior with a 1 kHz sine wave input signal, VI, with a peak-to-peak amplitude of 100 volts, centered on zero volts. The load current switches from plus 2 A to minus 2 A at 350 uS, back to plus 2 amps at 700 uS, and then to minus 2 A at 1050 uS. The power input voltage, VP, is a 2 kHz sine wave varying from 3 to 157 volts. The output voltage VO and input voltage VI are superimposed and are hard to distinguish here. The inductor current, IL, is seen to be both continuous and discontinuous in both the positive and negative polarities. Note the very minor output disruption at the load transitions due to continuous mode operation. Load transients that do not cross the DCM/CCM boundary are nearly invisible. The ability of an additive flyback converter to handle output voltages much above, much below, or equal to the power input voltage is novel.

FIG. 26 shows multiple states being used during single chopping cycles. The input voltage VI is steady at 6 volts. At 1.002 mS, the load changes from minus 2 to plus 2 amps. Before the load transition, States III and IV are alternating to effect reverse energizing and transfer. After the load transition, the inductor current moves in the positive direction during the forward energize, State I. It rises for approximately 2 uS, then more slowly (due to the additive nature of the transfer) during the brief forward transfer, State II. State V follows, causing inductor current to flow back to the input PA. States II and V alternate once more before the end of the chopping cycle. The next forward cycle begins with State I at 1.01 mS. Note that the VO trace just touches the VI trace at the end of each asynchronously terminated state, except for State I, which is terminated by the inductive current limit.

FIG. 27 also shows the use of three states per chopping cycle, this time with the input voltage VI steady at −6 volts. State VIII energizes the inductor, followed by State VII, which transfers energy until sufficiency, causing State IV to be invoked. State IV returns excess energy from the inductor to the input side. States VII and IV alternate once more before the end of the chopping cycle.

In a flyback converter it is usual for a diode or a synchronous rectifier, corresponding to S6 of FIGS. 11A-11H, to switch ON upon the condition that inductor voltage exceeds output voltage, VO. According to this disclosure, adding to that basis the condition that desired input voltage, VI, exceed output voltage, VO, as shown in FIG. 24 allows this flyback converter, unlike the prior art, to generate VO substantially less than the inductor energizing voltage VP. To obtain this improvement, should the magnitude of VO exceed that of VI during State II, State V is invoked, turning off S6 to avoid generation of excess VO. It should be understood that an alternative path for any current in L must be provided to avoid excessive voltage. The recirculating examples of FIGS. 16 and 17 provide such a path by recirculation. FIG. 24 provides such a path by invoking State V after forward transfers and State IV after negative forward transfers.

In FIG. 24, this improvement is embodied through the term "X" that appears in the logical definition of State V, State $V = M\&/F\&X$ Without adaptive techniques, recirculation according to FIG. 16 or reverse transfer according to FIG. 24 will incur some inefficiency. However if an adaptive technique such as that shown in FIG. 17 be employed to change the current limit responsive to the time spent in recirculation, or to minimize the time of energy return, efficiency may be maximized.

Higher IL pedestal currents tend toward better transient response but may adversely affect efficiency. The current limit may be set in advance, or adaptively, to adjust the tradeoff between efficiency and transient response.

Since the converters of FIGS. 16, 17, and 24 make only current limit decisions during the forward energize state, extremely short energize times can be safely controlled. The result is stable operation with higher VP voltages than are practical with conventional converters that tolerate only limited ratios of VP and VO.

VP must be high enough to energize the switched inductor sufficiently in the energize time available, and lower than the voltage rating of the input switches. Those limits are much broader than the existing art.

The combination of tolerating much higher input voltages, and the ability to produce a VO below VP make flyback power converters according to this disclosure much more flexible than prior-art power converters. A prior-art buck converter only produces voltages below VP, a prior-art boost or flyback converter normally requires VO to be greater than VP, a buck/boost inverter usually requires the absolute value of VO to be greater than VP, and a SEPIC converter allows VO to equal VP but at the cost of a second inductor. The buck/boost topology is the most flexible for input and output ranges but it is rarely seen. Lackluster efficiency and difficulty controlling the buck/boost topology using PWM techniques may explain that rarity. Buck/boost converters, when functioning in buck mode, show instability near the DCM/CCM boundary. Also, the lack of recirculation or energy return capability often leads to the stability issues common to this type of converter, obviating much of the potential advantage of extended input and output range.

Conventional converters have additional constraints on the ratio of VO to VP due to the need to avoid extreme duty cycles. Accepting a VP range of more than five to one is rare in conventional converters and those that have extended input ranges are often limited to a single output voltage. Those conventional converters that do have adjustable outputs are normally only adjustable over a narrow range. Example 4 shows a flyback converter that can accept a VP varying by more than 50 to 1, and can produce a VO from zero to more than ten times VP in either polarity. It can also allow VO to equal VP. Because that flexibility can be gained with only comparators and logic functions for control, power converters based on example 4 can economically replace many different narrow-range power converter products.

Example 5

Application to CCM Flyback Regulation

A fundamental difference exists between the discontinuous conduction mode (DCM) and continuous conduction mode (CCM) operation of a flyback converter.

In the DCM, inductor current is reset to zero by the end of a chopping cycle. There is, therefore, no memory of previous cycles carried in the inductor.

Since inductive energy is proportional to the square of current, a given current change can transfer more energy at a higher current than at a lower current. Since current change is proportional to time, more energy per unit time, both into and out of the inductor, can be moved through the inductor at a higher current.

As long as a converter remains in the DCM mode, the current needed to supply the load is attained within a given cycle, but in the CCM mode a non-zero inductor current. or pedestal, continues from cycle to cycle. When load changes, the pedestal must be adjusted. With a given inductor, higher loads require higher pedestals than lower loads. Since inductor current cannot be changed instantaneously, time is required to adjust the pedestal to sustain an increased load, and many cycles may be required to increase or to decrease the pedestal. Managing the CCM flyback converter pedestal using restraint and the needed counter-intuitive response is an aspect of this disclosure. There are many ways to implement such management. Usually pedestal management for the time-constrained synchronous converter is the difficult case, so that will be addressed below.

In one management method according to this disclosure, shown in Example 3, the pedestal that would remain at cycle end, should a transfer state be immediately initiated, is predicted during the energize state based on inductance, the voltage across the inductor, and the time remaining within the cycle for an energy transfer state. If the majority of the energy represented by the predicted pedestal current is retained for the subsequent cycle, both excellent regulation and well-damped response can be obtained. This method is very helpful for load increases.

When load increases, output voltage tends to fall, causing prior art regulators to increase energize-mode duty-cycle, often so precipitously that the remaining cycle time is insufficient for efficient energy transfer to the load. Such a response exacerbates the transient decrease of output voltage, and often incurs subsequent over-correction. Moderation according to this disclosure is practiced by predicting the pedestal value and limiting its per-cycle change to damp the transient response of the regulator.

Another management method uses a compound prediction. The maximum energy deliverable in the next cycle is based on the predicted pedestal at the end of the present cycle. If and when that maximum energy falls below the energy predicted to be delivered in the present cycle, the present energize mode is terminated. Note that prior art regulators respond to past cycles rather than to predictions of present and future cycles.

The present disclosure is practiced whenever predicted present cycle or future cycle pedestal currents, in combination with or ignoring past pedestal currents, are conserved or reduced for future regulation. The present disclosure is practiced whether the predictions used for pedestal control are responsive to inductor current, magnetic field, or calculated integration of inductor voltage-time product.

Pedestal control according to this disclosure does not interfere with DCM converter operation, inasmuch as the pedestal simply becomes zero and has no effect. Transitions between DCM and CCM are graceful as shown in FIG. 21.

Pedestal control moderates energy flow to minimize load-induced transient disturbances, but does not add or subtract another energy source substantially to eliminate such disturbances. Just as prediction can be used to mitigate disturbances, is can also be used to connect energy sources and/or sinks to the load or switch taps on the inductor. Such switching exploits the advanced knowledge gained by prediction substantially to cancel transients. An arrangement that is particularly advantageous in the common case of a load that alternates between two levels is to switch any overshoot energy from a load decrease into a storage capacitor. When the load resumes its former level, the energy in that capacitor is switched to cause it to support the load while the pedestal is readjusted. This disclosure is also practiced when pedestal prediction is used to connect an auxiliary energy source or sink to the inductor and/or load. In many converters, the switches required for transient cancellation already exist and need merely to be correctly configured to effect cancellation. Such prediction can also be used to invoke inductive energy storage by circulation as taught elsewhere in this application.

It is understood that the disclosure is not limited to the disclosed embodiments, but on the contrary, is intended to cover various modifications and equivalent arrangements included within the spirit and scope of the appended claims. Without further elaboration, the foregoing will so fully illustrate the disclosure, that others may by current or future knowledge, readily adapt the same for use under the various conditions of service.

We claim:

1. A switched-mode power converter comprising:
at least two power-moving ports comprising a power input port and a power output port;
an inductive reactor;
a plurality of switches configured to selectively connect the power input and output ports to the inductive reactor;
demand computation circuitry configured to compute an energy demand for the converter based on (i) a reference signal and (ii) an output signal based on a voltage or current at the power output port;
supply computation circuitry configured to compute an available inductive energy supply based on instantaneous inductive energy presently stored in the inductive reactor, wherein the available inductive energy supply is an amount of inductive energy presently stored in the inductive reactor that is available to be transferred to the power output port during a present chopping cycle for the converter; and
control circuitry configured to control the switches based on (i) the energy demand and (ii) the available inductive energy supply.

2. The converter of claim 1, wherein the supply computation circuitry is configured to compute the instantaneous inductive energy based on current in an inductor winding.

3. The converter of claim 1, wherein the supply computation circuitry is configured to compute the instantaneous inductive energy based on a signal from a magnetic field sensor.

4. The converter of claim 1, wherein the supply computation circuitry is configured to compute the instantaneous inductive energy based on integration of a volt-time product having been applied to the inductive reactor.

5. The converter of claim 1, wherein, if (a) the switches are configured to store input energy received at the power input port into the inductive reactor and (b) the control circuitry determines that the available inductive energy supply reaches the energy demand, then the control circuitry re-configures the switches to (i) stop storing the input energy into the inductive reactor and (ii) start transferring energy stored in the inductive reactor to the power output port.

6. The converter of claim 1, wherein the demand computation circuitry is configured to compute the energy demand based on a difference between instantaneous energy at the power output port and desired energy at the power output port.

7. The converter of claim 1, wherein the supply computation circuitry is configured to compute the available inductive energy supply based on (i) previous inductive energy at end of a previous chopping cycle; (ii) predicted inductive energy at end of the present chopping cycle; and (iii) the instantaneous inductive energy.

8. The converter of claim 7, wherein:
the supply computation circuitry is configured to compute the predicted inductive energy at the end of the present chopping cycle; and
the control circuitry is configured to control the switches so as to limit a per cycle change in inductive energy at the end of each chopping cycle.

9. The converter of claim 7, wherein the supply computation circuitry is configured to compute the available inductive energy supply by:
(a) computing an energy difference between (i) the previous inductive energy at the end of the previous chopping cycle and (ii) the predicted inductive energy at the end of the present chopping cycle;
(b) computing a scaled energy difference based on a product of (i) the energy difference and (ii) a scale factor having a magnitude less than one; and
(c) computing the available inductive energy supply based on a difference between (i) the scaled energy difference and (ii) the instantaneous inductive energy.

10. The converter of claim 1, wherein the control circuitry is configured to regulate the output voltage or current from chopping cycle to chopping cycle while predictively managing the inductive energy at the end of each chopping cycle.

11. A method of controlling a switched-mode power converter comprising a power input port, switches, an inductor, and a power output port, said method comprising:
transferring energy from the power input port to energize the inductor;
computing an energy demand for the converter based on (i) a reference signal and (ii) an output signal based on a voltage or current at the power output port;
computing an available inductive energy supply based on instantaneous inductive energy presently stored in the inductor, wherein the available inductive energy supply is an amount of inductive energy presently stored in the inductor that is available to be transferred to the output port during a present chopping cycle for the converter; and
controlling the switches to transfer energy from the inductor to the power output port based on (i) the energy demand and (ii) the available inductive energy supply.

12. The method of claim 11, wherein the power converter operates in continuous conduction mode.

13. The method of claim 11, further comprising application of a fast clock to divide a basic chopping period of the converter.

14. The method of claim 11, wherein said converter operates in any of bipolar, bidirectional, inverting, or flyback modes.

15. The method of claim 14, wherein the converter is a flyback converter and voltage at the power output port is controlled to be below voltage at the power input port.

16. The method of claim 11, wherein, if (a) the switches are configured to store input energy received at the power input port into the inductor and (b) the available inductive energy supply is determined to reach the energy demand, then the switches are re-configured to (i) stop storing the input energy into the inductor and (ii) start transferring energy stored in the inductor to the power output port.

17. The method of claim 11, wherein the energy demand is computed based on a difference between instantaneous energy at the power output port and desired energy at the power output port.

18. The method of claim 11, wherein the available inductive energy supply is computed based on (i) previous inductive energy at end of a previous chopping cycle; (ii) predicted inductive energy at end of the present chopping cycle; and (iii) the instantaneous inductive energy.

19. The method of claim 18, wherein the available inductive energy supply is computed by:
   (a) computing an energy difference between (i) the previous inductive energy at the end of the previous chopping cycle and (ii) the predicted inductive energy at the end of the present chopping cycle;
   (b) computing a scaled energy difference based on a product of (i) the energy difference and (ii) a scale factor having a magnitude less than one; and
   (c) computing the available inductive energy supply based on a difference between (i) the scaled energy difference and (ii) the instantaneous inductive energy.

20. The method of claim 11, wherein the switches are controlled to regulate the output voltage or current from chopping cycle to chopping cycle while predictively managing the inductive energy at the end of each chopping cycle.

* * * * *